United States Patent
Kubo

(10) Patent No.: US 7,301,554 B2
(45) Date of Patent: Nov. 27, 2007

(54) LIGHT SCANNING DEVICE, SCANNING LINE ADJUSTING METHOD, SCANNING LINE ADJUSTING CONTROL METHOD, IMAGE FORMING APPARATUS, AND IMAGE FORMING METHOD

(75) Inventor: Nobuaki Kubo, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/665,287

(22) Filed: Sep. 22, 2003

(65) Prior Publication Data

US 2004/0125193 A1    Jul. 1, 2004

(30) Foreign Application Priority Data

| Sep. 20, 2002 | (JP) | ............................. 2002-274689 |
| Jan. 30, 2003 | (JP) | ............................. 2003-022674 |
| Jul. 25, 2003 | (JP) | ............................. 2003-201885 |

(51) Int. Cl.
*B41J 27/00* (2006.01)

(52) U.S. Cl. ....................................... 347/244; 347/258

(58) Field of Classification Search ................ 347/116, 347/241–245, 256–261; 355/32; 358/509, 358/1.1; 359/214–215, 819–822
See application file for complete search history.

(56) References Cited

U.S. PATENT DOCUMENTS

| 4,968,997 | A | 11/1990 | Saitoh et al. ................ 347/262 |
| 5,059,774 | A | 10/1991 | Kubo et al. .................. 235/454 |
| 5,294,944 | A | 3/1994 | Takeyama et al. ........... 347/232 |
| 5,374,980 | A | 12/1994 | Kubo et al. .................. 399/233 |
| 6,320,682 | B1 * | 11/2001 | Azumai et al. .............. 358/509 |
| 6,376,837 | B1 | 4/2002 | Itabashi et al. .............. 250/234 |
| 6,452,687 | B1 * | 9/2002 | Suzuki et al. ................ 358/1.1 |
| 2001/0017645 | A1 * | 8/2001 | Toda ........................... 347/116 |
| 2004/0041992 | A1 * | 3/2004 | Yokoyama .................... 355/32 |
| 2004/0125193 | A1 | 7/2004 | Kubo | |

FOREIGN PATENT DOCUMENTS

| JP | 06-1486905 | 5/1994 |
| JP | 10-090618 | 4/1998 |

(Continued)

OTHER PUBLICATIONS

U.S. Appl. No. 10/347,746, filed Jan. 22, 2003, Suzuki et al.
U.S. Appl. No. 10/375,036, filed Feb. 28, 2003, Suzuki et al.
U.S. Appl. No. 10/382,530, filed Mar. 7, 2003, Hayashi et al.

(Continued)

*Primary Examiner*—Hai Pham
(74) *Attorney, Agent, or Firm*—Oblon, Spivak, McClelland, Maier & Neustadt, P.C.

(57) ABSTRACT

A light scanning device includes an optical element that images, on an image holding body, a light beam emitted from a light source. The light scanning device further includes a holding member that holds the optical element, and scanning line curve correcting mechanism for correcting the optical element in a sub scanning direction to correct a scanning line formed by the light beam in the sub scanning direction. The light scanning device further includes a scanning line inclination correcting mechanism for entirely tilting the optical element to correct an inclination of the scanning line. At least one part of the scanning line curve correcting mechanism, and at least one part of the scanning line inclination correcting mechanism are provided integrally with the holding member.

39 Claims, 32 Drawing Sheets

FOREIGN PATENT DOCUMENTS

| | | | | |
|---|---|---|---|---|
| JP | 10-239939 | | | 9/1998 |
| JP | 11231240 | A | * | 8/1999 |
| JP | 2000-235290 | | | 8/2000 |
| JP | 2001-100127 | | | 4/2001 |
| JP | 2001-133718 | | | 5/2001 |
| JP | 2001194613 | A | * | 7/2001 |
| JP | 2001-208992 | | | 8/2001 |
| JP | 2001-221969 | | | 8/2001 |
| JP | 2002-131674 | | | 5/2002 |

OTHER PUBLICATIONS

U.S. Appl. No. 10/609,577, filed Jul. 1, 2003, Nakajima et al.
U.S. Appl. No. 10/665,287, filed Sep. 22, 2003, Kubo.
U.S. Appl. No. 10/840,369, filed May 7, 2004, Itabashi et al.
U.S. Appl. No. 10/852,183, filed May 25, 2004, Miyatake et al.
U.S. Appl. No. 10/892,191, filed Jul. 16, 2004, Suzuki et al.
U.S. Appl. No. 10/941,849, filed Sep. 16, 2004, Nakajima.

* cited by examiner ( RELATION BETWEEN DRIVING FREQUENCY AND TORQUE OF STEPPING MOTOR )

FIG.38A

50mm MAGNIFICATION ERROR CHANGE IN SAPAN BAND METHOD[%]

| INCLINATION[μm] | IMAGE HEIGHT[mm] | | | | | | PV |
|---|---|---|---|---|---|---|---|
| | −125 | −75 | −25 | 25 | 75 | 125 | |
| −700 | 0.0277 | 0.0453 | −0.0173 | −0.0496 | −0.0045 | −0.0017 | 0.095 |
| −350 | 0.0281 | 0.0457 | −0.0169 | −0.0492 | −0.0043 | −0.0016 | 0.095 |
| 0 | 0.0283 | 0.0459 | −0.0167 | −0.0491 | −0.0043 | −0.0016 | 0.095 |
| 350 | 0.0283 | 0.0459 | −0.0168 | −0.0493 | −0.0044 | −0.0018 | 0.095 |
| 700 | 0.0282 | 0.0457 | −0.0172 | −0.0497 | −0.0048 | −0.0022 | 0.095 |

FIG.38B

50mm MAGNIFICATION ERROR CHANGE IN CONVENTIONAL MUSIC METHOD[%]

| INCLINATION[μm] | IMAGE HEIGHT[mm] | | | | | | PV |
|---|---|---|---|---|---|---|---|
| | −125 | −75 | −25 | 25 | 75 | 125 | |
| −700 | −0.245 | −0.1371 | −0.0812 | 0.0185 | 0.1831 | 0.2801 | 0.525 |
| −350 | −0.1086 | −0.0457 | −0.0489 | −0.0153 | 0.0894 | 0.1391 | 0.248 |
| 0 | 0.0283 | 0.0459 | −0.0167 | −0.0491 | −0.0043 | −0.0016 | 0.095 |
| 350 | 0.1655 | 0.1376 | 0.0156 | −0.0829 | −0.0978 | −0.142 | 0.308 |
| 700 | 0.303 | 0.2294 | 0.0478 | −0.1167 | −0.1912 | −0.282 | 0.585 |

LIGHT SCANNING DEVICE, SCANNING LINE ADJUSTING METHOD, SCANNING LINE ADJUSTING CONTROL METHOD, IMAGE FORMING APPARATUS, AND IMAGE FORMING METHOD

BACKGROUND OF THE INVENTION

1. Field of the Invention

The present invention relates to a light scanning device, and an image forming apparatus using the light scanning device.

2. Description of the Related Art

A light flux from a light source is deflected by light deflecting means such as a rotational polygon mirror. The deflected light flux is focused to a scanned surface by using a scanning imaging optical system including an fθ lens. In this manner, a light spot is formed on the scanned surface. A light scanning device that uses the light spot to scan the scanned surface is well known as a device related to an image forming apparatus such as an optical printer, an optical plotter, and a digital copier.

In the image forming apparatus using the light scanning device, an image writing process of writing an image by light scanning is adopted as one process in an image forming operation. Quality of an image formed by the imaging process is affected by quality of light scanning. The quality of light scanning depends on scanning characteristics of a main scanning direction and a sub scanning direction.

Speed uniformity of light scanning is one of the scanning characteristics of the main scanning direction.

For example, when the rotational polygon mirror is used as the light deflecting means, a light flux is deflected in a uniform angular speed manner. For this reason, in order to realize speed uniformity of light scanning, a scanning imaging optical system that includes fθ characteristics is used.

However, since there are other characteristics required for the light imaging optical system, it is difficult to completely realize the fθ characteristics. Accordingly, in actual light scanning, there are no cases where the light scanning is performed in a completely uniform angular speed, so that the speed uniformity as the scanning characteristics is different from ideal light scanning speed uniformity.

The scanning characteristics of the sub scanning direction include a scanning line curve and a scanning line inclination.

A scanning line is a trajectory of a light spot on the scanned surface, and an ideal scanning line is a straight line. The light scanning device is designed such that the scanning line becomes a straight line. However, in reality, scanning line curve is usually generated due to a machining error, and an assembling error.

Further, in a case where an imaging mirror is used in the scanning imaging optical system, and the deflected light flux is made to have an angle in terms of the sub scanning direction of the deflected light flux between an incident direction and a reflection direction of the deflected light flux to the imaging mirror, in principle, the scanning line curve is generated. Even when the scanning imaging optical system is configured as a lens system, it is impossible to avoid the scanning line curve in a multi-beam scanning method in which scanning is performed on the scanned surface by using a plurality of light spots divided in the sub scanning direction.

The scanning line inclination is a phenomenon in which the scanning line does not appropriately cross the sub scanning direction at a right angle. Since the scanning line inclination is one kind of the scanning line curve, in the following description, the term "scanning line curve" may include the scanning line inclination.

When the light scanning speed is incomplete, distortion in the main scanning direction is generated in the formed image. The scanning line curve causes distortion in the sub scanning direction to be generated in the formed image.

In a case where an image is mono-color, that is, the image is formed by a single light scanning device, if the scanning line curve and incompleteness of the speed uniformity are suppressed to a certain degree, the formed image does not include distortion that a human eye can recognize. However, it is preferable that there is less distortion in the image.

Different from the mono-color image, in a conventional color copier and the like, each color component image of three colors of magenta, cyan, and yellow, or four colors of magenta, cyan, yellow, and black is formed, and these color component images are made to overlap each other in order to form a color image.

As a color image forming method, there is a tandem type image forming method in which respective color component images are formed on photoconductive bodies by using respective light scanning devices. In a case of such an image forming method, if scanning curve and inclination degrees in the respective light scanning devices are different from each other, even if the respective scanning line curves in the light scanning devices are adjusted, an abnormal image called "color difference" is generated in the formed color image, so that color image quality is deteriorated.

The color difference phenomenon includes a phenomenon in which a color tone (hue) in the formed color image is different from a desired color tone.

In order to prevent a problem of the above-mentioned color difference, Japanese Patent Application Laid Open No. 2002-131674 discloses a scanning line curve adjustment structure in which both sides of a supporting unit for a long lens is provided between an optical axis of the long lens, and one side of the supporting unit is configured such that the long lens can be moved in the sub scanning direction by an adjusting screw. In this structure, adjusting the screw causes the long lens to be rotated in a section plane orthogonal to a deflection direction to adjust the scanning line curve.

However, in Japanese Patent Application Laid Open No. 2002-131674, there is a possibility that the scanning line curve cannot be adjusted in an environment affecting a material of the lens used in the imaging optical system. The reason of this is as follows.

Recently, in order to improve scanning characteristics, a special surface of which representative is non-spherical surface was generally adopted in the imaging optical system of the light scanning device. It is relatively common to use the imaging system that enables such a special surface to be easily formed, and that is configured by a resin material of which cost is low.

The imaging optical system including the resin material can be easily affected by temperature and humidity change, resulting in change of optical characteristics. This change of the optical characteristics causes the scanning line curve degree and the speed uniformity to be also changed. For this reason, when successively forming color images of tens of pages, a temperature in an image forming apparatus is raised due to the successive operation. Accordingly, the optical characteristics of the imaging optical system are changed, and the curve of the scanning line written by the respective light scanning devices (optical writing devices), and the speed uniformity are gradually changed, in some cases, resulting in the color difference in which the color tone of the first formed image is entirely different from the color tone of the last formed image.

A scanning imaging lens such as representative fθ lens in the scanning optical system is formed as a thin lens that is long in the main scanning direction such that unnecessary portion (that the deflected light flux does not enter) of the scanning imaging lens in the sub scanning direction is cut. In a case where a plurality of lenses constitute the scanning imaging system, as the disposed position of the lens is more away from the light deflecting means, the length of the lens in the main scanning direction becomes longer, so that the long lens having the length of ten-odd cm to 20 cm or more is required. Such a long lens is generally formed in resin molding by using a resin material, but when the temperature distribution in the lens becomes inhomogeneous, the lens is warped and arched in the sub scanning direction. This warping of the long lens causes the scanning line curve, and when the warping is large, the scanning line curve also becomes very large. Even when the configuration of Japanese Patent Application Laid Open No. 2002-131674 is used to perform initial adjustment, this phenomenon is generated. Furthermore, the configuration disclosed by Japanese Patent Application Laid Open No. 2002-131674 does not take into consideration the scanning line inclination that also causes the color difference. In Japanese Patent Application Laid Open No. 2002-131674, the position of the lens in the optical axis direction is changed by screw fastening degree, so that it is difficult to maintain accuracy in the position of the lens.

Recently, accompanying higher speed color image forming, four photoconductive drums (bodies) are arranged in a direction of transporting paper, and a plurality of optical systems corresponding to these respective photoconductive drums form latent images simultaneously on these photoconductive drums. Then, developing units use developing agents of different colors (for example, yellow, magenta, cyan, and black) to turn these latent images into visible images, and these visible images are successively transferred on the same paper on top of one another to obtain a color image. An image forming apparatus (four drum tandem type) such as a digital copier and a laser printer that form a color image has been put into practical use.

In the four drum tandem type, a mono color image and a color image can be output at the same speed, so that the four drum tandem type is advantageous for high speed printing. However, when the toner images developed on the photoconductive drums are transferred to the paper on top of one another, a color difference is generated. In the case of the four drum tandem type, since a multi-color image is formed by successively transferring respective color toner images on top of one another, the generated scanning line position displacement is scattered among the respective colors, resulting in the color difference.

In order to reduce the color difference, there are the following methods.

First, Japanese Patent Application Laid-Open No. 2001-133718 discloses a method in which the position of the entirety of respective optical elements is adjusted relative to the photoconductive body so as to conform the respective scanning lines to each other. However, a mechanism for performing this adjustment becomes complicated, so that it is difficult for this method to deal with optical characteristics change due to time lapse (for example, temperature change). Furthermore, in this method, it is difficult to correct the color difference with high accuracy during a printing operation or a used state.

Secondly, Japanese Patent Application Laid-Open No. 2001-100127 discloses the method in which the scanning beam position is controlled in the sub scanning direction by using a galvanometer mirror. However, the galvanometer mirror has too high sensitivity in controlling the scanning position in the sub scanning direction. Accordingly, this method is easily affected by outside vibration. In order to realize further improved beam spot diameter, higher surface accuracy is required.

Third, Japanese Patent Application Laid-Open No. 10-239939 discloses the method in which in accordance with phase relation between a middle transfer reference signal and a line synchronization signal, out of a plurality of laser beams, a laser beam for first writing an image on a photoconductive body is switched so that an image writing start position for each color in the sub scanning direction can be adjusted. However, also in this method, it is impossible to achieve correcting accuracy of less than one line. For example, in a case of image writing of 600 dpi, a color difference (position displacement larger than 42 μm) is generated.

Further, when a tilt amount of the reflection mirror is changed, an optical path length up to the image holding body becomes different between a center part and end parts of the scanning line. This problem is called a magnification error in the main scanning direction.

The causes of the color difference, particularly, in the sub scanning direction in the tandem type image forming apparatus include: ① nonuniformity of speed on the photoconductive body in the circumferential direction (in the sub scanning direction); ② nonuniformity on the middle transfer body in the circumferential direction (in the sub scanning direction); ③ a position error between the photoconductive bodies; ④ writing position displacement of a beam spot between scanning optical systems; and ⑤ position displacement due to ① to ④ caused by environmental change or temperature change at the time of successive printing. In addition, when writing is performed on each photoconductive body by using multi beams, there is a possibility that a position is displaced by an amount depending on the number of beams because the rotation of the polygon scanner is not synchronized with the speed on the photoconductive body. Furthermore, in some cases, the color difference in the sub scanning direction is caused by change of the optical length due to an error of the thickness of the middle transfer body.

SUMMARY OF THE INVENTION

It is an object of the present invention to provide a light scanning device that can effectively suppress deformation of an optical element (for example, a resin-made optical element) included in a scanning optical system (scanning imaging optical system.), and that can correct a scanning line curve and speed nonuniformity, easily and accurately. The deformation of the optical element is caused by temperature change, for example.

It is another object of the present invention to provide a light scanning device that can effectively suppress the deformation of the optical element (for example, the resin-made optical element) included in the scanning imaging optical system, and that can accurately correct scanning line curve and inclination so that good quality of a color image having less color difference can be formed.

It is another object of the present invention to provide a scanning line correcting method, a scanning line correcting control method, and an image forming apparatus having the above light scanning device.

According to one aspect of the present invention, there is provided a light scanning device comprising:

light deflection means for deflecting a light beam emitted from a light source;

a scanning imaging optical system that forms a light spot on a scanned surface, using the light beam;

shape maintaining means for preventing or reducing deformation of a resin-made optical element included in the scanning imaging optical system;

scanning line curve correcting means for correcting a curve of a scanning line by using the shape maintaining means; and scanning line inclination correcting means for correcting an inclination of the scanning line by using the shape maintaining means.

According to another aspect of the present invention, there is provided a light scanning device comprising:

an optical element that images, on an image holding body, a light beam emitted from a light source;

a holding member that holds the optical element;

scanning line curve correcting means for correcting the optical element in a sub scanning direction to correct a scanning line formed by the light beam in the sub scanning direction; and scanning line inclination correcting means for entirely tilting the optical element to correct an inclination of the scanning line, wherein at least one part of the scanning line curve correcting means, and at least one part of the scanning line inclination correcting means are provided integrally with the holding member.

According to another aspect of the present invention, there is provided a method of correcting a curve and/or inclination of a scanning line of light beam emitted from a light source, comprising the steps of:

correcting an optical element in a sub scanning direction to correct the curve of the scanning line, the optical element imaging the light beam on an image holding body; and entirely tilting the optical element to correct the inclination of the scanning line.

Other objects, features, and advantages of the present invention will become more apparent from the following detailed description when read in conjunction with the accompanying drawings.

BRIEF DESCRIPTION OF THE DRAWINGS

FIG. 38A is a table showing magnification error change in the case of the span band method, and FIG. 38B is a table showing magnification error change in the case of the MUSIC method;

DETAILED DESCRIPTION OF THE PREFERRED EMBODIMENTS

Embodiments of the present invention will be described with reference to the drawings.

First, an image forming apparatus to which a light scanning device is applied will be described.

Figure 41:
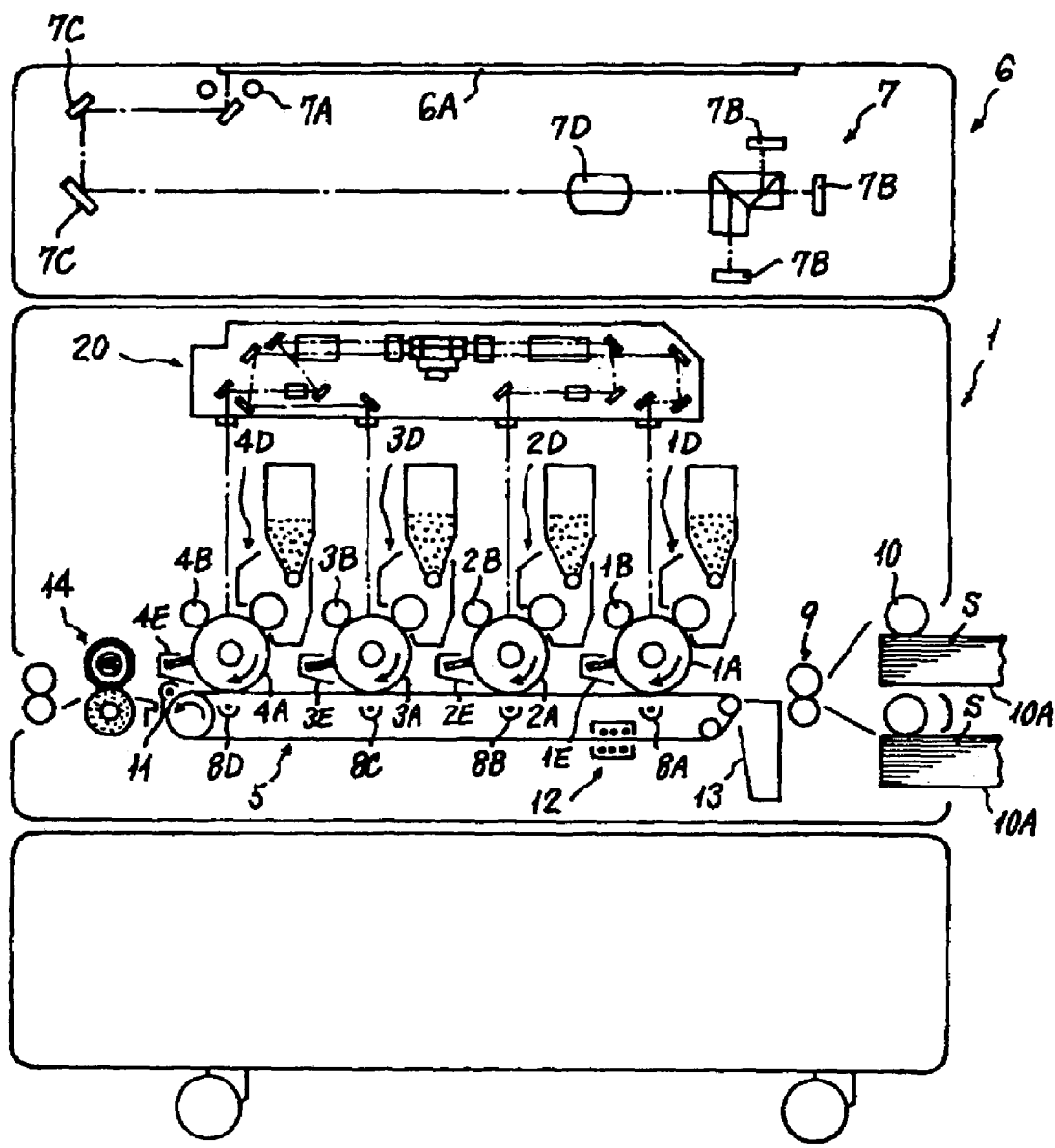
FIG. 41 shows a configuration of an image forming apparatus to which the light scanning device of the first and second embodiments may be applied.

FIG. 41 shows an image forming apparatus to which a light scanning device according to embodiments of the present invention is applied. The image forming apparatus shown in FIG. 41 may be a copier or a printer that can form a full color image. However, the image forming apparatus of FIG. 41 may be a facsimile machine that can perform image forming process same as that of the copier or the printer, based on an image forming signal. Furthermore, the image forming apparatus 1 may be a composite machine of any combination among a printer, a copier, and a facsimile machine. The image forming signal may be received from outside the image forming apparatus 1. The image forming apparatus includes not only an apparatus for a full color image, but also an apparatus for a single color image.

The image forming apparatus 1 of FIG. 41 has a tandem structure in which a plurality of photoconductive drums each of which can form an image corresponding to one of the decomposed colors (yellow, cyan, magenta, and black) are arranged side by side. Visible images formed on the respective photoconductive drums 1A, 2A, 3A, and 4A are transferred to transfer paper S of a recording medium that is transported by a transfer belt 5 with the respective visible images being put on top of each other. The transfer belt 5 can move while facing the respective photoconductive drums. The recording medium S may be standard paper such as paper for copying, an OHP sheet, heavy paper such as a card or postcard, an envelope, or any other sheet type recording medium A configuration of the photoconductive drum 1A for an image forming process will be described. However, the other photoconductive drums 2A through 4A may have the same configuration as that of the photoconductive drum 1A, and the same reference symbols (alphabets) of components related to the photoconductive drum 1A are used for components of the photoconductive drums 1A through 4A. In order to perform the image forming process along the rotational direction indicated by the arrow, around the photoconductive drum 1A, there are arranged a charging device using a configuration such as a corotron or scorotron (in FIG. 41, a configuration using a roller), a light scanning device 20 or 1020 using laser light from a light source (described later in detail), a developing device 1D, and a cleaning device 1E.

In the image forming apparatus shown in FIG. 41, a document (image) reading unit 6 is provided above an image forming unit constituted by these devices 1A, 1B, and so on that perform the image forming operation. In the document reading unit 6, a reading device 7 reads a document and the like placed on a document placing tray 6A, and image information read by the reading device 7 is output to an image processing control unit (not shown) to obtain writing information for the light scanning device 20 or 1020. The charging device 1B is not limited to a contact type using a roller, and may be a corona discharge type using a discharge wire.

In this example, the developing devices are arranged so as to provide toner in the order of yellow color toner, cyan color toner, magenta color toner, black color toner, from the right side of FIG. 41.

The reading device 7 includes a light source 7A for scanning a document placed on the document placing tray 6A, a plurality of reflection mirrors 7C, and an imaging lens 7D. A plurality of reflection mirrors 7C, and the imaging lens 7D are provided for imaging light reflected from the document, on a CCD 7B. The CCDs 7B are provided for the decomposed colors, respectively. Image information based on light intensity of each of the decomposed colors is output from the CCDs 7B to the image processing control unit.

The transfer belt 5 is a member constituted by a dielectric such as a polyester film that is put on and partly around a plurality of rollers. A part of stretched and spreading part of the transfer belt faces the respective photoconductive drums 1A through 4A, and transfer devices 8A, 8B, 8C, and 8C are provided at the reverse sides of the transfer belt 5 at the side of the photoconductive drums 1A through 4D. A record medium S such as paper is sent to the transfer roller 5 from a paper supply cassette 9A of a paper supply device 10 via a resist roller 9. The record medium S is absorbed to the transfer belt by electrostatic absorption caused by corona discharge generated from the transfer device 8A. In this manner, the record medium is transported by the transfer belt 5. A thickness of the transfer belt 5 is about 100 μm. The thickness of the transfer belt has an error of ±10 μm. As described later, when toner images of the respective colors overlap, there is a possibility that position displacement occurs, but this position displacement is corrected by writing start position adjusting means 1140 described later.

Image transfer is performed on the record medium S, and is then sent to a dividing device 11, and a charge removing device 12 is provided across the part of the stretching and spreading part of the transfer belt 5. Further, In FIG. 41, the reference number 13 designates a cleaning device that removes toner remaining on the transfer belt 5.

The transfer devices 8A through 8D generate positive corona discharge so that images held by photoconductive drums 1A through 4A can be attached to the record medium S by electrostatic absorption.

The dividing device 11 generates negative corona discharge to an upper surface of the record medium S so that an electrical charge of the record medium S can be neutralized, removing an electrostatic absorption state. At this time, a curvature of the transfer belt 5 is used for dividing the electrical charge, and toner dust caused by removing discharge can be prevented. From both sides of the transfer belt 5, the charge removing device 12 generates negative AC corona discharge that is reverse electrical polarity of the charging characteristics of the transfer devices 8A through 8D so that an electrical charge accumulated on the transfer belt 5 is neutralized and electrically initialized.

As for the photoconductive drums 1A through 4A, the charging devices 1B through 4B uniformly charge surfaces of the photoconductive drums 1A through 4A. The writing devices 1C through 4C form electrostatic latent images on the photoconductive drums, based on the respective decomposed color image information read by the reading device 7 of the document reading unit 6. Each of the developing devices 1D through 4D supply color toner corresponding to complementary color relation of the decomposed color to turn the electrostatic latent image into a visible image. Thereafter, each of the transfer devices 8A through 8D transfers the visible image to the record medium S held and transported by the transfer belt 5.

The record medium to which the images of the respective decomposes color held by the photoconductive drums 1A through 4A are transferred divided from the transfer belt 5 by using a curvature of the transfer belt 5 after the charge of the record medium S is removed by the charge removing device 11. After that, the record medium S is moved to a fixing device 14 where toner on the record medium S is fixed thereto. Then, the record medium S is discharged on a discharge tray outside a main body of the image forming apparatus 1.

Figure 1:
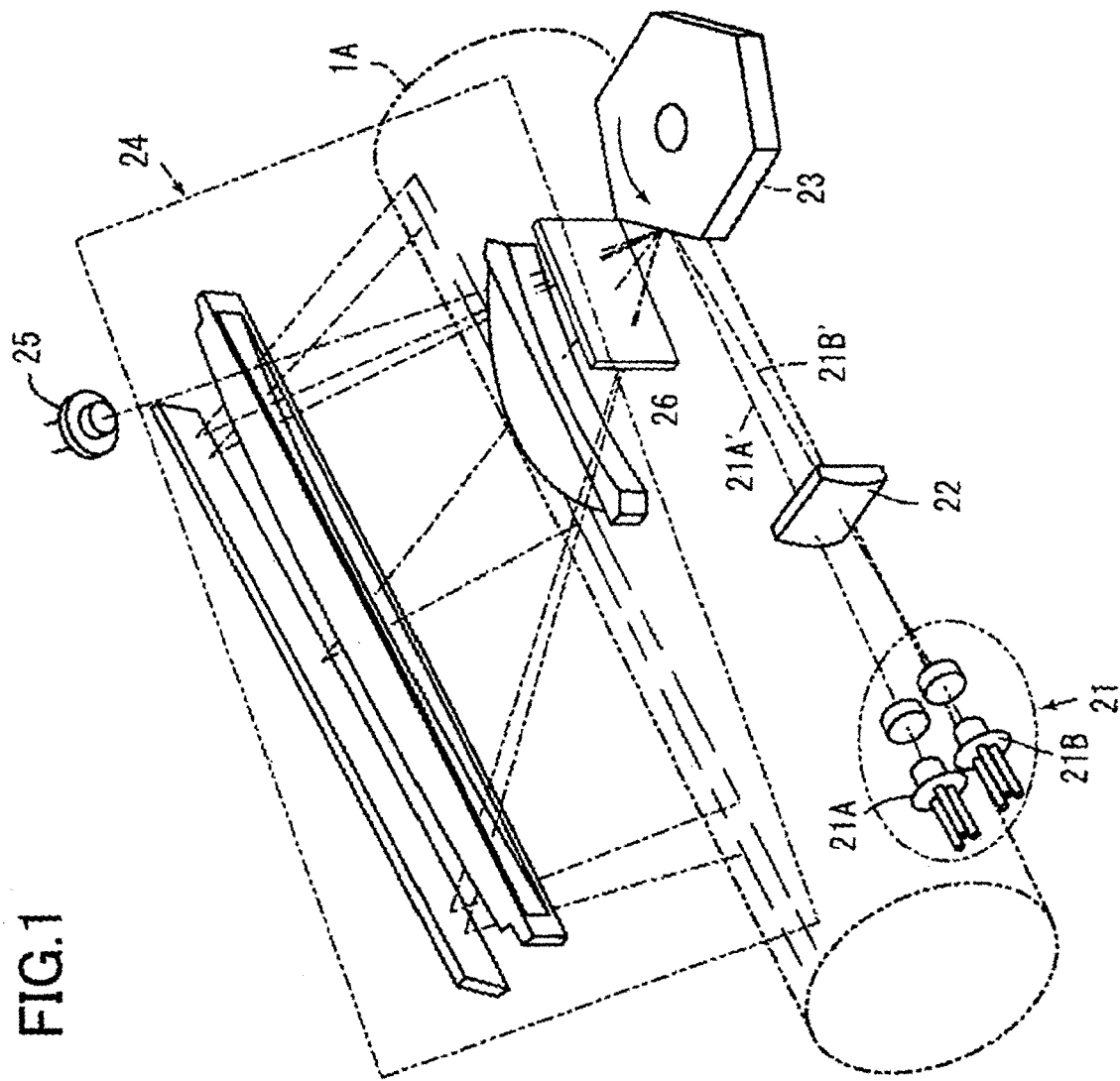
FIG. 1 shows a basic configuration of a light scanning device according to a first embodiment of the present invention.

FIG. 1 shows a basic structure of a light scanning device 20 for the above-described plural photoconductive drums according to a first embodiment of the present invention.

In FIG. 1, two light beams 21A' and 21B' emitted from a light source device 21 including two semiconductor lasers 21A and 21B are focused on a deflection reflection surface of a polygon mirror 23 in terms of a sub scanning direction by a cylindrical lens 22. The polygon mirror 23 functions as a deflector. Then, using the focused light beams 21A' and 21B', the polygon mirror has a function of forming long line images in a main scanning direction. A second part 24 of an imaging optical system including an fθ lens scans a scanned surface (the photoconductive drum 1A, for example) by forming light spots thereon. It should be noted that in FIG. 1, the light source device 21 is constituted by the semiconductor lasers and coupling lenses, but the present invention is not limited to this configuration.

When the light scanning device is used as an optical writing device of an image output device, a light beam is modulated for output image data, but an electrical signal (synchronization signal) for a modulation start timing is obtained by entering of the light beam to a synchronization detection plate 25.

Figure 2:
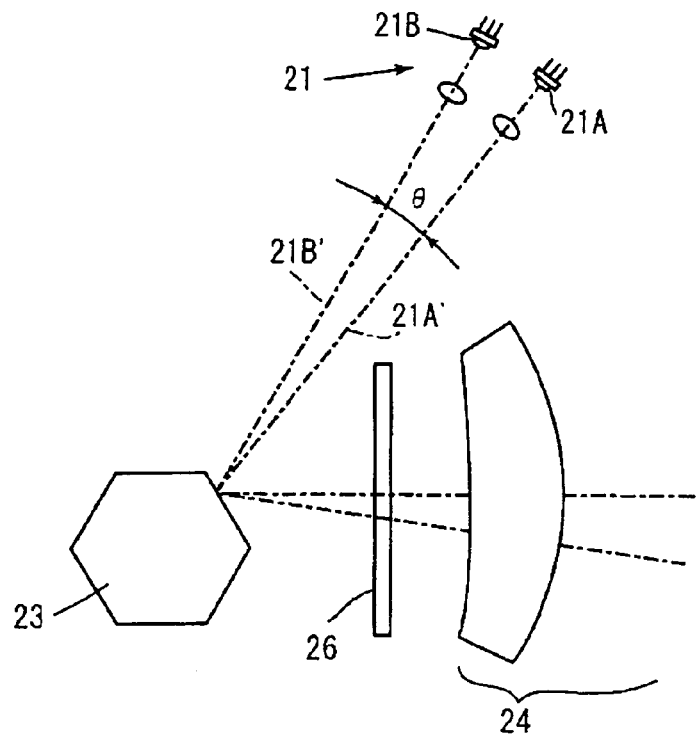
FIG. 2 shows one function of the light scanning device of FIG. 1.

As shown in FIG. 2, two light beams 21A' and 21B' cross each other at an angle θ (when seen from a sectional direction orthogonal to the main scanning direction) in the vicinity of the deflection reflection surface of the polygon mirror 23. In this manner, a difference in optical characteristics (imaging plane curve, magnification error) between the two light beams can be suppressed.

Figure 3:
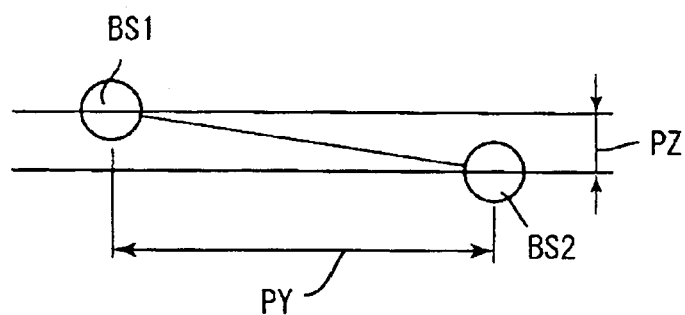
FIG. 3 shows another function of the light scanning device of FIG. 1.
Figure 4:
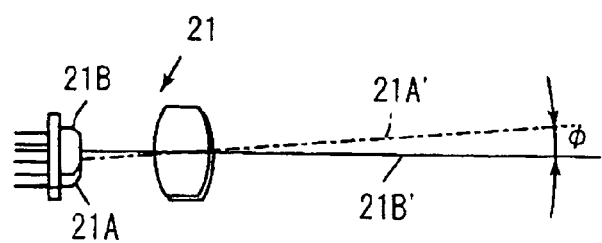
FIG. 4 shows another function of the light scanning device of FIG. 1.

As shown in FIG. 3, it is required that the two light spots BS1 and BS2 should maintain a predetermined interval (beam pitch PZ) in the sub scanning direction in accordance with scanning density. As shown in FIG. 4, an angle φ made by the two light beams 21A' and 21B' in terms of the sub scanning direction may be set so as to obtain the predetermined beam pitch.

The light scanning device shown in FIG. 1 includes a liquid crystal deflection element 26 between the polygon mirror as the deflector and the second part of 24 of the imaging optical system.

The liquid crystal deflection element 26 having an effective area corresponding to the main scanning area may be provided so as to be divided in the main scanning direction or the sub scanning direction. The liquid crystal deflection element 26 for the main scanning direction, and the liquid crystal deflection element 26 for the sub scanning direction may be provided so as to overlap each other in the optical axis direction. Thus, by appropriately arranging the liquid crystal deflection element 26, the light beam can be deflected to adjust the light spot position on the scanned surface. This light beam deflection is performed by driving and controlling (modulating) the liquid crystal deflection element 26, using an electrical signal from control means (not shown). In this case, a control method for the liquid crystal deflection element 26 may be feedback or open loop.

The scanning line is curved or inclined by an accuracy problem of the optical element, a curve of a generatrix, and an arrangement error at the time of assembling in an optical housing. According to the first embodiment of the present invention, based on a detection result of means for detecting a curve and inclination on the scanned surface 1A (i.e., on the photoconductive drum 1A), or based on a detection result of means for detecting a color difference of a color patch formed on the transfer belt 5, an electrical signal is used to perform the driving and the controlling (modulating) of the liquid crystal deflection element 26. In this manner, the curve and inclination of the scanning line can be adjusted. This operation will be described later with reference to FIGS. 5A through 5D.

Next, an amount of the scanning line inclination will be described. The contribution to the amount of the scanning line curve and inclination includes a curve amount caused by the light scanning device itself, and an amount caused by other factors other than the light scanning device. These accumulated contribution leads to a curve or inclination of an image, and in the worst case, an inclination of hundreds of microns can be generated.

According to the first embodiment, the light scanning device 20 can adjust the scanning line curve and/or inclination caused by not only the light scanning device itself 20, but also other factors.

In other words, scanning line curve correcting means for correcting the scanning line curve, the scanning line inclination correcting means for correcting the scanning line inclination, (described later), and shape correcting means are provided so that the curve and inclination of hundreds of microns can be adjusted to the curve and inclination of tens of microns or less. Furthermore, the liquid crystal deflection element 26 enables an amount of the scanning line curve and inclination to be reduced to tens of microns. Moreover, optical characteristics change caused by temperature and humidity change is adjusted to further improve accuracy of the scanning line.

When adjusting the scanning line curve to tens of microns by the liquid crystal deflection element 26, a large deflection angle is required. However, if the deflection angle is made large, a response speed of the liquid crystal deflection element 26 is reduced. For this reason, it is difficult to perform adjustment at a high accuracy by using the liquid crystal deflection element 26.

The above-mentioned scanning line position detection means for detecting the scanning line curve or detecting a color difference may has any one of configurations shown in FIGS. 5A through 5D.

Figure 5A:
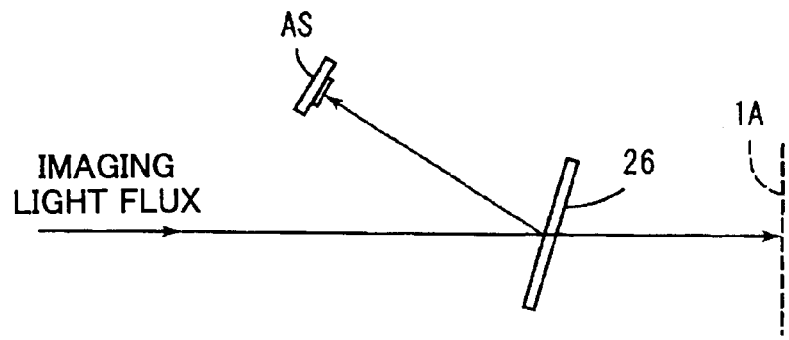
FIGS. 5A through 5D show examples of configurations for detecting a position difference and a color difference that are used in the light scanning device of FIG. 1.
Figure 5B:
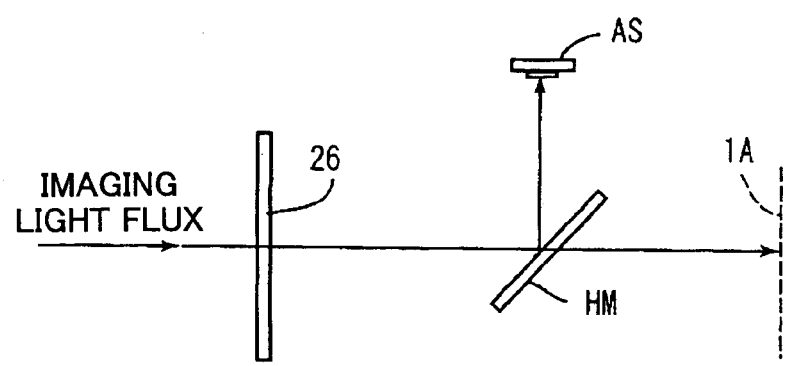

In the configurations of FIGS. 5A and 5B, the scanning line position detection means is provided inside or near the light scanning device. In FIG. 5A, the liquid crystal deflection element 26 is tilted so that an area sensor AS can receive the light reflected from the liquid crystal deflection element 26 to detect a displacement of the scanning position. In FIG. 5B, a half mirror HM is separately provided so that the area sensor AS can detect the scanning position.

Figure 5C:
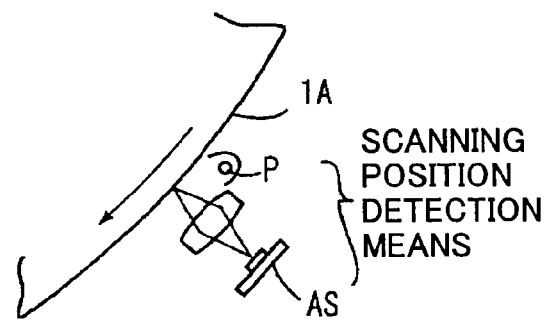
Figure 5D:
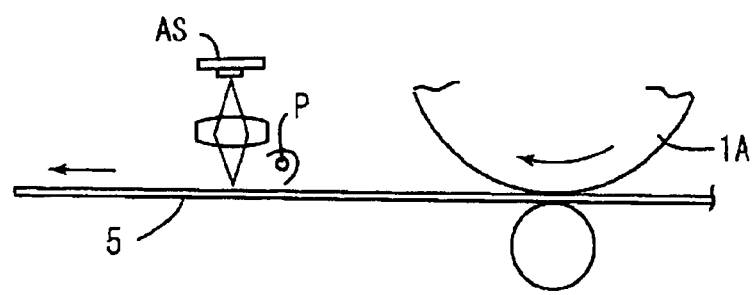

In the configurations of FIGS. 5C and 5D the area sensor AS detects a reflection state of light that is generated from a light source P and is reflected from the photoconductive drum 1A to detect a position difference and/or a color difference of a toner image T on the photoconductive drum 1A. According to the configurations of FIGS. 5C and 5D, this reflection state is detected at a stage of an almost finally formed image, so that detection accuracy can be high.

The light scanning device having the above-described configuration further includes the scanning line curve correcting means for correcting the scanning line curve, and the scanning line inclination correcting means for correcting the scanning line inclination. In the following, configurations of these means will be described.

Figure 6:
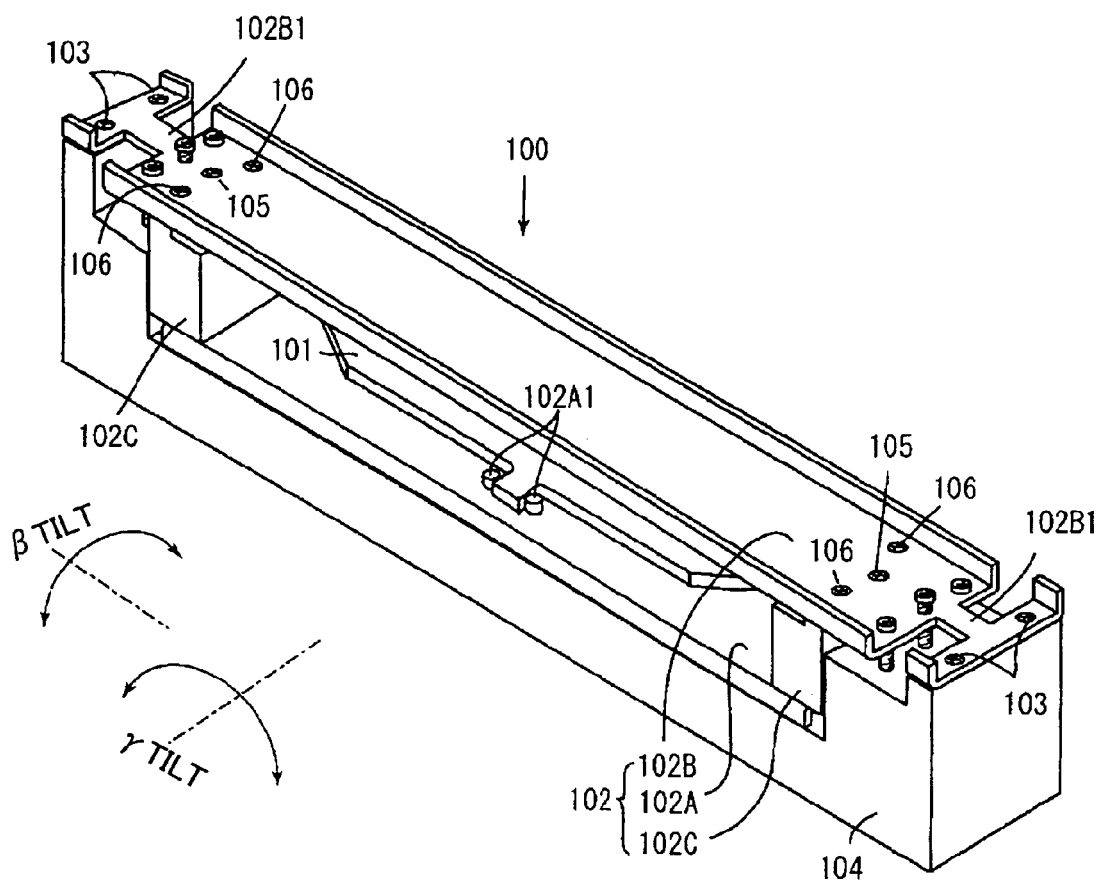
FIG. 6 shows a configuration of scanning line curve correcting means and scanning line inclination correcting means that are used in the light scanning device of FIG. 1.

FIG. 6 shows the scanning line curve correcting means for correcting the scanning line curve, and the scanning line inclination correcting means for correcting the scanning line inclination, and shape maintaining means for maintaining a shape of a long lens. The scanning line curve correcting means for correcting the scanning line curve, and the scanning line inclination correcting means for correcting the scanning line inclination, and the shape maintaining means are integrated with the resin-made long lens (hereinbelow, these means are together referred to as scanning line curve/inclination adjusting/correcting means 100). The long lens is used in the second part 24 of the imaging system (imaging optical system).

In the first embodiment, a curve of the scanning line is resolved by adjusting a tilt (indicated by β tilt of FIG. 6) of the long lens 101 in the direction orthogonal to the optical axis. An inclination of the scanning line is resolved by adjusting a tilt (indicated by γ of FIG. 6) of the long lens 101 around the optical axis. The configuration for this adjustment will be described as follows.

In FIG. 6, the scanning line curve/inclination adjusting/correcting means 100 includes the shape maintaining means 102 for maintaining a shape of the long lens 101.

The shape maintaining means 102 corrects deformation of the long lens 101 such as warping caused by temperature change. For this correction of the deformation, the shape maintaining means 102 includes a lower side metal plate member 102A that can put the long lens 101 thereon and determine a position of the long lens 101, an upper side metal plate member 102B that can press an upper surface of the long lens 101, and gap maintaining members 102C that are provided at both sides of a longitudinal direction of the long lens, respectively. The metal plate members 102A and 102C are respectively attached to upper and lower sides of the gap maintaining members, Both sides of a longitudinal direction of each of the lower side metal plate 102A and the upper side metal plate 102B are fixed to the gap maintaining members 102C, respectively so that a gap between the metal plates 102A and 102B can be determined. This gap length may be approximately equal to or smaller than a height of the long lens in the sub scanning direction. In this manner, both sides of the long lens 101 in the sub scanning direction is sandwiched between the upper side metal plate 102B and the lower side metal plate 102A so that generation of deformation or warping of the long lens 101 can be suppressed, and a curve of a generatrix of the long lens 101 can be corrected and held.

Position alignment protruding parts 102A1 for aligning the position of the long lens 101 are provided on a center part in the longitudinal direction on the lower side metal plate 102A. The position alignment protruding parts 102A1 sandwich (engage) an engagement part formed on the long lens 101 to align the position of the long lens in the longitudinal direction (main scanning direction).

In FIG. 6, by fixing screws 103, both ends of the upper side metal plate 102B in the longitudinal direction thereof are fixed to a support base unit 104 provided at a part of the optical housing. Near both ends of the upper side metal plate member 102B, thin parts 102B1 are formed, respectively, with the thin parts 102B1 being separated to the longitudinal center of the metal plate member 102 from both ends thereof. The thin part 102B1 is formed by cutting off edge surface part orthogonal to the longitudinal direction. The this part 102B1 is twisted in the direction indicated by β of FIG. 6 more easily than other parts of the upper side metal plate member 102A.

A γ adjusting screw 105 that can adjust a tilt (indicated by γ of FIG. 6) of the long lens 101 around the optical axis penetrates through the upper side metal plate member 102B at the position separated from each thin part 102B1 to the longitudinal center of the metal plate member 102B. Specifically, each adjusting screw 105 is provided at the position that is the center of the direction orthogonal to the longitudinal direction of the metal plate member 102A. Furthermore, β adjusting screws 106 that can adjust a tilt (indicated by β of FIG. 6) of the long lens 106 in the direction orthogonal to the optical axis penetrate through the upper side metal plate member 102B. As shown in FIG. 6, the β adjusting screws 106 are respectively positioned at both sides of each γ screw 105 in the direction orthogonal to the longitudinal direction of the metal plate member 102B.

Specifically, the β adjusting screws 105 and the γ adjusting screws 106 penetrate through screw holes formed on the upper side metal plate member 102B. Front edges of these adjusting screws 105 and 106 contact against the support base unit 104. With this configuration, by adjusting a rotational direction of the these screws 105 and 106, and rotated amounts of these screws 105 and 106, it is possible to move or rotate the upper side metal plate member 102B in the β direction and/or the γ direction in FIG. 6. In this manner, a curve and/or inclination of the scanning line can be adjusted and corrected, and the moved amount of the upper side metal plate 102B is a correction amount for the tilt adjustment.

As described above, the upper side metal plate member 102B is moved in the β direction and the γ direction by adjusting the adjusting screws 105 and 106. At this time, the deformation of the upper side metal plate member 102B can reach a plastic deformation area, depending on the adjusting amount. However, an adjusted state of the upper side metal member 102B can be maintained by the rigidity of the metal plate member 102B, and the friction engagement between the metal plate member 102B and the adjusting screws 105 and 106, so that the durability of the metal plate member 102B against vibration can be secured.

Figure 7:
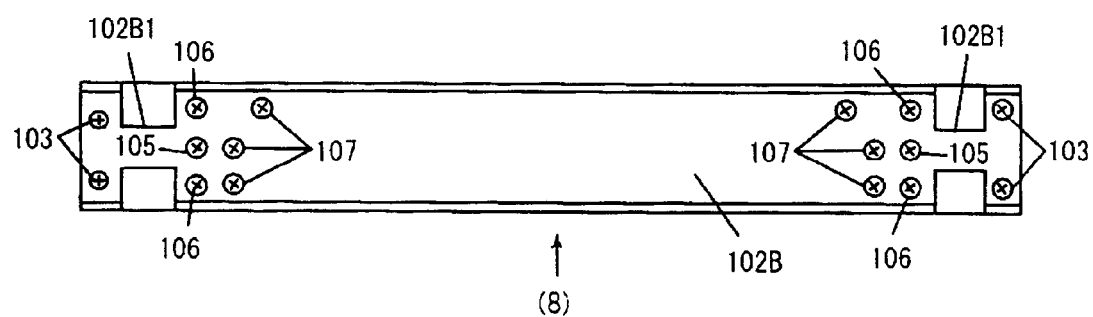
FIG. 7 is a plan view of the scanning line curve correcting means and the scanning line inclination correcting means of FIG. 6.
Figure 8:
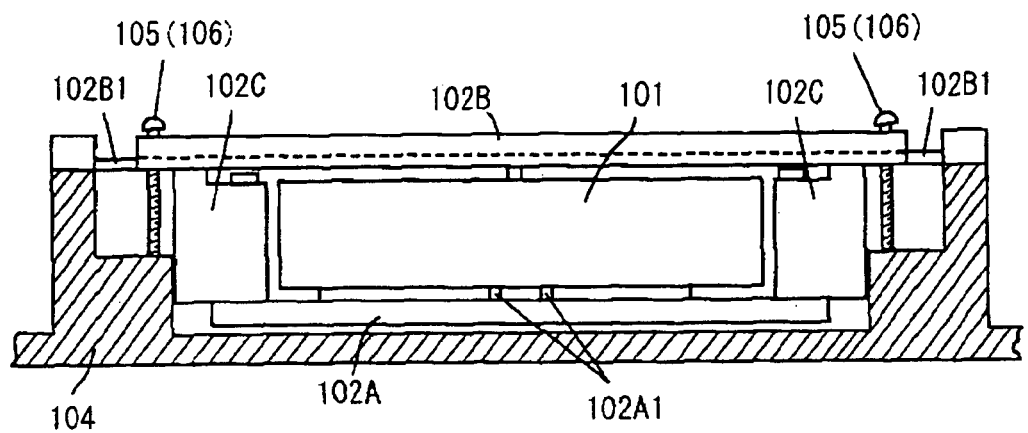
FIG. 8 is a cross sectional view taken in the direction indicated by the arrow (8) of FIG. 7.

In addition to the adjusting screws 105 and 106, attachment screws 107 for fixing the upper side metal plate member 102B to the gap maintaining members 102C are provided on the upper side metal plate member 102B, as shown in FIG. 7.

The gap maintaining members 102C to which the upper side metal plate member 102B and the lower side metal plate member 102A are fixed may be made of a metal material or a resin material, but are formed such that linear expansivity of the gap maintaining members 102C made approximately same as that of the long lens 101. In this manner, even when an environmental temperature changes, a uniform compression stress is generated in the long lens 101 and the gap maintaining member 102C so that the affected change of the optical characteristics of the long lens 101 can be minimized. In other words, even when the environmental temperature changes, a uniform compression stress can be generated in the long lens and between the upper and lower side metal members 102B and 102A that sandwiches and holds the long lens 101 because the same linear expansivity exists in the long lens 101 and between the upper and lower side metal plate members 102B and 102A. Accordingly, it is possible to prevent the change of the optical characteristics of the long lens 101 due to nonuniformity of the compression stress.

In the first embodiment, the inventor performed an experiment by using the scanning line curve/inclination adjustment/correcting means due to deformation of the long lens 101 caused by temperature change. A result of this experiment is shown in FIGS. 9 and 10.

Figure 9:
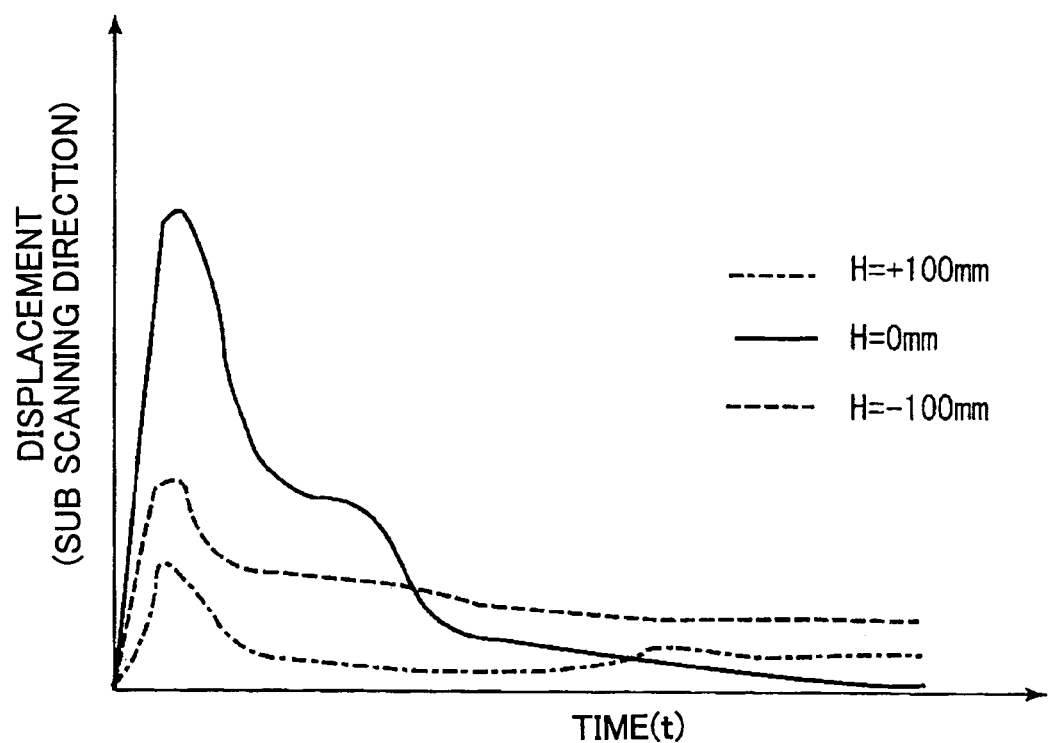
FIG. 9 shows a position displacement state of a light spot caused by the deformation of a long lens due to temperature change.

FIG. 9 shows a result of measuring deformed amounts in time series at three points of the resin-made long lens 101 in a condition where the long lens 101 was placed on a reference board in a constant temperature bath, and a temperature of the long lens 101 is changed from 25° C. to 45° C. In FIG. 9, "H" designates an image height that is a distance from a reference position (e.g., corresponding to the center of the long lens 101) in the main scanning direction. In this experiment, warm air was forced to strike a surface of the long lens 101 such that temperature difference between a bottom side and an upper side of the long lens 101 was generated with the bottom side of the long lens 101 contacting with the reference board. When the temperature was raised, the long lens was warped upwards, and when a some amount of time elapsed, the temperature in the long lens became uniform, and the long lens restored the original shape.

In a case where the long lens 101 is mounted in the image forming apparatus, heat from the polygon scanner, and heat by fixing operation are generated, a curve and/or inclination of the scanning line is generated, and in a case of the tandem type, a color difference is generated.

Figure 10:
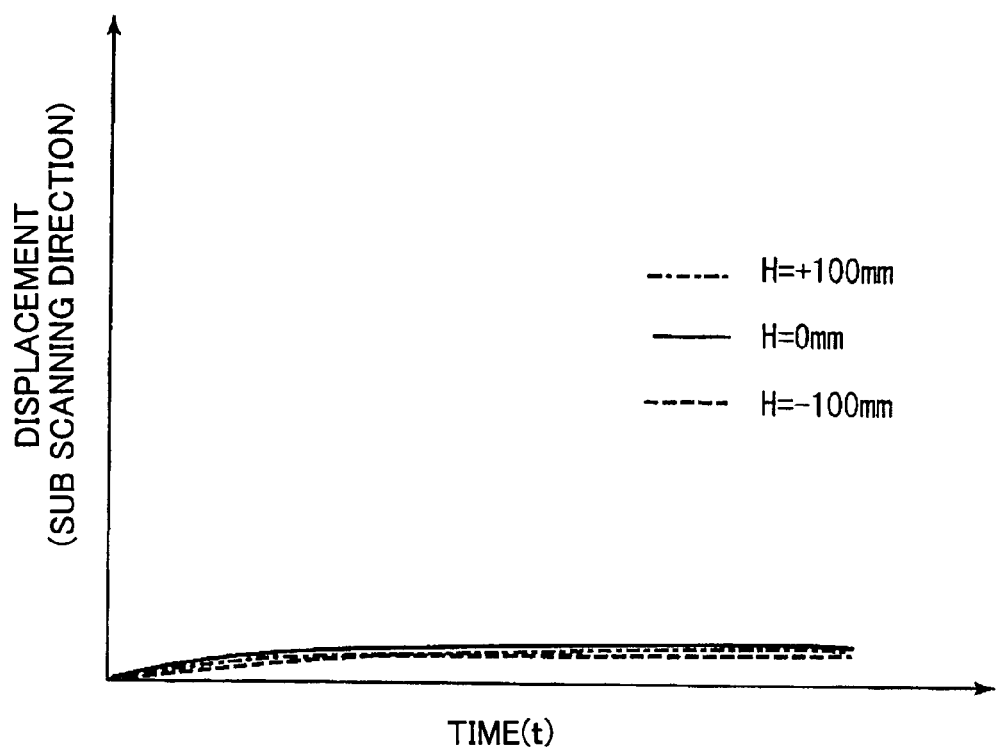
FIG. 10 shows a result obtained by correcting the position displacement shown in FIG. 9.

FIG. 10 shows a result of measuring deformed amounts in time series at the three points of the resin-made long lens 101 in the same condition of FIG. 9, but in the case of FIG. 10, the scanning line curve/inclination adjusting/correcting means was used. As understood from FIG. 10, deformation suppressing effect is sufficient.

Figure 11:
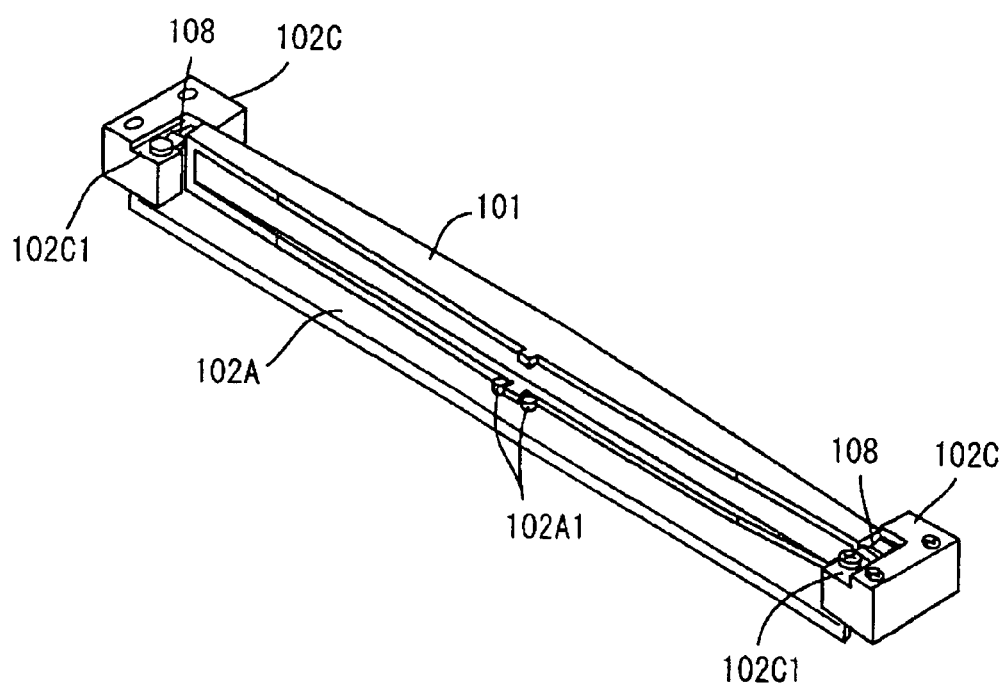
FIG. 11 shows a set configuration of the long lens.
Figure 12:
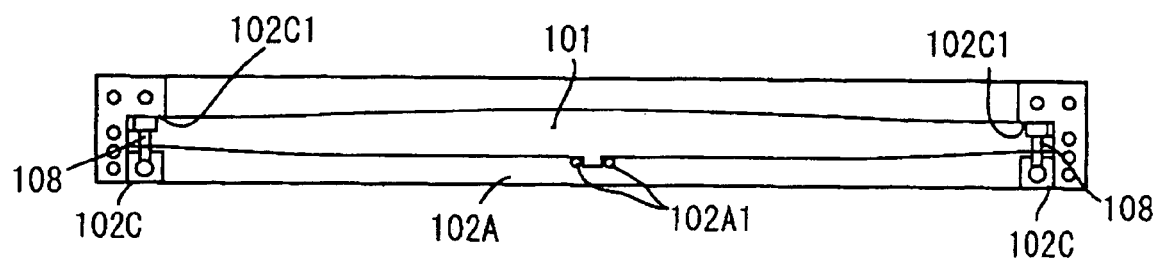
FIG. 12 is a plan view of the set configuration shown in FIG. 11.
Figure 13A:
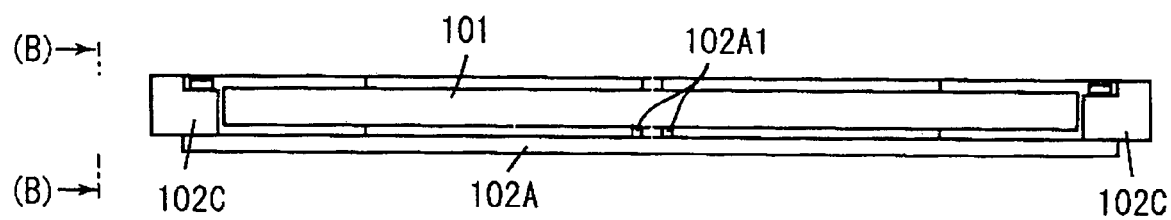
FIG. 13A is a front view taken from the direction indicated by the arrow (13) of FIG. 12.
Figure 13B:
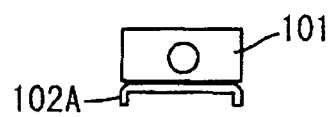
FIG. 13B is a side view taken from the direction indicated by the arrow (B) of FIG. 13A.

FIGS. 11 through 13 show the long lens 101 installed to the shape maintaining means 102. As shown in FIG. 11, both ends of the long lens 101 in the longitudinal direction are attached to step parts as an optical axis direction striking parts formed on the gap maintaining parts 102C, respectively. The long lens 101 is fixed to the step parts 102C1 by pressing springs 108. In FIGS. 11 through 13, the upper side metal plate member 102B is not shown.

The lower side metal plate member 102A and the upper side metal plate member 102B that sandwich the long lens 101 are fixed to the gap maintaining members 102C by attaching screws 107 so as to be integrated to the gap maintaining members 102C. Accordingly, the long lens 101 fixed to the gap maintaining members 102C can be moved integrally with the shape maintaining means 102 at the time of moving the shape maintaining means 102 in the β direction and the γ direction.

According to the above-described configuration in the first embodiment, by operating the γ adjusting screws 105 and the β adjusting screws 106 of the shape maintaining means that functions as shape correcting means, initial adjustment for the scanning line curve is performed with respect to the long lens integrated with the gap maintaining members 102C of the shape maintaining means 102.

Furthermore, in accordance with a detection result from the position detection means or the color difference detection means shown in FIG. 5, driving control of the liquid crystal deflection element 26 is performed so that the scanning line curve due to the time lapse shape change including temperature change characteristics of the long lens can be adjusted (corrected) without generating an adverse effect in the liquid crystal deflection element 26. Accordingly, at the time of initial adjustment, the scanning line curve/inclination can be corrected by the shape maintaining means 102, and the β adjusting screws 106 and the γ adjusting screws 105 of the shape maintaining means 102. Furthermore, the scanning line curve and inclination due to time-lapse such as the temperature change can be corrected by the liquid crystal deflection element 26.

The above-described scanning line curve/inclination adjusting/correcting means for adjusting/correcting the scanning line curve and/or inclination may be applied to the light scanning device 20 as the tandem optical system shown in FIG. 1. A configuration of the scanning line curve/inclination adjusting/correcting means for application to the tandem optical system of FIG. 1 is shown in FIG. 14.

Figure 14:
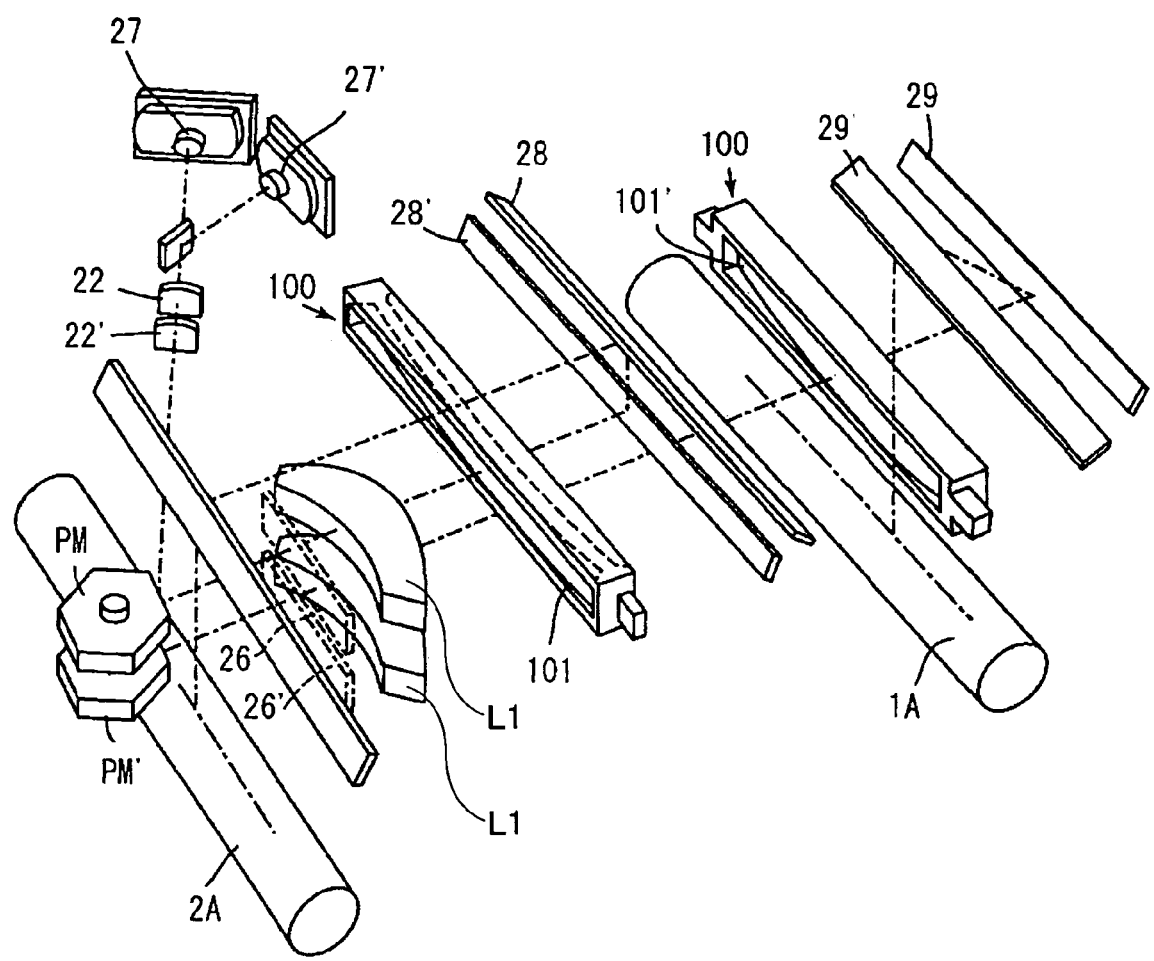
FIG. 14 is a perspective view showing an optical system that includes the scanning line curve correcting means and the scanning line inclination correcting means in the light scanning device for a plurality of scanned surfaces.

As shown in FIG. 14, in the light scanning device 20 as the tandem optical system, the basic structure shown in FIG. 1 for a plurality of photoconductive drums 1A, 2A, 3A and 4A on which the respective color images are formed is used. Furthermore, in FIG. 14, the integral type scanning line curve/inclination adjusting/correcting means 100 for adjusting/correcting the scanning line curve and/or inclination are applied to the long lenses 101 and 101'. Moreover, the liquid crystal deflection elements 26 and 26' are provided between the polygon mirrors PM and PM' as the deflectors and the first fθ lenses L1 as the scanning lenses, respectively. In FIG. 14, the reference numbers 27 and 27' designate a first scanning semiconductor laser, and a second semiconductor laser, respectively, the reference numbers 28 and 28' designate first scanning reflection mirrors, respectively, and the reference numbers 29 and 29' designate second scanning reflection mirrors. Further, in FIG. 14, the optical members after the liquid crystal deflection elements and 26' in the optical path constitute the second part 24 of the imaging system of FIG. 1 for the respective photoconductive drums.

By using the above-described light scanning device as the tandem optical system, it is possible to suppress the shape change of the long lenses 101 and 101' due to environmental temperature change, and to correct the scanning line curve and/or inclination due to the deformation of the long lenses 101 and 101'. Furthermore, by using the liquid crystal deflection elements 26 and 26', it is possible to further appropriately adjust a light spot position in a state where an amount of the scanning line curve and/or inclination has been reduced by the scanning line curve/inclination adjusting/correcting means for adjusting/correcting the scanning line curve and/or inclination.

According to the first embodiment, initial adjustment can be performed by using the scanning line curve/inclination adjusting/correcting means so as to correct the scanning line curve and the scanning line inclination. Furthermore, even when environmental change such as temperature raise in the light scanning device occurs (optical characteristics change caused by time lapse occurs), the scanning line curve and inclination can be corrected by correcting the deformation such as warping of an imaging element (optical element), for example. Accordingly, it is possible to maintain good optical characteristics about the image displacement and the color difference) regardless of time lapse.

Further, according to the first embodiment, by electrically controlling the liquid crystal deflection element, the scanning line curve and inclination caused by the environmental change can be corrected with high accuracy by feedback or open loop. When an adjustment amount larger than tens of microns is required, the posture control of the optical element such as the long lens is performed, so that reasonable control can be performed without giving an excessive load to the liquid crystal element.

In addition, according to the first embodiment, the relative position between the shape maintaining means and the long lens can be determined such that the shape maintaining means and the long lens are integrated with each other. The scanning line curve and inclination can be controlled together, and the configuration of this is simple. Moreover, in this configuration, an adjustment operation can be focused on one optical element, so that the component cost and the assembling cost can be reduced.

Further, according to the first embodiment, only by providing a thin part, the correcting of the scanning line curve and the correcting of the scanning line inclination can be performed independently of each other, with high accuracy. Furthermore, this configuration using the thin part is strong against vibration, so that it is possible to stably obtain an image that does not have an image displacement and a color difference.

Furthermore, according to the first embodiment, by making the linear expansivity of the long lens same as that of the supporting body that supports the long lens, it is possible to minimize the change of the compressing stress at the supporting body caused by the environmental temperature change. In this manner, the scanning line curve and inclination can be corrected. Therefore, it is possible to suppress change of the beam spot diameter and the magnification at the side of the long lens when the compressing stress is changed.

When the light scanning device is applied to the tandem type multi-color image forming apparatus using the electrophotographic process, it is possible to correct the scanning line curve and inclination of each photoconductive body. Accordingly, it is possible to improve image density, reduction of consuming power, vibration noise reduction, and generated heat reduction, resulting in reduction of environmental burden.

Next, a second embodiment of the present invention will be described.

Figure 15:
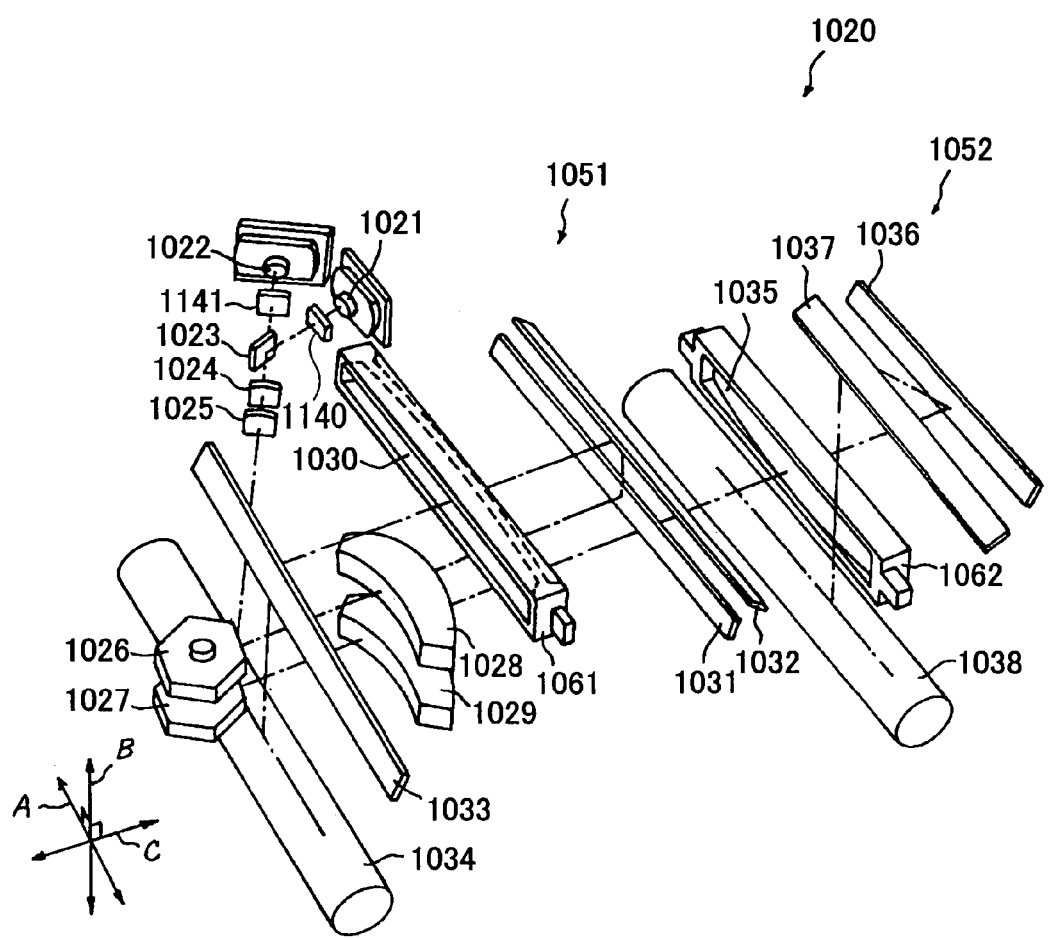
FIG. 15 is a perspective view showing an outline of a light scanning device according to a second embodiment of the present invention that is mounted in an image forming apparatus.

FIG. 15 shows a light scanning device 1020 that is a tandem type writing optical system. The light scanning device 1020 uses a scanning lens, but may use either of the scanning lens and a scanning mirror. For simplicity, only two stations are shown in FIG. 15. However, four stations may be provided symmetrically with respect to polygon mirrors 1026 and 1027 as deflectors. The image forming apparatus adopts the four stations. The image forming apparatus 1 can form a color image. In a case of forming a color image, the light scanning device 1020 is used for forming the color image.

The light scanning device 1020 includes two LD units 1021 and 1022 as light sources. The light scanning device 1020 images (focuses) laser beams emitted from the respective LD units 1021 and 1022 on respective photoconductive bodies 1034 and 1038 that are the photoconductive drums as image holding bodies. For this operation, the light scanning device 1020 includes optical element groups 1051 and 1052 corresponding to the LD units 1021 and 1022, and the photoconductive drums 1034 and 1038, respectively. In this configuration, the light scanning device 1020 is configured to correspond to the photoconductive bodies 1034 and 1038. Each of the photoconductive bodies 1034 and 1038 may correspond to any one of the above-described photoconductive drums 1A through 4A.

The LD units 1021 and 1022 are provided at different heights in a sub scanning direction that is approximately vertical direction. The light beam from the upper side LD unit 1021 passes though a writing start position adjusting means 1140, and reflected by a midway reflection mirror 1023 to the same direction in which the light beam from the lower side LD unit 1022 runs. On the other hand, the light beam from the lower side LD unit 1022 passes through writing start position adjusting means 141, and then passes through the reflection mirror 1023. Thereafter, the light beams from the LD units 1021 and 1022 pass through cylindrical lenses 1024 and 1025 to be focused as a line shape in the vicinity of reflection surfaces of the polygon mirrors 1026 and 1027 that are separated from each other by a predetermined distance in the upward and downward directions.

Each of the LD units 1021 and 1022 includes at least a semiconductor laser and a collimating lens. Each of the writing start position adjusting means 1140 and 1141 includes a wedge-shaped prism 1101 as light refraction members shown in FIGS. 21 and 22. When the respective light beams from the LD units 1021 and 1022 pass through the writing start position adjusting means 1140 and 1141, the respective light beams penetrate through the writing start position adjusting means 1040 and 1041, respectively. The polygon mirrors 1026 and 1027 may be connected to polygon motors (not shown) to be rotated.

Shapes of the light beams deflected by the polygon mirrors 1026 and 1027 are adjusted by the first scanning lenses 1028 and 1029 that may be integrally formed or put on one another. Then; second scanning lenses 1030 and 1035 having fθ characteristics adjust the shapes of the light beams to be a predetermined beam spot diameter. In this manner, the formed light spots scan surfaces of the photoconductive bodies 1034 and 1038. After the first scanning lenses 1028 and 1029, the respective light beams run along different optical paths to be guided to the photoconductive bodies 1034 and 1038, respectively.

The upper side light beam that penetrates through the first scanning lens 1028 is reflected by a reflection mirror 1031 by a right angle to an upward direction, and is again reflected by a reflection mirror 1032 by a right angle so that the upper side light beam enters the second scanning lens 1030 that is a long plastic lens. Then, the upper side light beam is reflected by a reflection mirror to a downward direction B so that the upper side light beam can scan the photoconductive body 1034 in the main scanning direction A.

Meanwhile, the lower side light beam that penetrates through the first scanning lens 29 does not enter the reflection mirror 32, but enters the second scanning lens 1035 that is a long plastic lens. Thereafter, the lower side light beams is reflected by two reflection mirrors 1036 and 1037 to scan the photoconductive body 1038 in the main scanning direction A that is separated from the photoconductive body 1034 by a predetermined pitch. In FIG. 15, the arrow C designates a direction of an optical axis of the second scanning lenses 1030 and 1035.

Figure 23:
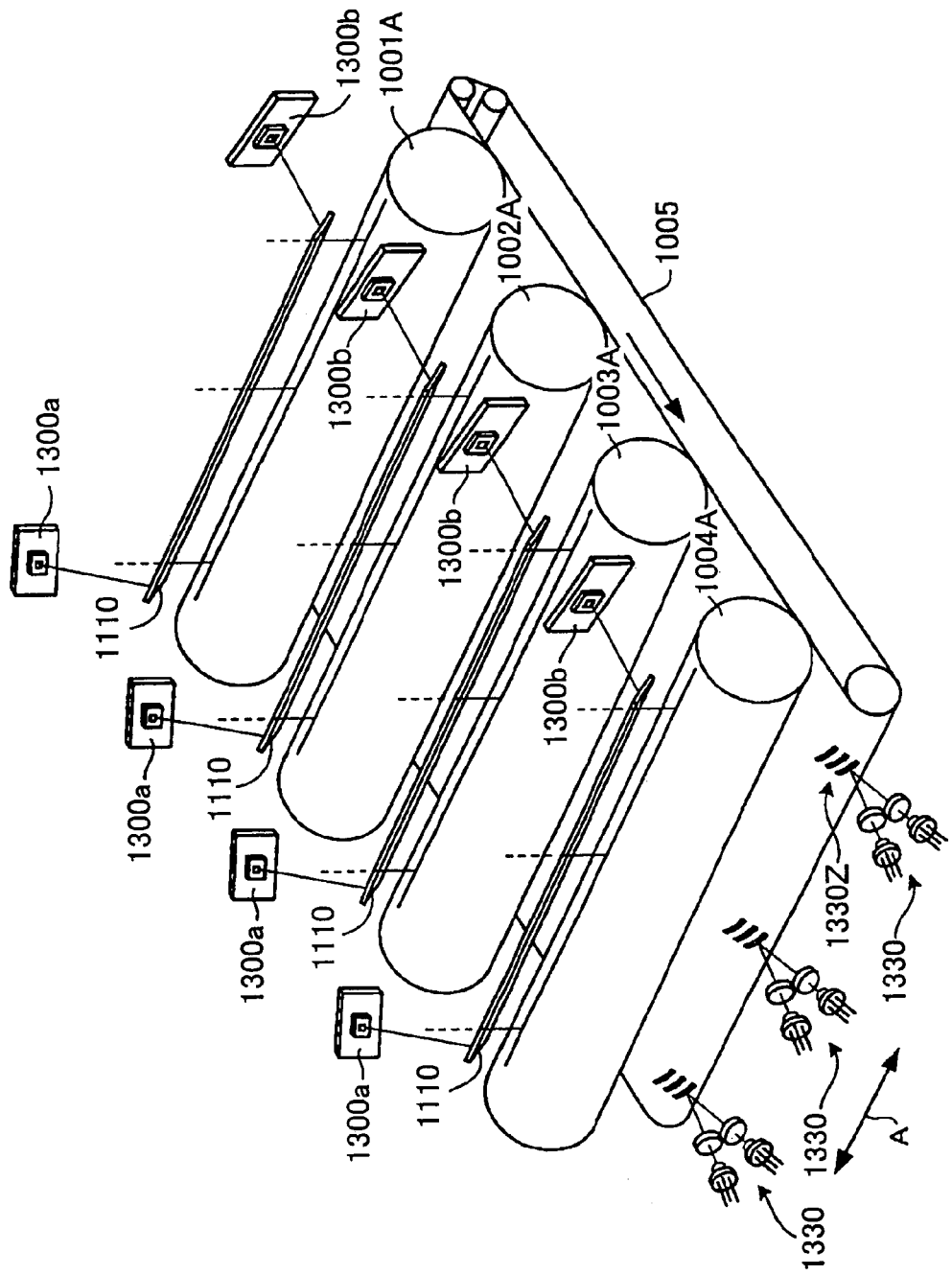
FIG. 23 shows arrangement of position displacement detection means according to the second embodiment of the present invention.

As shown in FIG. 23, a reflection mirror 1110 is provided directly above each of the photoconductive bodies 1A through 4A. Both end parts of the reflection mirror 1110 corresponding to parts outside an effective image region of each of photoconductive bodies 1A and 4A reflects the light beam. On the other hand, the light beam penetrates through a part of the reflection mirror 1110 corresponding to the effective image region of each of the photoconductive bodies 1A through 4A. The light beams reflected by the reflection mirror 1110 enter beam spot position detection means 1300a and 1300b, respectively, having a function as position displacement detection means. The beam spot position detection means 1300a is provided for detecting a writing start position, and the beam spot position detection means 1300b is provided for detecting writing end position.

The optical element group 1051 includes a plurality of optical elements, that is, the prism 1101, the reflection mirror 1023, cylindrical lens, the polygon mirror 1026, the first scanning lens 1028, the reflection mirrors 1031 and 1032, the second scanning lens 1030, the reflection mirror 1033, and the reflection mirror 1110. Meanwhile, the optical element group 1052 includes a plurality of optical elements, that is, the prism 1101, the cylindrical lens 1025, the polygon mirror 1027, the first scanning lens 1029, the second scanning lens 1035, the reflection mirrors 1036 and 1037, and the reflection mirror 1110.

The light scanning device 1020 includes a holding member 1061 that holds the second scanning lens 1030 of the optical element system 1051, a holding member 1062 that holds the second scanning lens 1035 of the optical element system 1052. The holding members 1061 and 1062 have the approximately same structure, and the second scanning lens 1030 held by the holding member 1061, and the second scanning lens 1035 held by the holding member 1062 have the approximately same structure. Accordingly, in the following, the holding member 1061 and the second scanning lens 1030 will be described as a representative.

Figure 16:
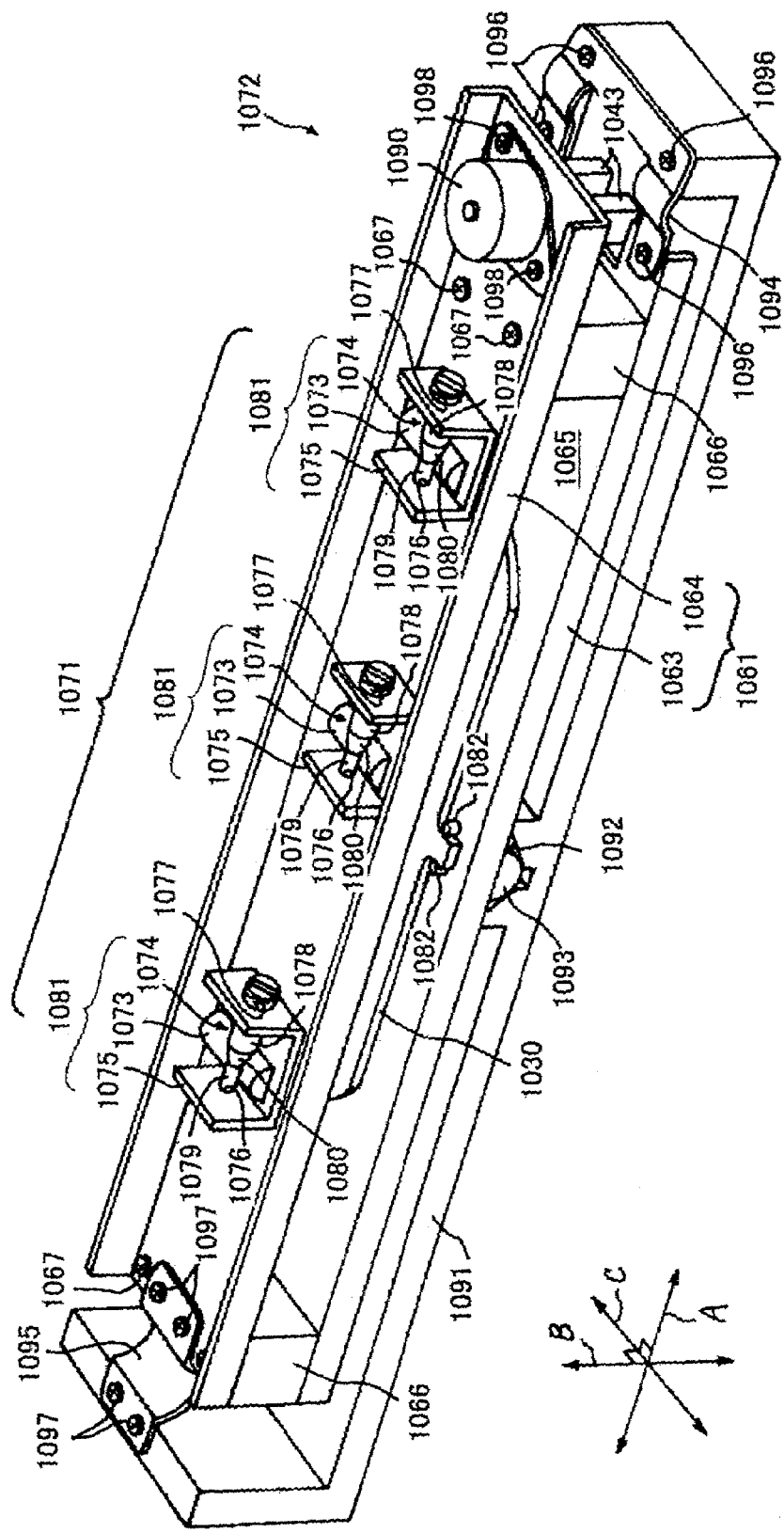
FIG. 16 shows an important part of the light scanning device of FIG. 15.

As shown in FIG. 16, the light scanning device 1020 includes scanning line curve correcting means for correcting a curve of the scanning line on the photoconductive body 1034 by correcting the second scanning lens 1030 in the sub scanning direction. The light scanning device 1020 further includes scanning line inclination correcting means for correcting an inclination of the scanning line on the photoconductive body 1034 by inclining the entire second scanning lens 1030.

As described above, for decreasing cost, plastic is adopted for making resin element for the optical system. In the case of the tandem type writing system, the number of optical components is large, so that employing plastic decreases cost greatly. Also in the second embodiment, the above-mentioned optical elements are made of plastic.

However, warping of the long plastic optical element is easily warped in the direction B orthogonal to the longitudinal direction thereof (the main scanning direction) due to a molding condition and a remaining stress. An amount of the warping reaches tens of microns, and the warped amount and warped direction are scattered due to a mold difference, so that it was very difficult to perform alignment between the respective stations for the scanning line curve and inclination. In the second embodiment, in order to resolve such a problem, the scanning line curve correcting means 1071 and the scanning line inclination correcting means 1072 are provided.

A part of members constituting the scanning line curve correcting means and a part of the members constituting the scanning line inclination correcting means 1072 are integrated with the holding member 1061. Further, the scanning line curve correcting means 1071 and the scanning line inclination correcting means 1072 are also provided at the second scanning lens 1035. Similarly, a part of members constituting the scanning line curve correcting means and a part of the members constituting the scanning line inclination correcting means 1072 are integrated with the holding member 1062.

The holding member 1061 includes a supporting member 1063 that is long in the main scanning direction A, and supports the second scanning lens 1030 from the sub scanning direction. The holding member 1061 further includes a sandwiching support member 1064 that sandwiches and supports the second scanning lens 1030 in cooperation with the supporting member 1063. The supporting member 1063 contacts against second scanning lens 1030, and includes a reference surface 1065 as a position reference for the second scanning lens 1030 in the holding member 1061.

Each of the supporting member 1063 and the sandwiching support member 1064 is made of a metal plate and bent so as to have a U shape in a section thereof and have strength. A plane surface of each of the supporting member 1063 and the sandwiching support member 1064 contacts against the second scanning lens 1030. In the holding member 1063, the plane that contacts against the second scanning lens 1030 constitutes the reference surface 1065. A part of the second scanning lens 1030 is sandwiched between pins 1082 protruding from and provided on the reference surface 1065 so that the second scanning lens 1030 is fixed to the supporting member 1063 at the reference surface 1065.

A rectangular pillar 1066 that has a height approximately equal to thickness of the second scanning lens 1030 is provided at each of both end parts of the second scanning lens 1030 in the longitudinal direction thereof (i.e., the directions A). The rectangular pillars 1066 are provided for maintaining a gap between the supporting member 1063 and the sandwiching support member 1064. In a state where the second scanning lens 1030 is sandwiched between the supporting member 1063 and the sandwiching support member 1064, the rectangular pillars 1066 are fixed to the supporting member 1063 and the sandwiching support member 1064, respectively, by screws 1067. The rectangular pillars 1066, the supporting member 1063, and the sandwiching support member 1064 constitute the holding member 1061. In FIG. 16, as for the screws 1067, only the screws 1067 for fixing between the sandwiching support member 1064 and the rectangular pillars 1066 are shown.

Figure 17:
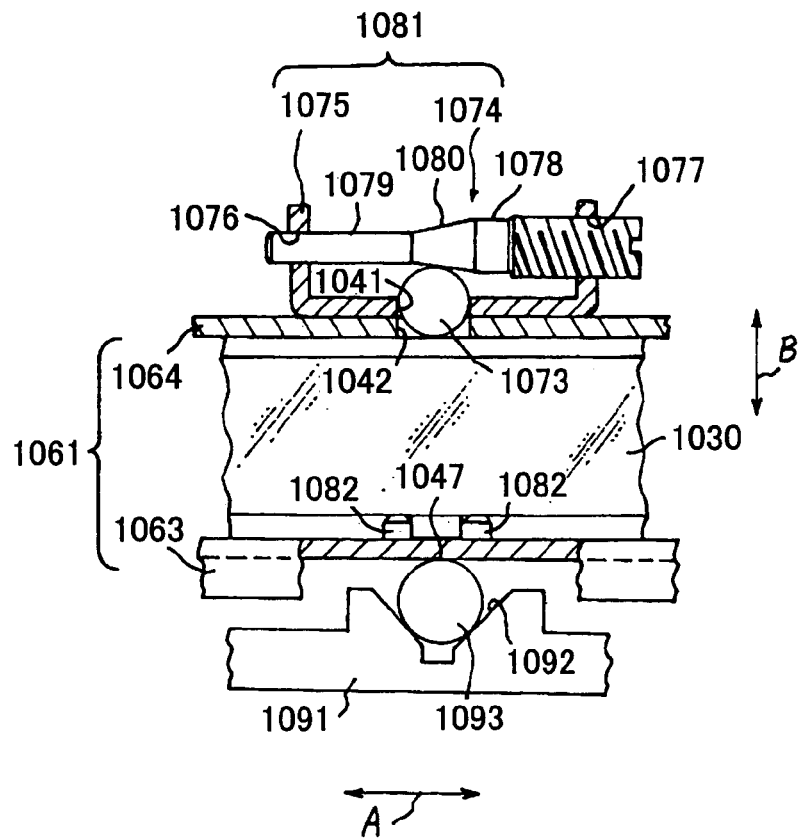
FIG. 17 is a sectional front view of the important part of FIG. 16.

Members constituting the scanning line curve correcting means 1071 are integrated with the sandwiching support member 1064. The scanning line curve correcting means 1071 includes a plurality of scanning line curve correcting mechanisms 1081 arranged in the main scanning direction A. As shown in FIGS. 16 and 17, each scanning line curve correcting mechanism 1081 includes a pressing member 1073, and a pressing operation member 74 that presses the pressing member 1073 against the second scanning lens 1030. Each scanning line curve correcting mechanism 1081 further includes a U-shaped bracket 1075 that is fixed on an upper surface of the sandwiching support member 1064 by spot welding, and supports the pressing operation member 1074.

Each pressing member 1063 presses the second scanning lens 1030 from the opposite side to a surface of the second scanning lens 1030 that contacts against the supporting member 1063. A guide hole 1076 is formed on one of both standing parts of the bracket 1075, and a tap of which opening size is larger than that of the guide hole 1076 is formed on the other of the both standing parts of the bracket 1075. The pressing operation member 1074 includes a large diameter part 1078, a small diameter part 1079, and a tapered part 1080 that connects the large diameter part 1078 to the small diameter part 1079. A screw thread is formed on the large diameter part 1078 so that the pressing operation is formed as a screw.

The small diameter part 1079 of the pressing operation part 1074 penetrates through the guide hole 1076, and the large diameter part 1078 of the pressing operation part 1074 penetrates through the tap 1077 to engage the tap 1077. In this manner, the pressing operation member 1074 can be supported by the bracket such that the pressing operation member 1074 can move in an approximately axial direction A thereof. Thus, the pressing operation member 1074 is integrated with the sandwiching support member 1064 via the bracket 1075. Accordingly, the pressing operation member 1074 that is a part of the scanning line curve correcting mechanism 1081, i.e., the scanning line curve correcting means 1071 is integrated with the sandwiching support member, i.e., the holding member 1061.

The pressing member 1073 has a cylindrical shape, and an axial direction of the pressing member 1073 is parallel to an optical axis direction of the second scanning lens 1030. For the shape of the pressing member 1073, a cut part 1041 is formed on the bracket 1075, and a hole 1042 is formed on the sandwiching pressing member 1064. The pressing member is inserted in the cut part 1041 and the hole 1042 to directly contact with the second scanning lens 1030. Alternatively, the pressing member 1073 may indirectly contact with the second scanning lens 1030 via an interposing plate.

The tapered part of the pressing operation member 1074 contacts against the pressing member 1073, and the pressing operation member is rotated by a driver and the like so that the pressing operation member 1074 is moved in the axial direction thereof approximately orthogonal to the axial direction of the pressing member 1073. In this manner, a position where the pressing operation member 1074 presses the pressing member in the direction B is changed. Accordingly, at a position where the pressing member 1073 contacts against the second scanning lens 1030, a position of the second scanning lens 1030 is changed. Therefore, at the scanning line curve correcting mechanism 1081, the pressing operation member 1074 is rotated so that the scanning line curve correcting means 1071 can correct, on the photoconductive body 1034, the curve of the scanning line formed by the light beam that passes through the second scanning lens 1030.

The curve of the scanning line on the photoconductive body 1034 is generated by accumulated error of generated warping of the second scanning lens 1030, the reflection mirror 1023, the cylindrical lens 1024, the polygon mirror 1026, the first scanning lens 1028, the reflection mirrors 1031 and 1032, and flatness of the second scanning lens 1030, and so on. However, even if the scanning line is curved by these causes, the scanning line curve correcting means 1071 bends only the second scanning lens 1030 in the sub scanning direction so as to resolve the scanning line curve.

For example, when the second scanning lens 1030 is warped upwards, the pressing member of the scanning line curve correcting mechanism 1081 provided at the center part of the second scanning lens 1030 is pressed downwards to press the second scanning lens 1030. On the other hand, when the second scanning lens is warped downwards, the pressing members of the scanning line curve correcting mechanisms 1081 provided at the both end parts of the second scanning lens 1030 is pressed downwards to press the second scanning lens 1030. In reality, an amount of the scanning line curve is about several tens μm, so that the scanning line curve can be corrected without deforming the supporting member 1063 and the sandwiching support member 1064.

Figure 18:
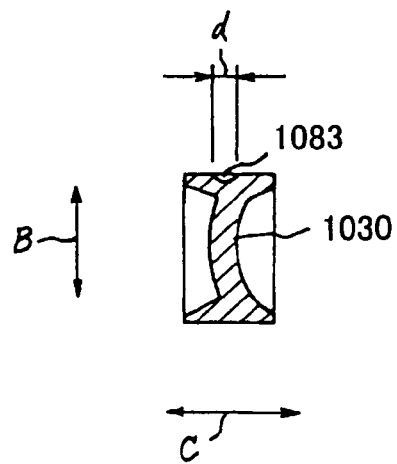
FIG. 18 is a sectional side view of a held optical element provided in the light scanning device of FIG. 15.
Figure 19:
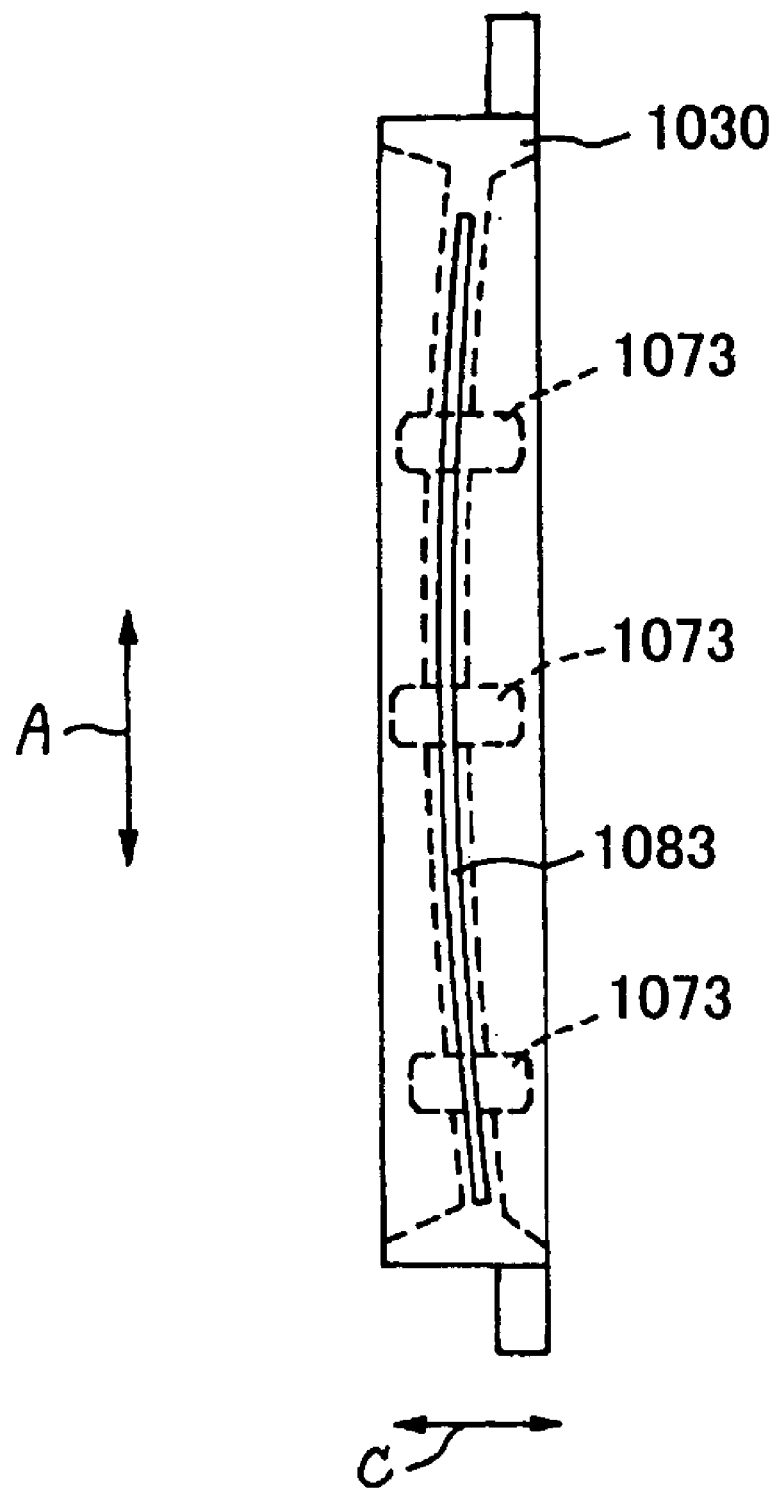
FIG. 19 is a plan view showing an outline shape of the held optical element provided in the light scanning device of FIG. 15.

As shown in FIG. 18, at the time of forming the second scanning lens 1030 by molding, a depression part 1083 is formed on the surface of the second scanning lens 1030 that contacts with the pressing member 1073. The depression part 1083 has a width "d" along the thickness of the second scanning lens 1030 in the optical axis direction C. The length of the pressing member 1073 in the optical axis direction C is longer than the width "d" of the depression part 1083 so that contact between the. pressing member 1073 and the second scanning lens 1030 can become stable.

Furthermore, the axial direction of the pressing member 1073 is parallel to the optical axis of the second scanning lens 1030. Accordingly, even when an environmental temperature changes, and the second scanning lens 1030 is contracted or expanded, the pressing member 1073 is rotated, or slides on the surface of the second scanning lens 1030. As a result, the pressing member 1073 does not prevent the expansion or contraction of the second scanning lens in the direction A so that change of the optical characteristics of the second scanning lens 1030 can be suppressed. Moreover, in a case where it is intended that an amount and direction of the warping (the scanning line curve) is made uniform between the respective stations, the scanning line curve correcting means deforms the second scanning lens 1030 together with the supporting member 1063, and the sandwiching support member 1064 so that an adjustment margin can be improved, facilitating the adjustment.

As shown in FIG. 16, scanning line inclination correcting means 1072 includes a stepping motor 1090 as an actuator that is integrated with the sandwiching support member 1064, and drives the holding member 1061 to be tilted. That is, the stepping motor functions as holding member tilting means and driving means. The scanning line inclination correcting means 1072 further includes inclination detecting means (not shown) for detecting an inclination of the scanning line. The scanning line inclination correcting means 1061 further includes a CPU as control means (not shown) that causes the stepping motor 1090 to tilt the holding member 1061 in accordance with a position displacement amount of the scanning line detected by the inclination detecting means so that the entire second scanning lens 1030 can be tilted to correct the scanning line inclination.

In FIGS. 16 and 17, the reference number 91 designates a long lens holder integrated with a housing (not shown) of the light scanning device 1020. The long lens holder 1091 is a fixed member that supports the holding member 1061. The long lens holder 1091 may be the housing itself of the light scanning device 1020. The long lens holder 1091 includes a V-shaped groove 1092 formed such that the groove 1092 extends in the direction C. The groove 1092 corresponds to the center of the second scanning lens 1030.

The scanning line inclination correcting means may include a rolling member 1093 that is long in the direction C, and that functions as a supporting point. The holding member 61 is supported by the long lens holder 1091 via the roller member such that the holding member 61 can move. Accordingly, a contacting part between the roller member 1093 and the holding member 1061 functions as the supporting point 1047. The supporting point 1047 is positioned at the center of the second scanning lens 1030 in the direction A, and is positioned near the optical axis of the second scanning lens 1030.

If the long lens holder 1091 supports the holding member 1061 only via the roller member 1093, the holding member 1061 is unstable. The scanning line inclination correcting means 1072 includes a leaf spring 1094 that is an elastic member configured integrally with the supporting member 1063 and the long lens holder 1091. The scanning line inclination means 1072 further includes a leaf spring 1095 that is an elastic member 1095 configured integrally with the sandwiching member 1064 and the long lens holder 1091. The scanning line inclination means 1072 supports the holding member such that the holding member 1061 can be moved relative to the long lens holder 1091 in the direction of correcting the scanning line inclination. An elastic force presses the holding member 1061 against the roller member 1093 to stabilize the holding member 1061 to the long lens holder 1091.

Figure 20:
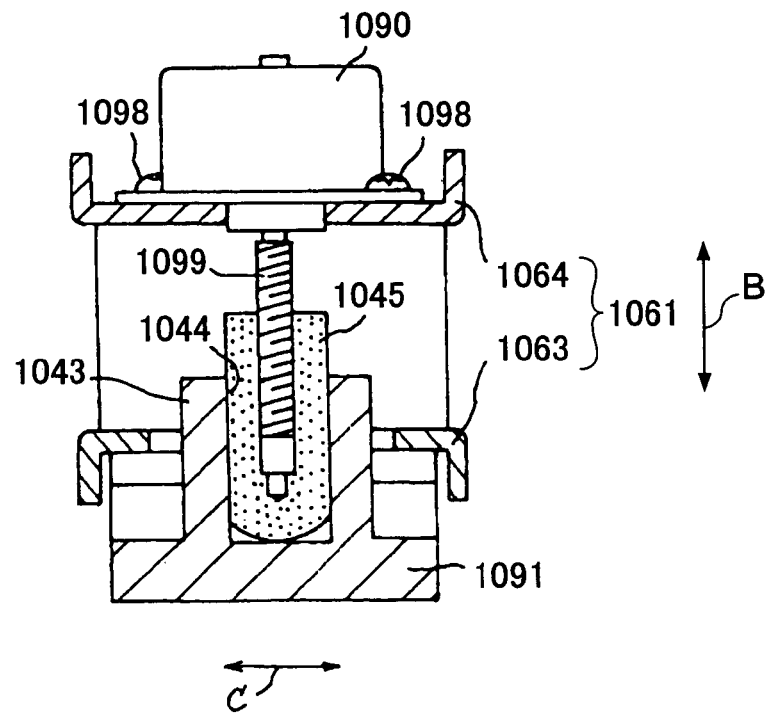
FIG. 20 is a sectional side view of the important part of the light scanning device shown in FIG. 16.

By means of screws, the leaf spring 1094 is integrated with the supporting member 1063 and the long lens holder 1091. By means of screws 1097, the leaf spring 1095 is integrated with the sandwiching support member 1064 and the long lens holder 1091. As shown in FIGS. 16 and 20, by means of screws 1093, the stepping motor 1090 is integrated with the sandwiching support member 1064. In this example, the stepping member 1090 is provided at the side of the holding member 1061 that is driven by the stepping motor 1090. However, the stepping motor 1090 may be provided at the long lens holder 1090, or may be provided at the housing of the light scanning device 1020.

As shown in FIG. 20, the stepping motor 1090 includes a stepping motor shaft 1099. A protruding part 1043 is provided on an upper surface of the long lens holder 1090. A groove part 1044 is defined by an inside of the protruding part 1043. A nut of which leading edge has a spherical shape and of which section has an elliptic shape engages the groove 1044. The stepping motor shaft 1099 has a male screw thread, and a leading edge part of the stepping motor shaft 1099 engages the nut 1045. The nut 1045 engages the groove 1044 to be fixed, and even at the time the stepping motor shaft 1099 rotates, the nut 1045 is not moved.

Inclination detection means is photo sensor that reads a test pattern formed at a region of the transfer belt 5 where paper does not pass. As for the test patter, toner image having the same shape is formed on each of the photoconductive bodies 1A through 4A, and these toner images are transferred to the region of the transfer belt 1005 where the paper does not pass, at respective timings by which the these images overlap each other on the transfer belt 1005. However, when the scanning line is inclined, the test patters formed by the photoconductive bodies 1A through 4A are displaced (shifted) from each other. The inclination detection means detects this displacement of the test patterns.

Based on the position displacement of the scanning line detected by the inclination detection means, a CPU calculates the number of steps to be driven by the stepping motor 1090, and drives the stepping motor 1090. The test patterns are formed at an appropriate timing. The formation of the test patterns are used in feedback control performed by the CPU based on a detection signal of the inclination detection means. The test patterns formed on the transfer belt 5 are removed by the cleaning device 13.

Figure 22:
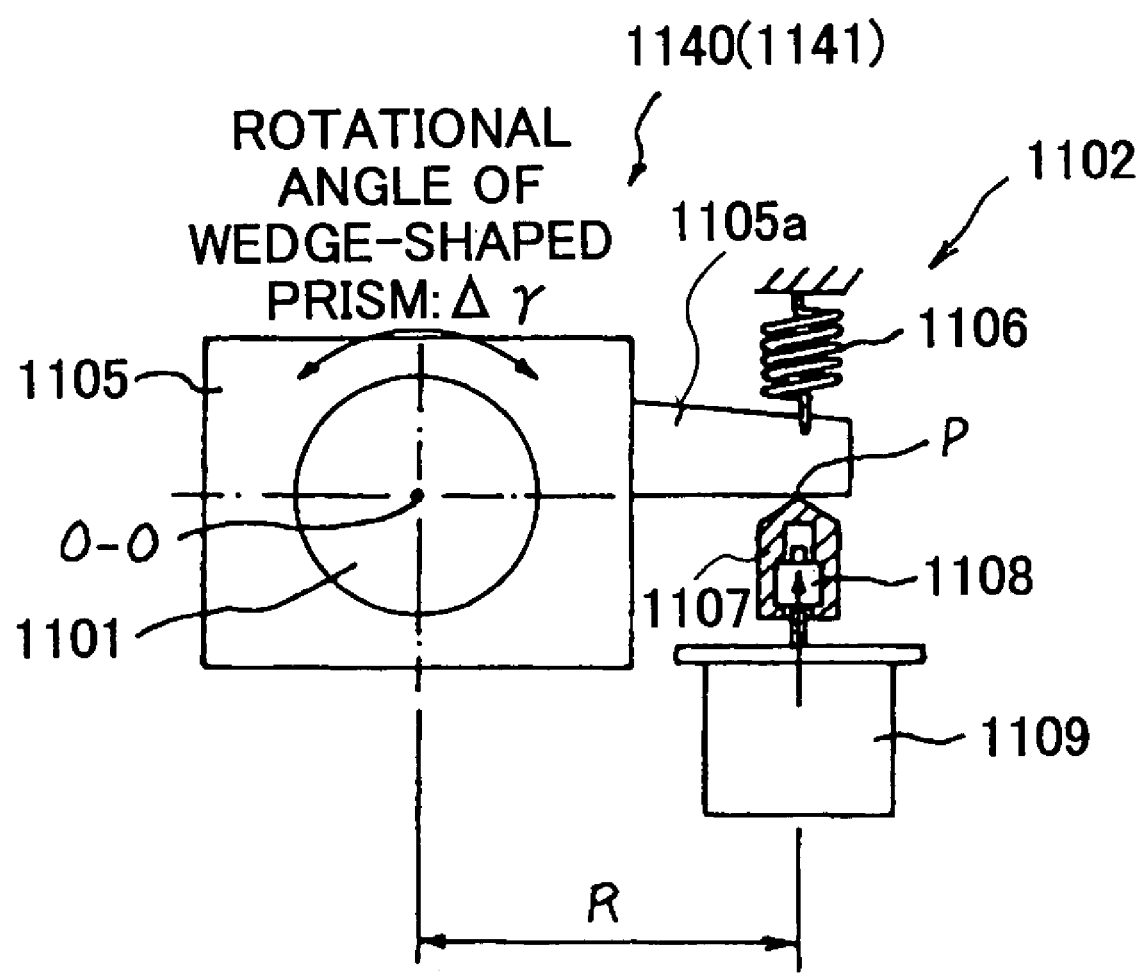
FIG. 22 is a front view showing the writing start position adjusting means of FIG. 21.

According to the inclination correcting means having the above-described configuration, when based on a detection result of the inclination detection means, the CPU drives the stepping motor 1090 to rotate the stepping motor shaft 1099, the holding member 1061 is moved relative to the unmoved member 1091 against spring forces of the leaf springs 1094 and 1095 so that the holding member 1061 is inclined by rotating around the support point 1047 in the γ direction shown in FIG. 22 as Δγ and the arrow. Based on the detection result of the inclination detection means, the CPU performs the feedback control to drive the stepping motor 1090, so that the position displacement of the scanning line, specifically, the inclination of the scanning line can be resolved promptly.

Since the support point 1047 is positioned near the optical axis of the second scanning lens 1030, it is possible to suppress the optical characteristics change when correcting the scanning line inclination by tilting the second scanning lens 1030. Independent of each other, the scanning line curve correcting means 1071 and the scanning line inclination correcting means correct the scanning line curve and the scanning line inclination so that each of the scanning line curve and inclination can be separately corrected.

As described above, in order to correct the scanning line curve and the scanning line inclination, the position of the scanning line at each of the scanning optical systems corresponding to the respective colors may be adjusted such that the displacement amount when putting the respective scanning line on top of one another on the transfer belt 5 can become zero. However, when correcting the respective scanning position positions corresponding to light beams of the four colors, if all of the four scanning positions are adjusted to the standard position, there is a possibility that the second scanning leans 1030 is wrongly rotated by a large amount, resulting in deterioration of the optical performance and the beam spot diameter. Furthermore, the number of the components and the cost are increased because the scanning line curve correcting means and the scanning line inclination means are provided for each of the beams of the four colors.

For this reason, in the light scanning device 1020, one of the four colors yellow Y, magenta M, cyan C, and black K is set as a standard color. The scanning positions of the scanning beams of the scanning optical systems other than the standard color are adjusted so as to approximately conform to the scanning position of the standard color. In other words, the scanning beams other the scanning beams corresponding to the standard color are made to conform with the scanning beam corresponding to the standard color. Thus, the relative positions of the scanning lines may be adjusted so that high reproductive performance for an image can be realized with the color tone change being sufficiently suppressed. In this manner, the necessary number of sets of the scanning line curve correcting means 1071 and the scanning line inclination correcting means 1072 becomes three to adjusts three scanning beams of the four scanning beams for yellow Y, magenta M, cyan C, and black K.

In this example, the standard color is black K. A color image can be formed basically by the three colors Y, C, and M. However, the black color is generally used in order to improve sharpness of a color image, resolution of a character image. Also in this example, the black color is used. By setting a black color as the standard color, the following advantage can be obtained.

The contrast of the black color higher than the contrasts of the other colors, so that the deterioration (caused by vibration and temperature change) of accuracy of the beam spot and the beam spot position for the black color affects the image more than the other colors. Accordingly, the rigidity of the optical components of the scanning optical system for the standard color can be strong so that this scanning optical system can be less affected from outside factors such as vibration and temperature change. Next to the black color, magenta M has the nature similar to that of the black color, so that magenta M may be set as the standard color. Additionally, yellow Y or cyan C may be set as the standard color.

With such a configuration, it is necessary to adjust three colors, so that the three sets of the scanning line curve correcting means 1071 and the scanning line inclination correcting means 1072 suffice. Furthermore, the adjustment points and the adjustment amount can be reduced, so that the relative color difference can be easily corrected even when the scanning lines are largely displaced from the scanning line of the standard color. Therefore, it is possible to correct the color difference less than one line, and to realize high color reproductive performance with the color tone change being sufficiently suppressed. With this configuration, by suppressing the relative color difference amount up to less than 30 μm, it, is possible to form the image in which the color difference is not noticeable.

Figure 21:
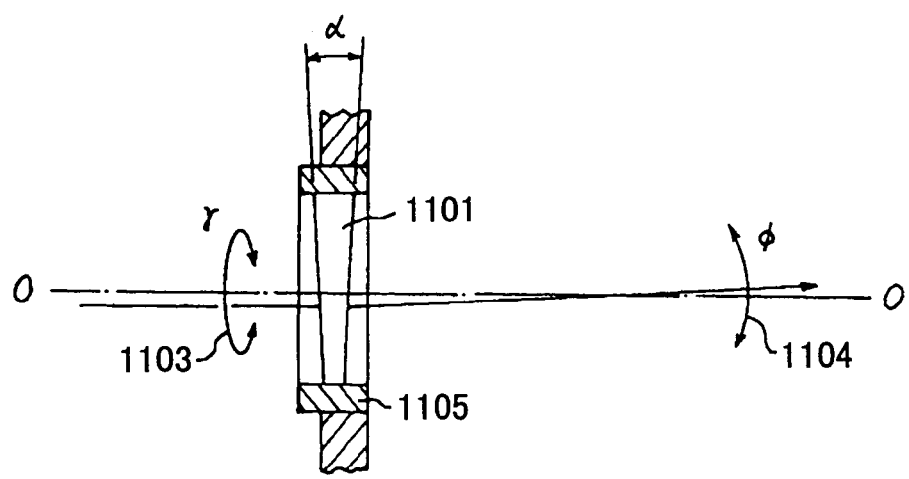
FIG. 21 is a sectional side view showing a principle of a correcting operation performed by writing start position adjusting means according to the second embodiment of the present invention.

As shown in FIGS. 21 and 22, the writing start position adjusting means 1140 includes a prism 1101, a stepping motor 1109 that rotates the prism 1101 for adjustment, and a lead screw type actuator 1102 that uses the stepping motor 1109 as a driving resource. Since the writing start position adjusting means 1140 and 1141 has the same configuration, only the writing start position adjusting means 1140 will be described as representative.

Principle of the beam spot position adjustment by the wedge-shaped prism 1101 in the sub scanning direction will be described. The prism 1101 is wedge-shaped. The symbol O—O designates the optical axis of the beam that penetrates through the prism 1101. By rotating the prism 1101 approximately around the optical axis O—O as indicated by the arrow 1103, it is possible to deflect the incident light beam within the range of the maximum deflection angle φ as indicated the arrow 1104. As a result, the beam spot position on the scanned surface can be adjusted in the sub scanning direction.

As shown in FIG. 21, by rotating the prism 1101 around the optical axis O—O, the light beam can be deflected within the range of the maximum deflection angle φ by the effect of the beam refraction. If an apex angle of the prism 1101 is α, and the refraction index of the wedge-shaped prism 1101 (prism glass material) is n, the maximum deflection angle can be expressed by the following equation (1):

$$\phi = (n-1) \times \alpha \quad (1).$$

Furthermore, in a case where the optical axis O—O conforms with the optical axis of the LD unit 1021 or 1022, if the focal length of the collimating lens 1150b is fc, the transversal magnification rate in the sub scanning direction is β, and the rotation amount of the prism 1101 is γ, the scanning position correcting amount P on the surface of the photoconductive body can be expressed by the following equation (2):

$$P = fc \times \beta \times \tan\phi \times \sin\gamma \quad (2).$$

Preferably, the apex angle α (deg) of the prism 1101 satisfies the following relation (3):

$$0.1 < \beta \times \tan[(n-1) \times \alpha] < 1.0 \quad (3)$$

In the relation (3), when the apex angle becomes higher than the upper limit, the wavefront aberration is generated in the light flux, the shape of the beam spot is disturbed (side lobe generation), or the beam spot diameter becomes large. When the apex angle a becomes lower than the lower limit, the sensitivity is badly deteriorated, so that it becomes necessary to rotate the prism 1101 by large amount. Accordingly, in this case, it is impossible to perform operation at high speed response at the time of correcting the optical characteristics change caused by the time lapse, or the like.

As shown in FIG. 22, the actuator 1102 includes a prism holder 1105 to which the prism 1101 is attached. An arm 1105a is formed at a part of the prism holder 1105. The prism holder 1105 is supported via the arm 1105a such that the prism holder 1105a can rotates around the optical axis O—O of the collimating lens. One end of a compressed spring 1106 contacts with an upper surface of a free end side of the arm 1105a. The compressed spring 1106 is positioned between the fixed members so that the compressed spring 1106 presses the arm 1105a. By this structure, the clockwise moment for driving the prism holder 1105 and the prism 1101 to rotate clockwise (in FIG. 9) around the optical axis O—O of the prism 1101 is applied to the prism holder 1105.

The rotation of the prism holder 1105 caused by this moment is received by a receiving member 1107 that contacts with a lower surface of the free end part of the arm 1105a. The receiving member 1107 is an axial member having a cylindrical shape. An upper side end part of the receiving member 1109 are formed as a circular cone as shown in FIG. 22. The contact point between the lower surface of the free end part of the arm 1105a and the receiving member 1107 is referred to as an application point P of the actuator.

Meanwhile, at the opposite side to the circular cone of the receiving member 1107, a nut 1108 is fixed (or, female screw thread is formed). A male screw (referred to as a lead screw) integrated with a lead screw of a rotational shaft of the stepping motor 1109 engages the nut 1107. The stepping motor 1109 is fixed to a fixed member (not shown).

The above-described rotating member is referred to as a lead screw type actuator. By driving the stepping motor 1109, the prism 1101 is rotated together with the prism holder 1105 around the optical axis O—O of the prism 1101. Since the lead screw type actuator uses the stepping motor 1109 as a driving resource, the rotation angle of the prism 1101 can be controlled by a digital pulse signal. Therefore, after a position displacement amount is calculated by a micro computer, feedback control can be easily performed by a pulse signal.

The movement amount Δx by the lead screw type actuator (=the movement amount of the nut=the movement amount of the application point P) can be obtained by the following equation (4):

$$\Delta x = R \times \tan(\Delta\gamma) \quad (4).$$

R designates a distance from the rotation center to the application point P of the actuator), and Δγ designates the rotation angle of the prism 1101.

Time Tm required for performing one rotation of the transfer belt 5 can be expressed by the following equation (5)

$$Tm = Lm/Vm \text{ (sec)} \tag{5}$$

Lm designates the one-rotation length of the transfer belt 5, and Vm designates the linear velocity of the transfer belt 5.

Accordingly, a driving frequency N per second for the stepping motor 1109 that is required for the correcting amount ΔZ in the sub scanning direction on the photoconductive bodies 1A through 4A can be obtained by the following equation (6):

$$N = (\Delta x/p) \times (N0/Tm) \tag{6}$$

p designates a screw pitch of the lead screw, and N0 designates the number of pulses per one rotation of the stepping motor 1109.

A color difference can be sufficiently reduced by satisfying the following equation (7):

$$10 < N < 2000 \text{ (pps)} \tag{7}$$

When N becomes larger than the upper limit 2000 pps, in a preferable case, N becomes larger than 1000 pps, the stepping motor cannot respond, so that the correcting of the beam spot position displacement cannot be followed. On the other hand, when N becomes lower than the lower limit 10 pps, the resolution becomes very rough, so that accuracy in correcting of the beam spot position displacement is insufficient.

The torque of the stepping motor 1109 can be expressed by the following equation (8):

$$T = T1 p/2\pi R \tag{8}$$

P designates the screw pitch of the lead screw, T1 designates the torque generated by the tension of the spring 1106, and R designates the distance between the rotation center and the application point P.

Figure 24:
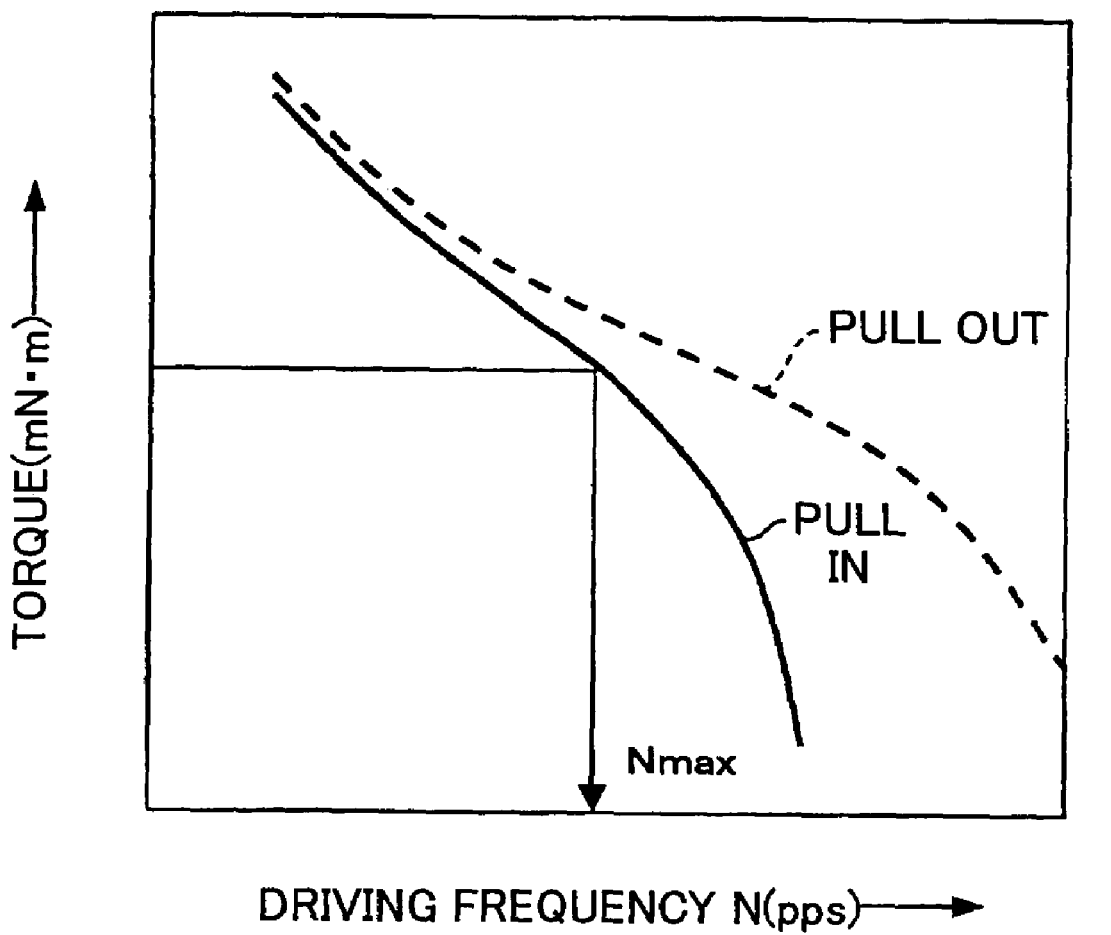
FIG. 24 is a correlation graph showing relation between a torque and a driving frequency of a stepping motor.

The maximum response pulse number Nmax of the stepping motor 1109 can be read from pull-in driving frequency to torque T by using a standard table (motor characteristics) as shown in FIG. 24. Accordingly, in order to control the sub scanning direction correcting amount ΔZ in the equation (6) on the photoconductive body 1A through 4A, the necessary number of pulses per second needs to satisfy the following condition (9):

$$N < Nmax \tag{9}$$

The apex angle α of the prism 1101 is set to an appropriate angle by the actuator 1102 so as to set appropriate sensitivity. In this manner, it is possible to realize a fine beam spot position without too high sensitivity as in galvanometer mirror method, or with the beam spot position being less affected by vibration. Furthermore, by using the wedge-shaped prism 1101, the operation control can be simplified because the wedge-shaped prism 1101 having the simple structure is rotated. Different from position correcting control per batch at the time of starting up the machine, or before print out, in this embodiment, it is possible to correct the beam spot position while writing the image data.

Figure 25:
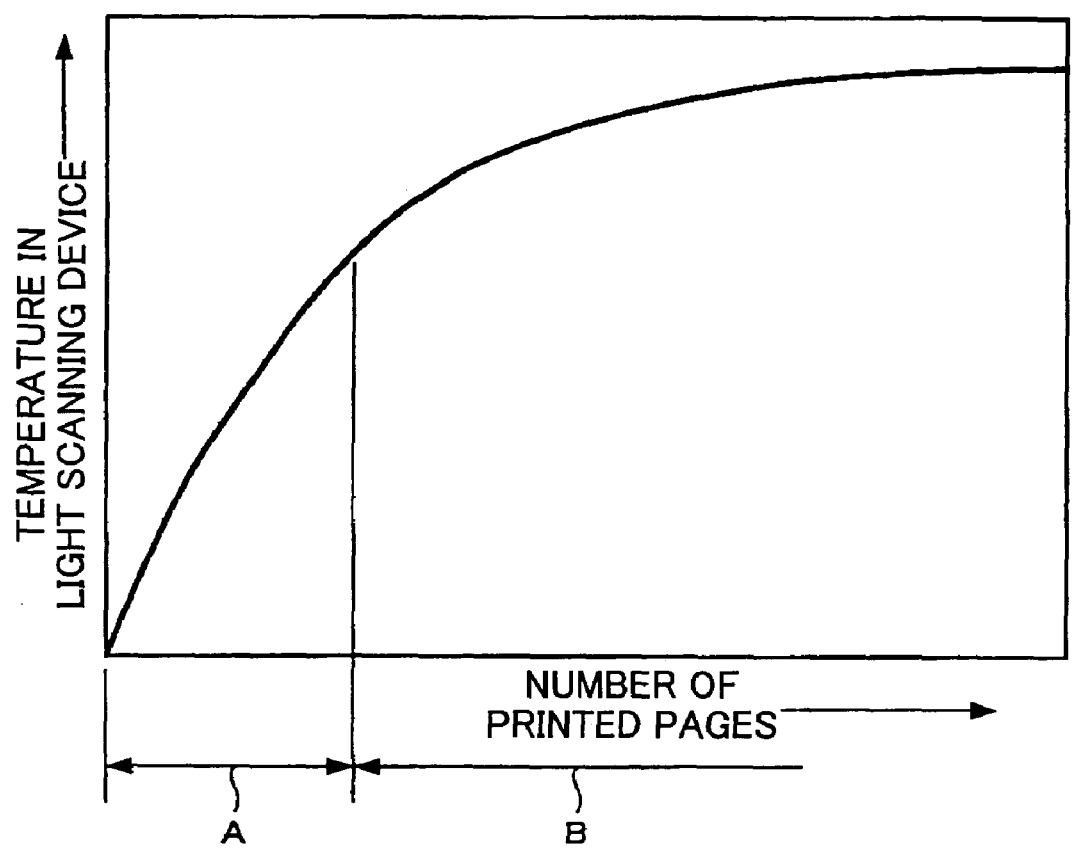
FIG. 25 is a correlation graph showing relation between a temperature in the light scanning device and the number of printed pages.

Accordingly, even when the temperature is rapidly changed, or when the position displacement is generated by the speed change of the transfer belt 5 or the photoconductive body such as during a starting-up section A, or during a successive print section indicated by "B", as shown in FIG. 25, it is possible to perform almost real time position correcting based on position displacement data from the beam spot position detection means 1300a and 1300b (shown in FIG. 23), and the color difference detection sensor 1330. As a result, it is possible to greatly reduce the color difference generation. In stead of, or in addition to the above-described scanning line inclination detection means, the beam spot position displacement means 1300a and 1300b, and the color difference detection sensor 1330 may be used as the scanning line inclination means.

By selecting a material (for example, resin) or a shape (for example, a thin shape), the weight of the wedge-shaped prism 1101 and the prism holder 1105 can be made relatively light. Compared with a conventional case where relatively heavy optical elements such as a long reflection mirror, a scanning lens, a roof prism, and a light source unit are tilted/shifted to correct the beam spot position, in this embodiment, the response speed is higher, and the position displacement can be corrected up to higher frequency.

Furthermore, compared with a case of a liquid crystal deflection element or electric optical element (PLZT) where an applied voltage is changed to correct the beam spot position, in this embodiment, a relative color difference amount can be suppressed to less than 30 μm, realizing a state where actual color difference is not noticeable.

The light scanning device 1020 includes at least one prism 1101 in an optical path between the LD units 1021 and 1022 and the polygon mirrors 1026 and 1027. The light scanning device 1020 includes the above-described writing start position adjusting mean 1140 that rotates the prism 1101 around the optical axis to adjust the beam spot position in the sub scanning direction on the photoconductive body 1A through 4A. The light scanning device 1020 further includes the position displacement detection means for detecting the relative writing start position displacement in the sub scanning direction on the photoconductive body 1A through 4A. Further, by the light scanning device 1020, based on the position displacement data from the position displacement detection means, it is possible to perform the feedback control on the writing start position adjusting means 1140. The sub scanning direction on the photoconductive body 1A through 4A corresponds to the direction indicated by the arrow B in the drawings, but in the same space, these directions are different from each other.

As shown in FIG. 23, the position displacement detection means may include the beam spot position detection means 1300a for detecting the writing start position, the beam spot position detection means 1300b for detecting the writing end position, and the color difference detection means 1330. By this position displacement detection means, it is possible to correct writing start position in the sub scanning direction on the photoconductive body 1A through 4A when the position is displaced by the time lapse. The feedback control of the rotation adjustment of the prism 1101 can be easily performed by the stepping motor or a supersonic motor.

At the time of printing the predetermined number of pages, the beams for forming the color difference detection toner images are emitted from the LD units 1021 and 1022. Thereby, as shown in FIG. 23, the color difference detection toner images 1330 can be formed, respectively, at three points on the transfer belt 5. The color difference can be detected based on these toner images by using the color difference detection means 1330.

The light scanning device 1020 is configured such that the beam spot position detection means 1300a and 1300b as the position displacement detection means may be supported by a case-shaped optical housing (not shown). Furthermore, in the light scanning device 1020, the color difference detection means 1330 provided at the side of the main body of the image forming apparatus 1 may be used as the position displacement detection means, and may be used to obtain the correcting amount of the writing start position correcting means 1140, and may be used together with the beam spot position detection means 1300a and 1300b.

In a case where the color difference detection means 1330 is used together with the beam spot position displacement detection means 1300a and 1300b, the color difference detection means 1330 may used for rough adjustment, and the beam spot position displacement detection means 1300a and 1300b may used for fine adjustment. Based on the position displacement detection result, the writing start position correcting means 1140 performs correcting control on the beam spot positions on the photoconductive bodies 1A through 4A while writing image data.

As shown in FIG. 25, in a case of printing a plurality of pages of images, in the light scanning device 1020 heat is generated from a motor that drives the polygon mirrors 1026 and 1027, and the LD units 1021 and 1022, and outside the light scanning device 1020, heat is generated from the heater of the fixing device 14 at the time of fixing operation. Accordingly, a temperature in the image forming apparatus 1 is rapidly raised. In this case, the beam spot position on the photoconductive bodies 1A through 4A are also rapidly changed, so that the color tone of an output color image is gradually changed as the number of printed pages increases to one page, several pages, and tens of pages.

For this reason, by using the beam spot position displacement detection means 1300a and 1300b, and the color difference detection means 1330 as the position displacement detection means, the writing start position adjusting means 1140 performs adjustment. The beam spot position detection means 1300a and 1300b are non parallel photo diode sensors. The beam spot position detection means 1300a and 1300b also have a function of detecting a synchronization signal for determining a writing start position in the main scanning direction.

Figure 26:
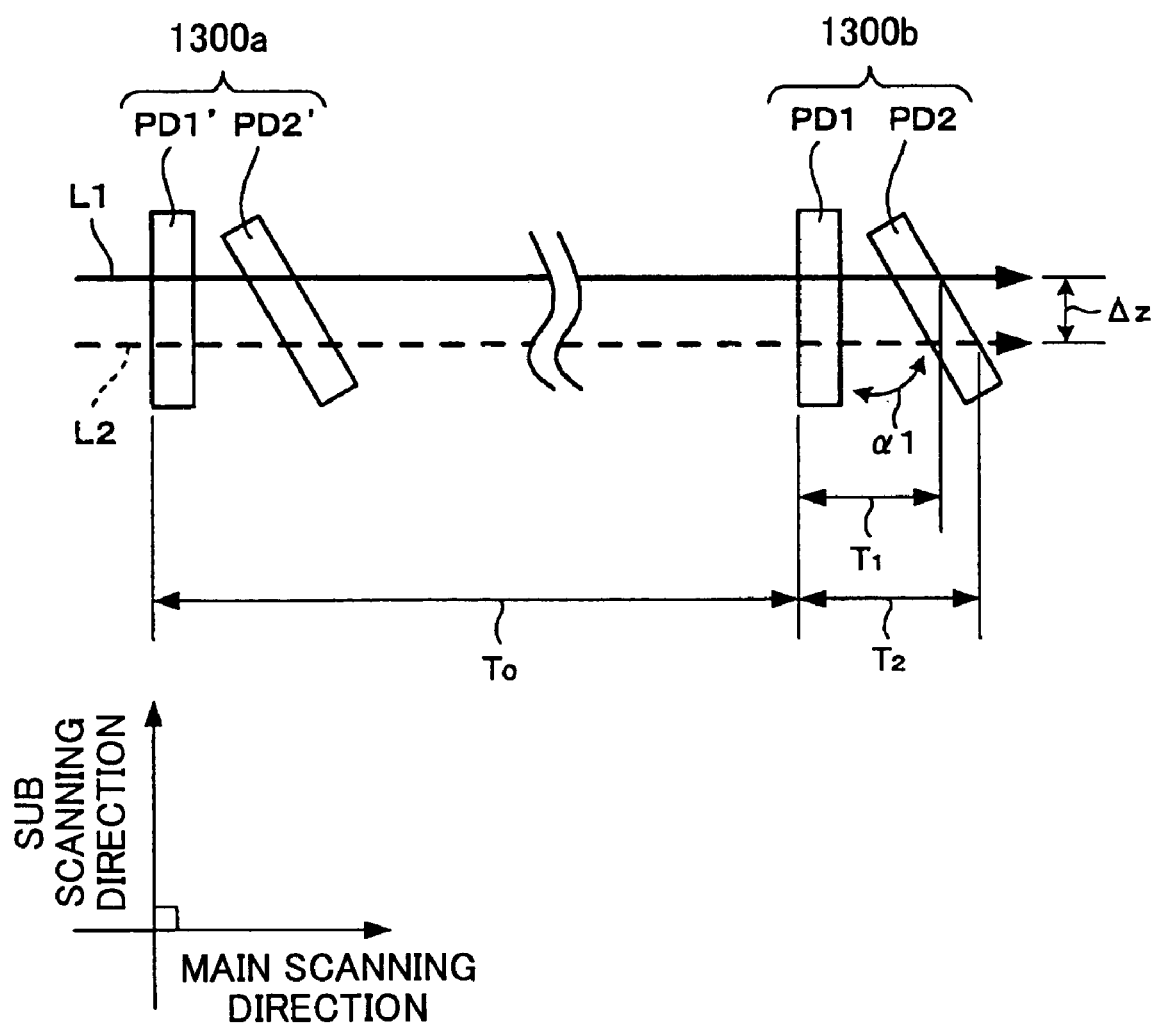
FIG. 26 shows a principle of detecting a position by using a non-parallel photo diode sensor as beam spot position detection means.

As shown in FIG. 26, light receiving surfaces of the photo diodes PD1 and PD1' are orthogonal to the scanning beam, and light receiving surfaces of the photo diodes PD2 and PD2' are inclined from the light receiving surfaces of the photo diodes PD1 and PD1'. α1 in FIG. 26 designates an inclination angle by which the receiving surfaces of the photo diodes PD2 and PD2' are inclined from the light receiving surfaces of the photo diodes PD1 and PD1'. Further, in FIG. 26, L1 designates a scanning beam before a temperature is changed by the heater, and L2 designates a scanning beam after a temperature is changed by the heater. It is assumed that the position is displaced by the distance ΔZ (unknown) in the sub scanning direction. In this case, time T1 and T2, required by the scanning beams L1 and L2 to pass between a pair of the non-parallel photo diodes PD1 and PD2, or between a pair of the non-parallel photo diodes PD1' and PD2', are measured. A time difference "T2−T1" is calculated. In this manner, the scanning position, that is, the writing start position is monitored and detected.

The relative dot position displacement in the sub scanning direction, that is, the correcting amount ΔZ in the sub scanning direction can be easily calculated because the inclination angle α1 made by the light receiving surfaces of the photo diodes PD1 and PD2, and the time difference "T2−T1" are known values. Accordingly, the writing start position adjusting means 1140 adjusts and corrects the scanning position by the correcting amount ΔZ. Therefore, in a case of printing a plurality of pages of images, even when the beam spot positions on the photoconductive bodies 1A through 4A are rapidly changed by the temperature change, for example, it is possible to correct the beam spot positions on the photoconductive bodies 1A through 4A even during image writing. Furthermore, by detecting change of time T0 required by the scanning beam to pass between the photo diodes PD1' and PD1, it is also possible to monitor the magnification change in the main scanning direction.

Figure 27A:
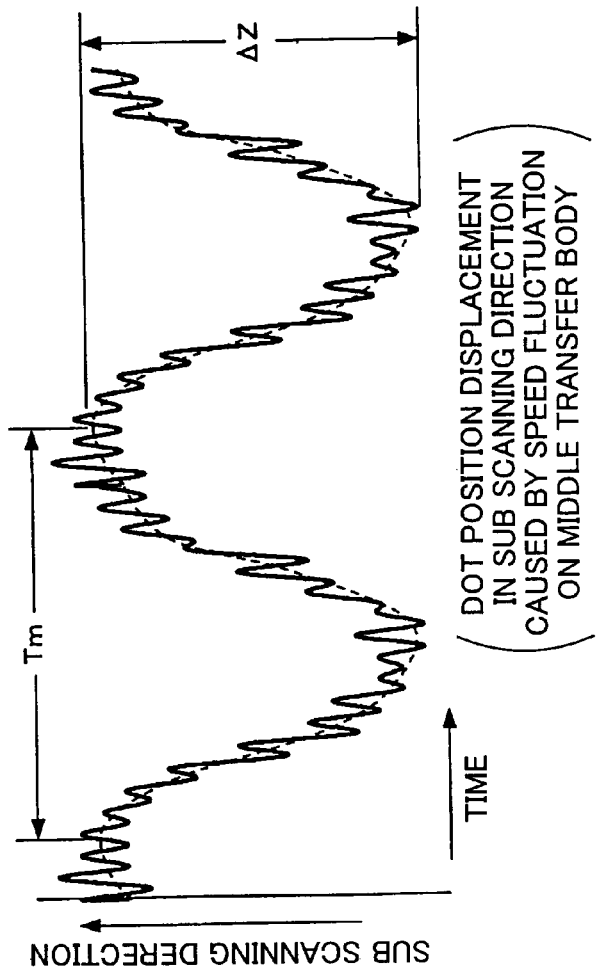
FIG. 27A shows dot position displacement in the sub scanning direction caused by speed change on a medium transfer body.

FIG. 27A shows dot position change in the sub scanning direction on the transfer belt 5. As understood from FIG. 27A, the dot position displacement ΔZ in the sub scanning direction is periodically generated on the transfer belt 5. This period of the dot position displacement generation corresponds to time Tm required by the transfer belt to rotate once. This time Tm can be obtained by the above-mentioned equation (5), and preferably satisfies the following relation (10):

$$0.5 < Tm < 5 \text{ (sec)} \qquad (10).$$

In the relation (10), when the time Tm becomes larger than the upper limit, the scanning position can be easily affected by an outside disturbing factor such as vibration because the one period is too long. Meanwhile, when the time Tm becomes lower than the lower limit, high speed response is required for the beam spot position correcting control, so that the rotation speed of the prism 1101 cannot follow the required response speed. When the Tm satisfies the relation (10), the scanning position is less affected by the outside disturbing factor such as vibration, and the rotation speed of the prism 1101 can appropriately follow the required response speed.

Figure 27B:
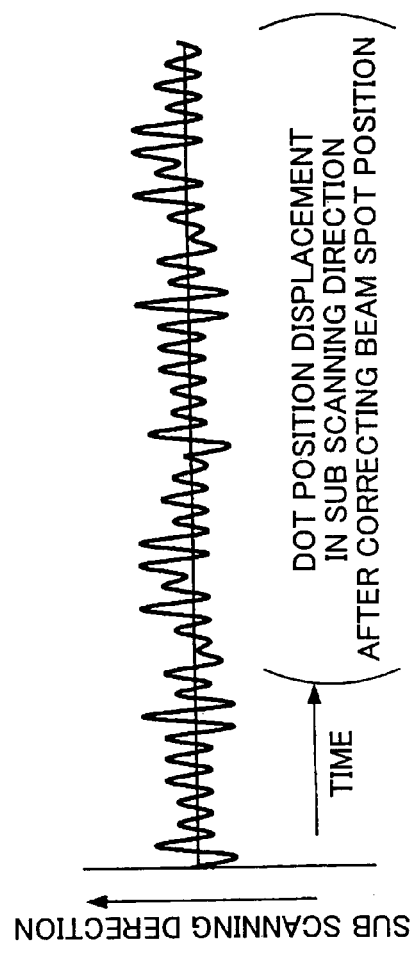
FIG. 27B shows dot position displacement in the sub scanning direction after the beam spot position is corrected.

FIG. 17B shows the dot position displacement in the sub scanning direction after the beam spot position correcting is performed according to this embodiment of the present invention. Since the above-mentioned position displacement amount ΔZ is a correcting amount in the sub scanning direction, the dot position displacement on the transfer belt 5 is corrected by correcting the beam spot position at the writing optical system. Thereby, as shown in FIG. 27B, low frequency large position displacement component is sufficiently corrected. Additionally, as shown in FIG. 27B, position displacement of very high frequency cannot be corrected. In the example of FIG. 1, a middle transfer body is configured as the transfer belt 5, but the middle transfer body may be configured as a drum type transfer body. Also in this case of the drum type transfer body, according to this embodiment, it is possible to adjust the position displacement in the same manner.

As described above, in order to correct a color difference in the sub scanning direction, there is one method of making a displacement amount zero when putting, on top of one another on the transfer belt 5, the scanning line positions corresponding to the respective colors. This method may be adopted. However, at the time of adjusting writing start positions, that is, scanning positions of the respective laser beams corresponding to the respective colors, when all of the four light beams are adjusted to a predetermined standard position, there is a possibility that a large rotational decentering is wrongly applied, resulting in degradation of the optical performance such as a beam spot diameter. Furthermore, in this method, the number of the components of the writing start position correcting means is increased, raising cost.

For this reason, according to the light scanning device 1020 of this embodiment, one of the four colors of yellow Y, magenta M, cyan C, and black K may be set as the standard color, and the scanning beam operated by the scanning optical system for the colors other than the standard color may be adjusted to conform with the scanning line position of the standard color. In other words, the scanning lines of the non-standard colors may be adjusted to conform with the scanning line of the standard color. Thus, by correcting relative color difference, it is possible to realize high color reproduction performance of an image with color tone change being sufficiently suppressed.

Thus, it is sufficient that the prisms 1101 for correcting the writing start position are arranged such that three scanning lines of the four scanning lines of yellow Y, magenta M, cyan C, and black K are adjusted. Accordingly, the three prisms 1101 suffice, and the three writing start position adjusting means 1140 suffice.

In this case, the scanning beams may penetrate through air instead of the prism 1101, and the writing start position adjusting means 1140 integrated with the prism 1101 may be arranged for the scanning beams of the three colors other than the standard color.

In this embodiment, as one example, the standard color is black. A color image can be generally formed by using three colors Y, M and C. However, in order to improve sharpness of the color image, and improve resolution of a character image, for example, a black color is generally used, so that also in this embodiment, a black color may be used. In this case, by setting the black color as the standard color, the following advantage can be obtained.

The contrast of the black color is higher than the contrast of the other colors. In the case of the black color, degradation of a beam spot diameter, and a beam spot position change that are affected by the outside disturbing factor such as vibration and temperature change are more visible in the formed image other than the other colors. For this reason, by setting the black color as the standard color, it is possible to provide high rigidity for the optical components of the scanning optical system that handles the standard color so that the scanning optical system for the standard color of the black color can be less affected by the outside disturbing factor. Next to the black color, magenta M has this nature similar to black K, so that magenta M may set as the standard color. However, another color may be set as the standard color.

With such a configuration, adjustment targets may be three colors of the four colors, and the necessary number of the prisms 1101 may be three. Accordingly, adjustment points and adjustment amount can be decreased, so that the scanning position displacement from the standard color scanning position is large, it is possible to easily correct the relative color difference. In this manner, it is possible to correct a color difference less than one line, and to obtain high color reproduction performance with color tone change being sufficiently suppressed. As described above, according to this embodiment of the present invention, by suppressing a relative color difference amount (or, a position displacement amount) to less than 30 µm, it is possible to realize a condition in which an actual color difference is sufficiently less visible.

In the following, modification examples of the scanning line curve correcting means 1071 and the scanning line inclination correcting means 1072 will now be described. It should be noted that, any combination among the modification examples may be used. The present invention is not limited to the following modification examples.

Figure 28:
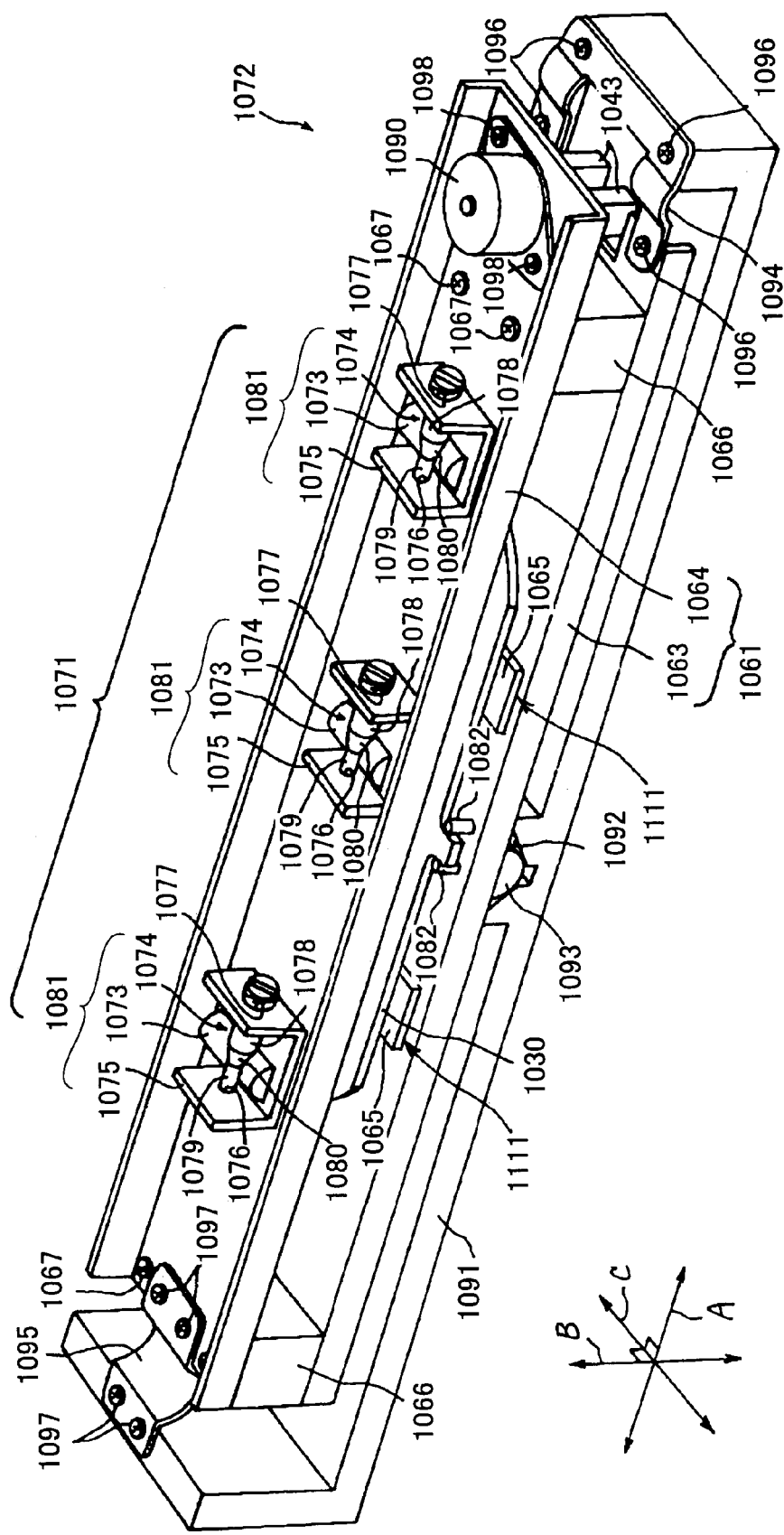
FIG. 28 shows another configuration example of the scanning line curve correcting means in the light scanning device according to the second embodiment.
Figure 29:
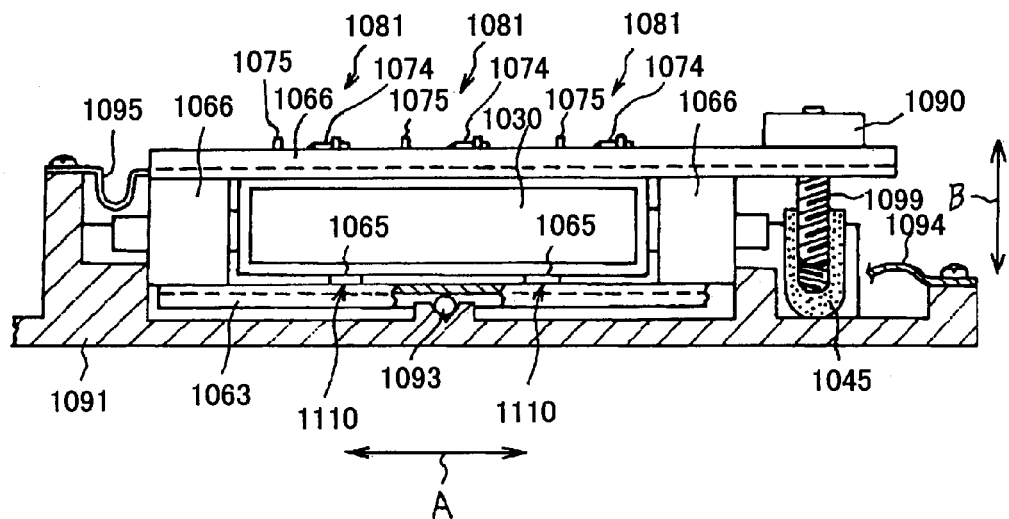
FIG. 29 is a sectional front view of the light scanning device of FIG. 28.
Figure 30:
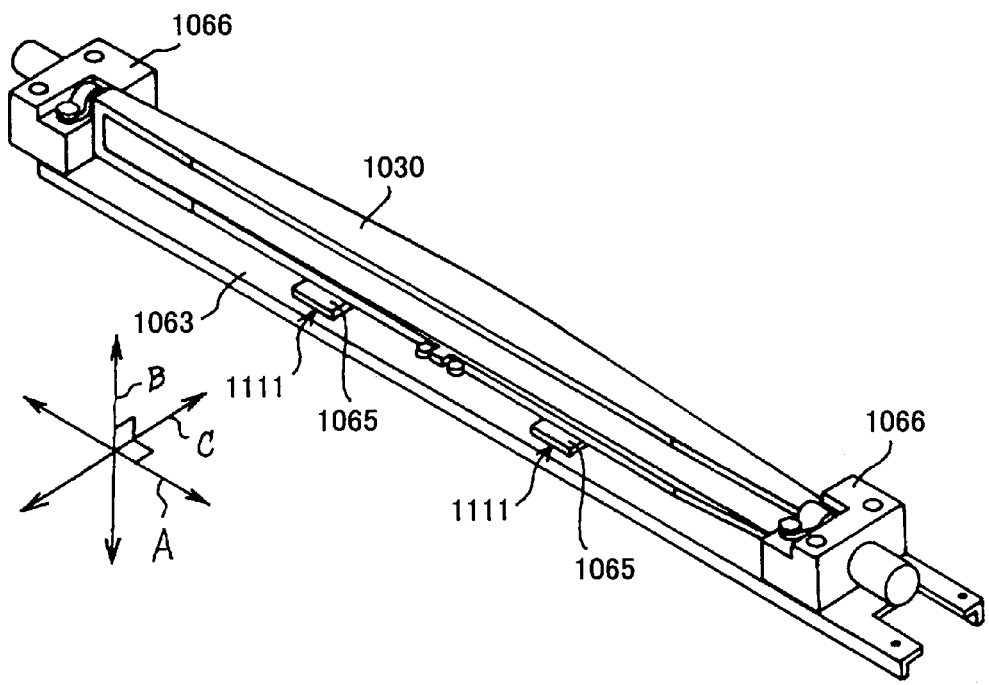
FIG. 30 is an important part of the scanning line curve correcting means of FIG. 28.

As shown in FIGS. 28 through 30, the reference surface 1065 may be formed so as to correspond to a part other than the part pressed by the scanning line curve correcting means 1071, that is, may be formed so as to corresponding to the part that is not pressed by the scanning line curve correcting means 1071. In the example of FIG. 28, the reference surfaces 1065 are formed by two protruding parts 1111 having a height of 200 µm. The protruding parts 1111 may be formed by performing a squeezing process on the supporting member 1063 that is a metal plate. Upper surfaces of the protruding parts 1111 is the reference surfaces 1065. Each of the protruding parts 1111 is formed between the scanning line curve correcting mechanisms 1081 arranged in the main scanning direction A.

By this configuration of FIG. 28, at each of positions pressed by the scanning line curve correcting mechanisms 1081, a space having a height of 200 µm is formed between the lower surface of the second scanning lens 1030 and the main body of the supporting member 1063. At the time the scanning line curve correcting mechanism 1081 presses the second scanning lens 1030, this space functions as an evacuating space for the second scanning lens 1030 so that the second scanning lens 1030 can be moved appropriately in the direction B, that is, a good correcting operation can be performed. Compared with the case as shown in FIG. 17 and so on where the reference surface 1065 exists also at the position pressed by the scanning line curve correcting mechanism 1081, a smaller stress (force) enables the correcting operation, so that the good correcting operation by the scanning line curve correcting mechanism 1081 can be performed easily.

In order to form the reference surface 1065 corresponding to the part that is not pressed by the scanning line curve correcting mechanism 1081, a depression part may be formed on the supporting member 1063 at the part that is pressed by the scanning line curve correcting mechanism 1081. The present invention is not limited to the cases of FIGS. through 30 where the protruding part is formed for the reference surface 1065. In other words, unevenness may be formed on the supporting member 1063 such that the reference surface 1065 is formed by the protruding part at the part that is not pressed by the scanning line curve correcting mechanism 1081. Furthermore, the reference surfaces 1065 may be formed at further both end sides of the supporting member 1063 compared with the positions of the both end side scanning line curve correcting mechanisms 1081. When four scanning line curve correcting mechanisms 1081 are provided, three or five reference surfaces 1065 are formed, and five scanning line curve correcting mechanisms 1081 are provided, four or six reference surfaces 1065 are formed.

When unevenness is formed on the supporting member 1063, and both ends of the second scanning lens 1030 are positioned at the depression parts of the supporting member 1063, it is possible to set a height of the pillar 1066 such that the level of the upper surface of the pillar 1066 is lower than the level of the upper surface of the second scanning lens 1030. For example, the height of the pillar 1066 is not equal to the thickness of the second scanning lens 1030, but the height of the pillar 1066 can be smaller than the thickness of the second scanning lens 1030.

In this case, when the second scanning lens 1030 is sandwiched and supported by the supporting member 1063 and the sandwiching support member 1064, an upward force that deforms the second scanning lens 1030 upwards is always applied to the second scanning lens 1030 at an initial state before the scanning line curve correcting means 1071 performs the correcting operation. Therefore, the protruding parts can be formed on the supporting member 1063, and the height of the pillar 1066 can be smaller than the thickness of the second scanning lens 1030 such that the initial state before the scanning line curve correcting means 1071 performs the correcting operation is uniform or constant. The curve correcting operation can be standardized.

Since the supporting member 1063 is also elastically deformed by a small reactive force, the deformed amount of the second scanning lens 1030 becomes equal to or less than 100 μm. The height of the pillar 1066 enable the state where the upward force for deforming the second scanning lens 1030 upwards is always applied to the second scanning lens 1030 when the second scanning lens 1030 is sandwiched and supported by the supporting member 1063 and the sandwiching support member 1064 in the initial state before the scanning line curve correcting means 1071 performs the correcting operation. This deformation of the second scanning lens 1030 before the correcting operation can be corrected by the scanning line curve correcting means 1071.

Figure 31:
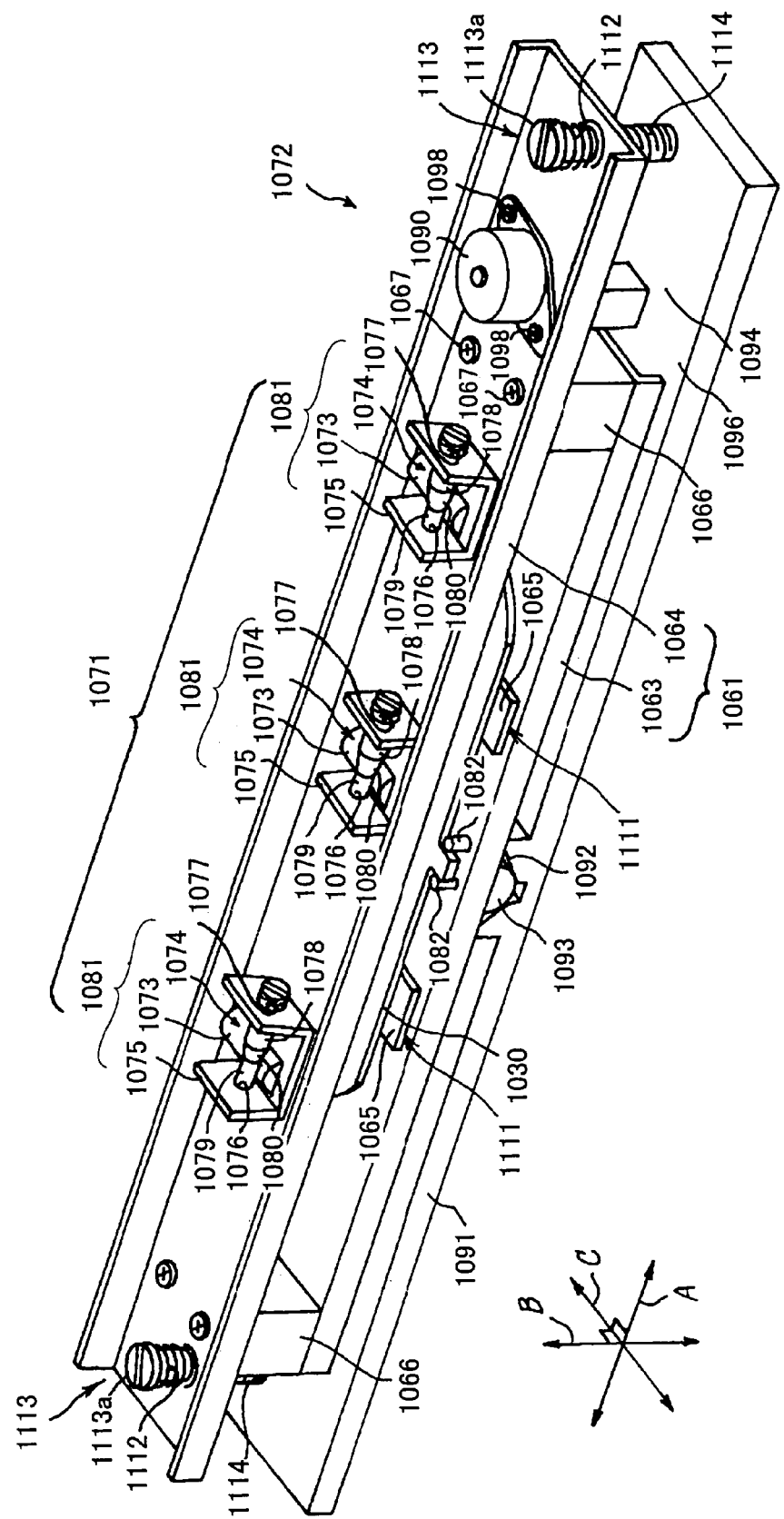
FIG. 31 shows another configuration example of the scanning line inclination correcting means in the light scanning device according to the second embodiment of the present invention.

As shown in FIG. 31, instead of the leaf springs 1094 and 1095, compressed springs 1112 that are coil springs may be used as elastic members that are configured integrally with the holding member 1061 and the fixed long lens holder 1091, and that supports the holding member 1061 such that the holding member 1061 can move relative to the long lens holder 1091 in the direction of correcting the scanning line inclination. Pillars 1114 provided at the both end parts of the long lens holder 1091 are integrated with the long lens holder 1091 so as to protrude toward the lower surface of the sandwiching support member 1064. Screws 1113 having steps engage the long lens holder 1091.

The screws 1113 penetrate through the sandwiching support member 1064 so as to engage the pillars 1114. The compressed springs 1112 are wound around the part between the sandwiching support member 1064 and screw heads 1113a of the screws 1113. Upper ends of the compressed springs 1113 engage lower surfaces of the screw heads 1113a, and lower ends of the compressed springs 1112 engage the upper surface of the sandwiching support member 1064.

Spring force of the compressed springs 1112 drives the screw heads 1112 and the sandwiching support member 1064 in the direction of drawing them to each other. Thus, the compressed springs 1112 are substantially integrated with the long lens holder 1091 via the screws 1113 having the steps.

Accordingly, the spring force of the compressed springs 1112, and the long lens holder 1091 supports the holding member 1061 via the roller 1093 such that the holding member 1061 can be moved relative to the long lens holder 1091 in the direction of correcting the scanning line inclination. Further, in this manner, the holding member 1061 can be supported in the holding member 1061 being stable to the long lens holder 1091.

The function of the coil spring (for example, the compressed spring 1112) is that the holding member 1091 is supported such that the holding member 1061 can be moved relative to the long lens holder 1091 in the direction of correcting the scanning line inclination, and that the holding member 1061 is stable to the long lens holder 1091. Accordingly, instead of the compressed spring 1112, it is possible to use any means for supplying force in the direction of drawing the screw heads 1113a and the sandwiching support member 1064 to each other, and supplying force in the direction of separating sandwiching support member 1064 and the long lens holder 1091.

By adjusting the connection state of the springs 1113 such that force applied by the springs 1113 can be optimized, it is possible to correct the scanning line inclination by a predetermined amount, using the holding member tilting means such as the stepping motor 1090. The elastic member may be a torsion beam, or a combination of the leaf spring, the coil spring, and the torsion beam.

Figure 32:
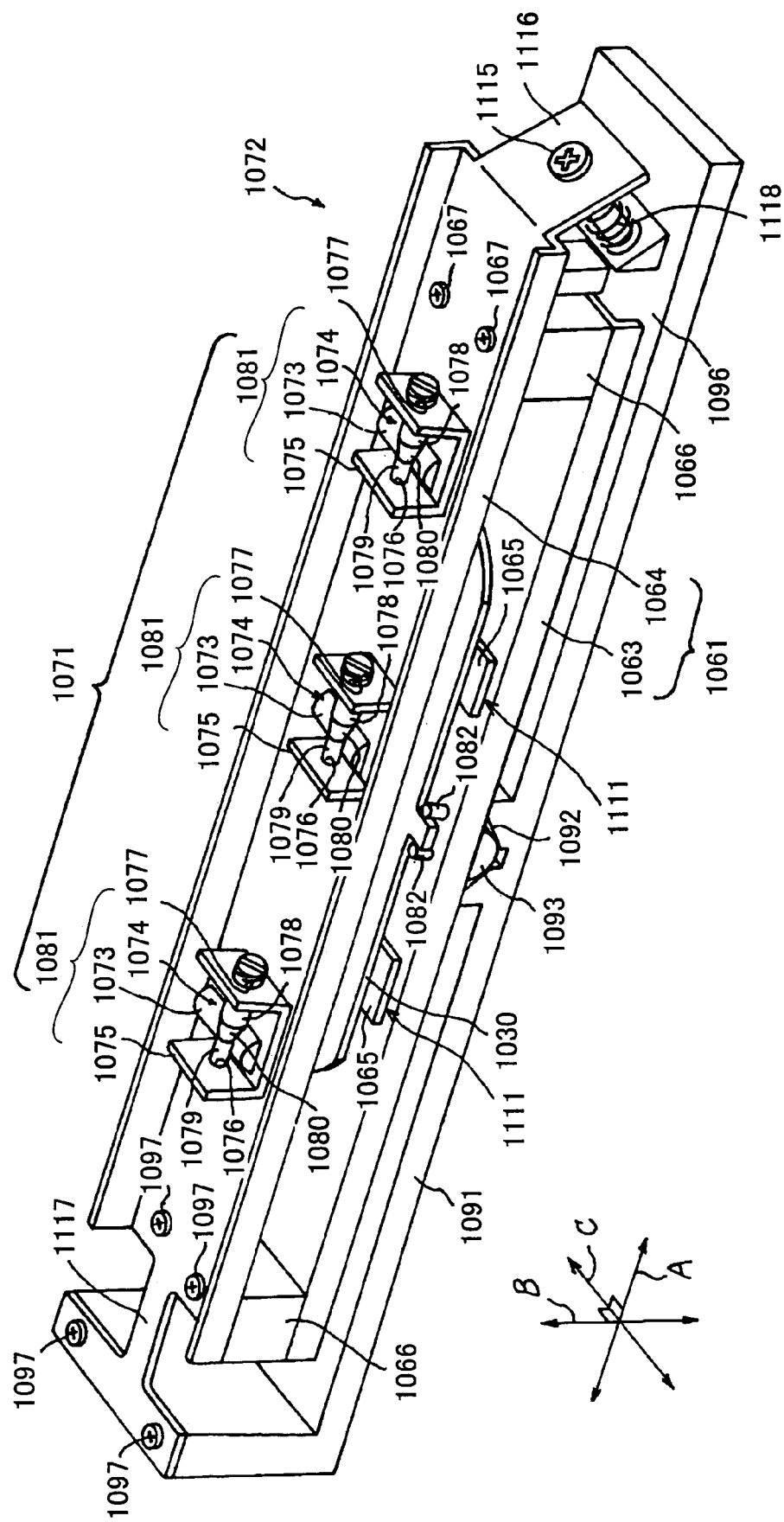
FIG. 32 shows another configuration example of the scanning line inclination correcting means in the light scanning device according to the second embodiment of the present invention.

As shown in FIG. 32, instead of the stepping motor 1090 shown in FIG. 17, the holding member tilting means may be a screw 115 for correction in the γ direction. In the example of FIG. 32, the sandwiching support member 1064 includes an inclination part 1116 that is bent in an oblique direction toward the long lens holder 1091 so as to extend at one end of the sandwiching support member 1064. The sandwiching support member 1064 further includes a beam part 1117 that extends at the other end of the sandwiching support member 1064. One end part of the beam part 1117 is fixed to the long lens holder 1091 by screws 1097. The beam part 1117 functions as an elastic member. By making a part of the sandwiching support member 1064 thin, the beam part 1117 is formed integrally with the sandwiching support member 1064. The screw 1115 engages the inclination part 1116 so as to be integrated with the sandwiching support member 1064. A front end of the screw 1115 engages the long lens holder 1091, and a compressed spring 1118 is wound around the screw 1115 between the inclination part 1116 and the long lens holder 1091.

In this example, by using balance between the spring force of the compressed spring 1118, and the elastic region and flexure of the beam part 1117, appropriately fastening the screw 1115 enables the fine adjustment. Without performing the feedback control, and without using the stepping motor 1090, the tilting adjustment can be performed by using the screw 1115. In this manner, the initial adjustment can be performed, or in accordance with a necessity, adjustment can be performed by a service person to greatly reducing cost. As described, the elastic member may be configured by the beam part as in this example. Furthermore, the elastic member may be configured by a combination of the leaf spring, the coli spring, and the beam part, for example.

In the example of FIG. 17, the scanning line curve correcting means 1071 includes the plural scanning line curve correcting mechanisms 1081 that are the pressing means, and are arranged in the longitudinal direction of the supporting member 1063. However, a single pressing means may be provided in the longitudinal direction of the supporting member 1061. The pressing means is not limited to the configuration such as the scanning line curve correcting mechanism 1081 having the pressing member 1071.

Figure 33:
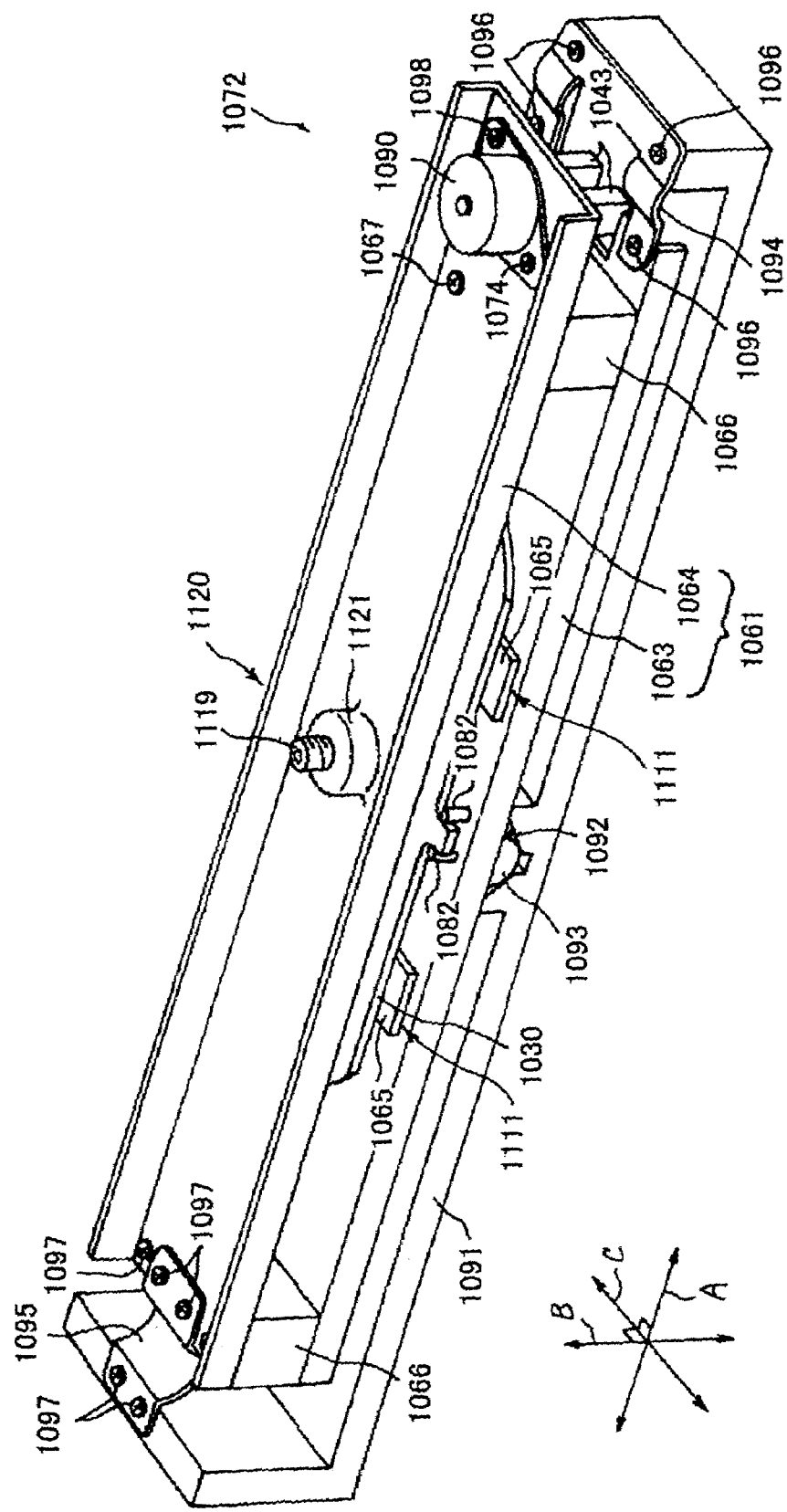
FIG. 33 shows another configuration example of the scanning line curve correcting means in the light scanning device according to the second embodiment of the present invention.
Figure 34:
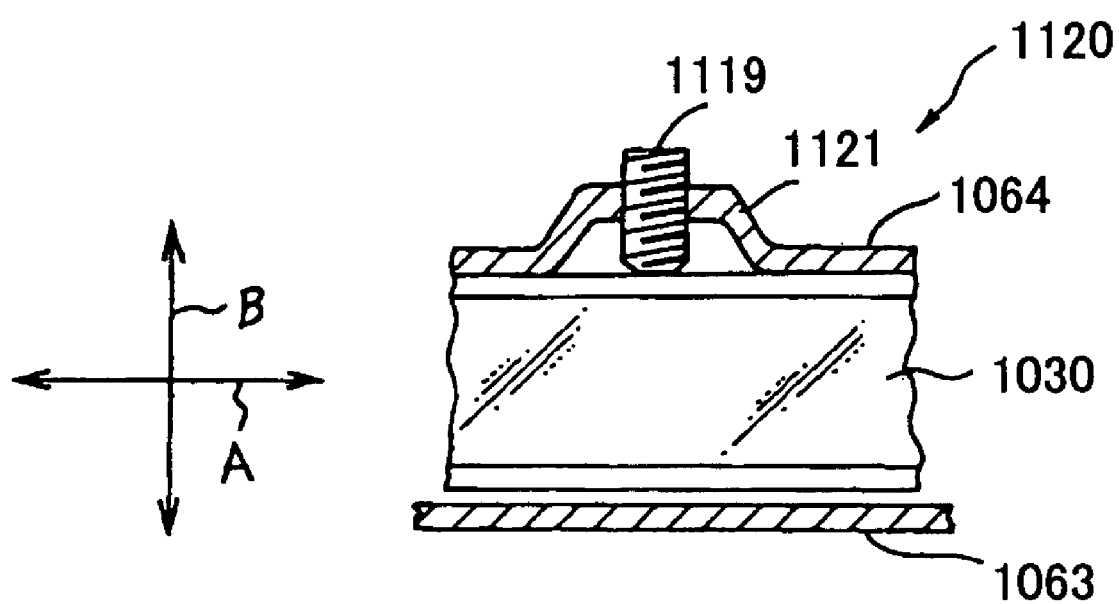
FIG. 34 shows an important part of the scanning line curve correcting means of FIG. 33.

In other words, as shown in FIGS. 33 and 34, the pressing means may include a single screw 1119 provided on the supporting member 1163. The pressing means 1120 includes a protruding 1121 part that is provided at the approximate center part in the longitudinal direction of the supporting member 1063, and that engages the screw 1119. The protruding part 1121 protrudes from the upper surface of the sandwiching support member 1064. By rotating the screw 1119, the screw 1119 is moved in the direction approximately parallel to the sub scanning direction B. The protruding part 1121 is provided for enabling good engagement with the screw 1119. Thus, the pressing means 1120 is integrated with the sandwiching support member 1064.

By rotating the screw 1119 of the pressing means 1120, it is possible to adjust pressing force applied to the second scanning lens 1030 by the screw 1119 so that the curve of the second scanning lens 1030 can be corrected. In this manner, the configuration of the pressing means 1020 can be simplified by using the only the screw 1119 and the protruding part 1121. As a result, cost can be greatly reduced. It is sufficient that the pressing force applied to the second scanning lens 1030 can be adjusted, so that the movement direction of the screw 1119 is not limited to the direction approximately parallel to the sub scanning direction B, and may be the direction including the sub scanning direction B.

Figure 35A:
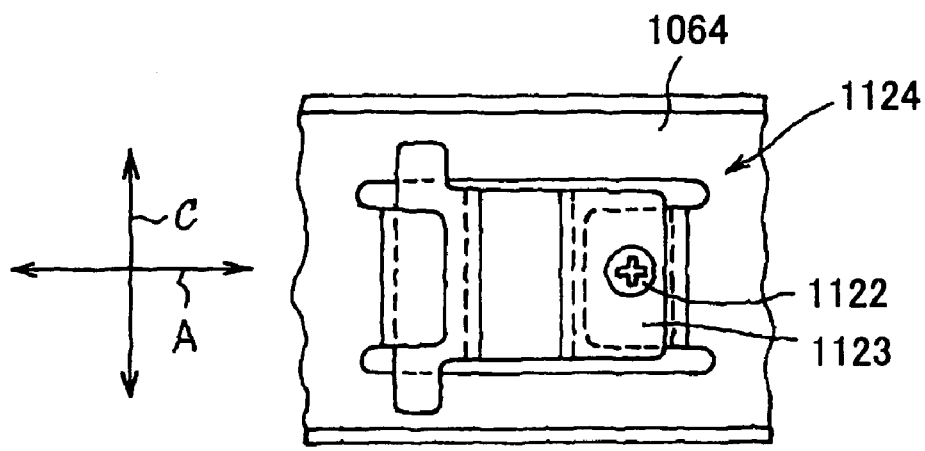
FIG. 35A shows another important part of the scanning line curve correcting means in the light scanning device according to the second embodiment of the present invention.
Figure 35B:
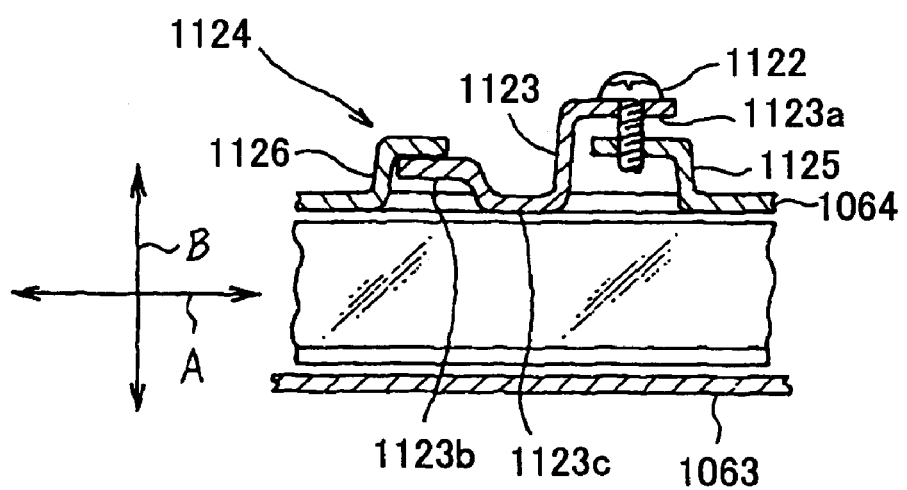
FIG. 35B is a sectional front view of the important part of FIG. 35A.

In another example, as shown in FIGS. 35A and 35B, a configuration having a screw 1122 and a metal plate pressing member 1123 may be used as a simplified configuration of the pressing means. The pressing means 1124 shown in FIGS. 35A and 35B includes curved parts 1125 and 1126 that is a part of the sandwiching support member 1064, and that stand from the sandwiching support member 1064 so as to be an L-shaped. One end part 1123a of the metal plate pressing member 1123 is positioned above the curved part 1126 such that a space is provided between the one end part 1123a and the curved part 1125. The other end part 1123b of the metal plate pressing member 1123 is positioned below the curved part 1126 such that the other end part 1123b engages the curved part 1126. The center part of the metal plate pressing member 1123 engages the second scanning lens 1030 so as to form a pressing part 1123c. The screw 1122 penetrates through the one end part 1123a and the curved part 1125 so as to engage the metal plate pressing member 1123 and the curved part 1125. By rotating the screw 1122, the screw 1122 is moved in the direction approximately parallel to the sub scanning direction B. Thus, the pressing means 1124 is integrated with the sandwiching support member 1064.

By rotating the screw 1122 of the pressing means 1124, a distance between the one end part 1123a and the curved part 1125 can be adjusted so that the pressing force applied to the second scanning lens 1030 by the pressing part 1123c can be adjusted. In this manner, it is possible to correct the curve of the second scanning lens 1030. Thus, by simplifying the configuration of the pressing means, it is possible to greatly reduce cost. The pressing means 1124 has the configuration that is more complicated than that of the pressing means 1120, so that the cost for the pressing means 1124 is slightly raised. However, the pressing means has an advantage in that the pressing operation is more stable than that of the pressing means 1120. It is sufficient that the pressing force to the second scanning lens 1030 can be adjusted, so that the movement direction of the screw 1122 is not limited to the direction approximately parallel to the sub scanning direction B, and may be the direction including the sub scanning direction B. Additionally, a configuration using a cam or the like may be used as a simplified configuration of the pressing means.

In the case where a single pressing means is provided on the sandwiching support member 1064, not only the simplified configuration such as the pressing means 1120 and 1124, but also the scanning line curve correcting mechanism 1081 may be used. Furthermore, in the case where a plurality of the pressing means are provided in the longitudinal direction of the supporting member 1063, the pressing means is not limited to the scanning line curve correcting mechanism 1081, and the simplified configuration such as the pressing means 1120, 1124, and so on may be used, or a combination of the correcting mechanism 1081, the pressing means 1120 and 1124, and so on.

Figure 36:
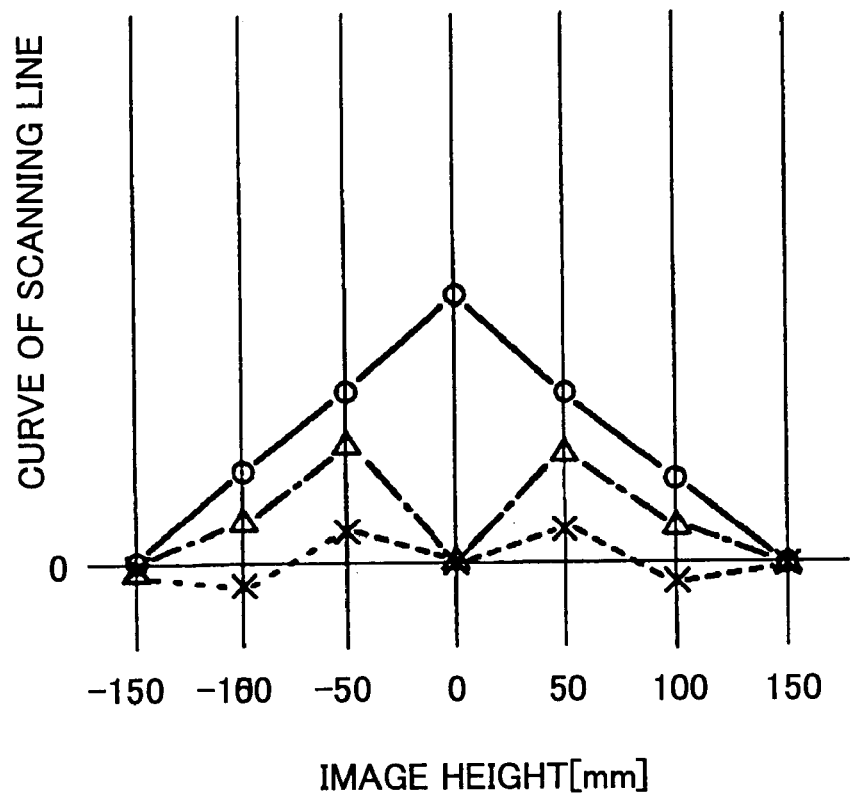
FIG. 36 shows relation between the number of pressing means and an adjusted amount of the scanning line curve.

FIG. 36 shows a comparison result among a case where the pressing means is not provided, a case where one pressing means is provided in the longitudinal direction of the supporting member 1063, and a case where three pressing means are provided in the longitudinal direction of the supporting member 1063. This comparison result shows an amount of scanning line curve from an ideal position. In FIG. 36, an image height designates a distance from a reference position that is the center in the longitudinal direction of a held optical element such as the second scanning lens 1030. The value at the reference position is zero.

As apparent from FIG. 36, in the case where the pressing means is not provided, and the adjustment is not performed, there is generated a chevron-shaped result in which the scanning line curve has a peak at the center of the held optical element, that is, at the zero image height. In the case where one pressing means is provided at the position corresponding to the zero image height, and the adjustment is performed at this one position, there is generated an M-shaped result of which center corresponds to the center of the held optical element, that is, the zero image height. In this case, the curved amount is about half of the case where the pressing means is not provided. Accordingly, it is found that the limit of the adjustment accuracy in the case where one pressing means is provided is the about half, in terms of the scanning line curve amount, in the case where the adjustment is not performed.

Meanwhile, in the case where three pressing means are provided, and the adjustment is performed at three positions, there is generated a polygonal line result of which center is the center of the held optical element, that is, the zero image height. In this case, the scanning line curve amount is less than several tens μm, so that the adjustment can be performed at further accuracy. Thus, by increasing the number of the pressing means, it is possible to improve the accuracy in adjusting the scanning line curve. The result shown in FIG. 36 in the case where the pressing means is not provided was obtained by using the configuration in which the protruding part is formed on the supporting member 1063, and the height of the pillar 1066 is smaller than the thickness of the second scanning lens 1030.

In this embodiment, and the modification examples, the both end parts of the holding member are elastically supported to the fixed member so that the both end parts of the held optical element such as the second scanning lens 1030 can be elastically supported. As in this manner, a method of holding the held optical element by using the structure having a beam at one or both ends thereof, and correcting the inclination of the scanning line by using this structure is called a span band method. A conventional method of adjusting the scanning line inclination by changing tilt of a reflection mirror is called a MUSIC method.

Figure 37:
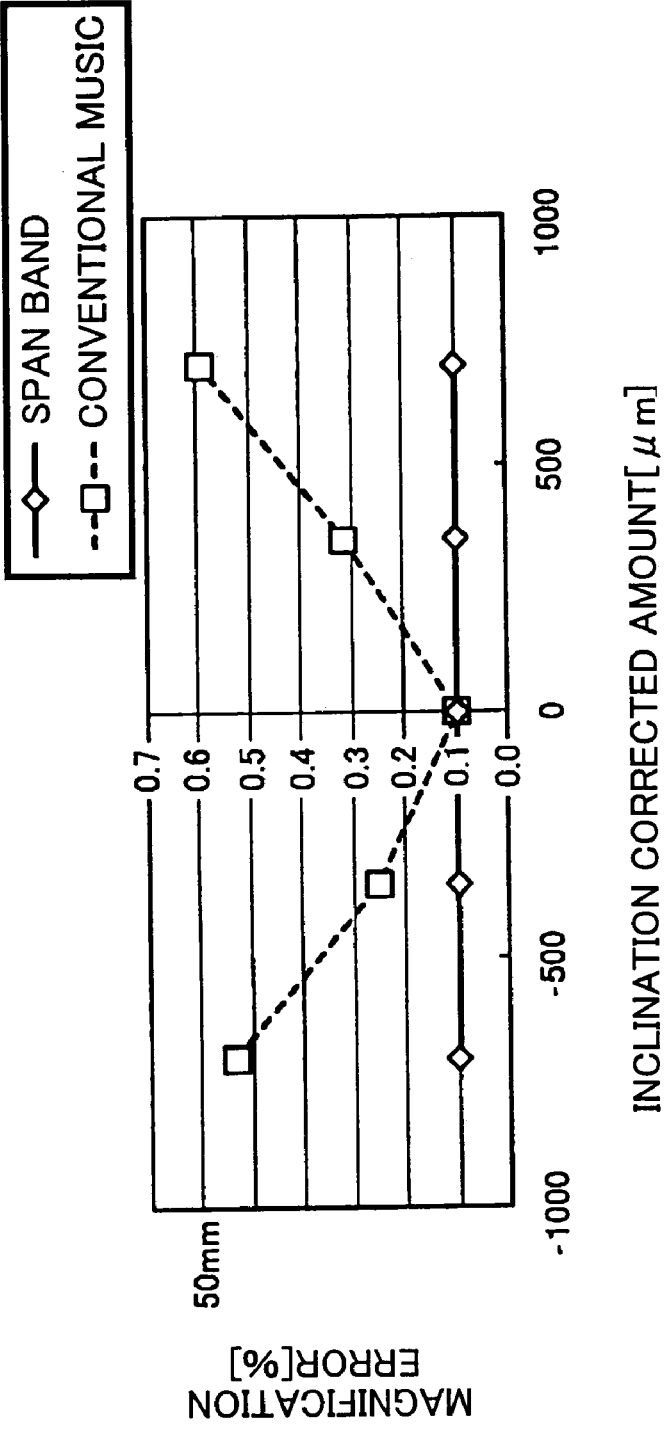
FIG. 37 shows comparison of a magnification error between a span band method and a MUSIC method.

With reference to FIG. 37 and so on, effects to optical characteristics in both cases of the span band method and the MUSIC method are compared, and an advantage obtained by the span band method will be described. A magnification error in FIG. 37 is a rate of a beam spot size difference between the center position on the image holding body corresponding to the zero image height, and the end position on the image holding body corresponding to the end part of the held optical element. Accordingly, as the magnification error is smaller, the optical characteristics change becomes smaller at the time of the adjustment, and the scanning operation becomes better.

As apparent from FIG. 37, when the scanning line inclination correction of 700 μm is performed by the span band method, the magnification error is constant. On the other hand, when the scanning line inclination correcting is performed by the conventional MUSIC method, as the correcting amount becomes larger, the magnification error becomes large, and optical characteristics becomes more degraded. IN other words, by using the span band method, it is possible to greatly improve the optical characteristics at the time of the correcting operation, compared with the conventional MUSIC method. In FIG. 37, 50 mm is an optical path length.

FIG. 38A shows magnification errors when the inclination correcting amount and the image height are changed according to the span band method. FIG. 38B shows magnification errors when the inclination correcting amount and the image height are changed according to the conventional MUSIC method. Data of FIG. 37 is based on data of FIGS. 38A and 38B. PV in FIGS. 38A and 38B designates a difference between the maximum value and the minimum value of the magnification error. In FIG. 38A, PV is constant, and in FIG. 38B, as the inclination correcting amount becomes larger, PV becomes large. Accordingly, as understood from the results of FIGS. 38A and 38B, by using the span band method, it is possible to greatly improve optical characteristics at the time of the scanning line inclination correcting, compared with the conventional MUSIC method.

Figure 39:
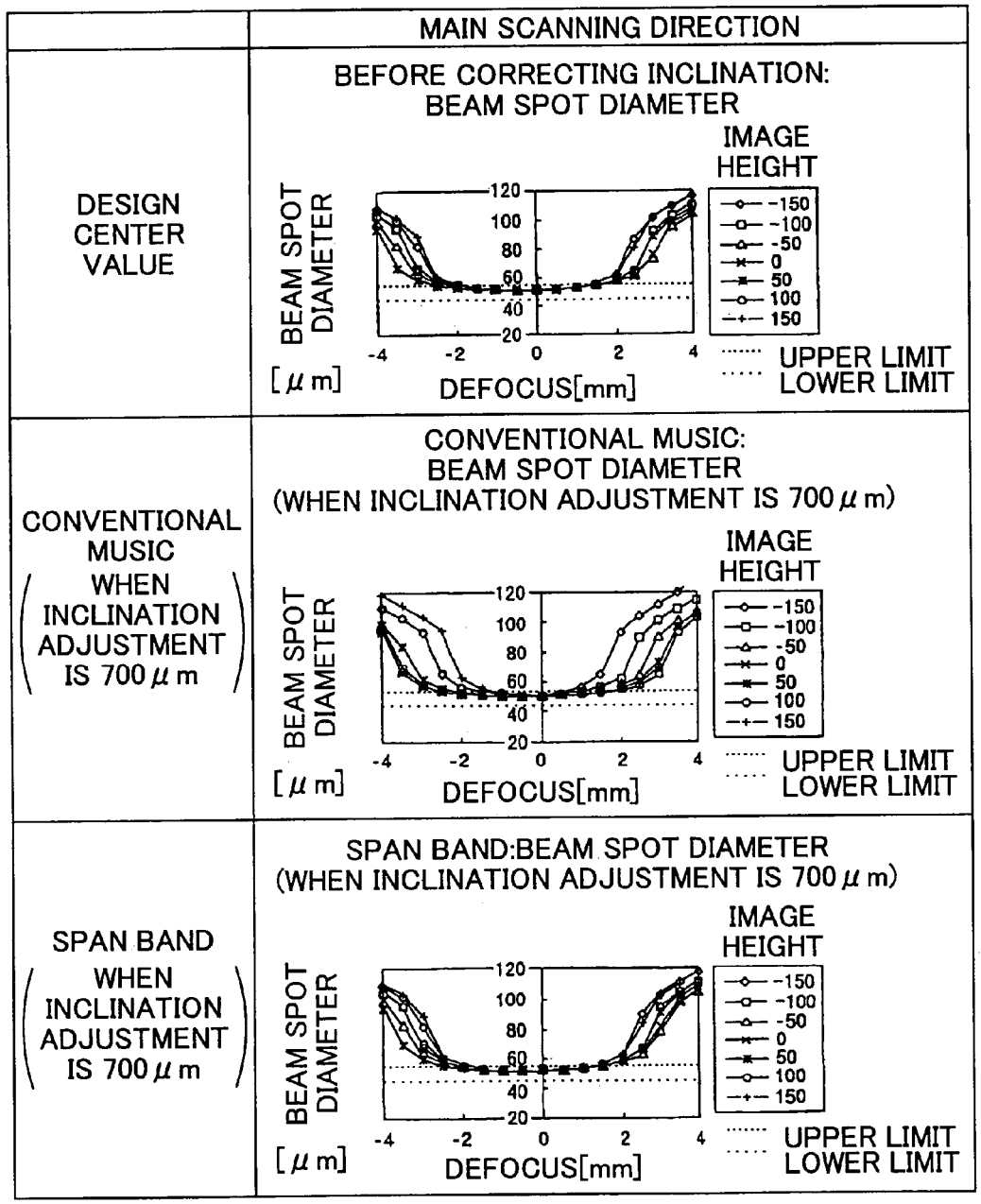
FIG. 39 shows comparison of beam spot diameter change in the main scanning direction after inclination correcting between the span band method and the MUSIC method.
Figure 40:
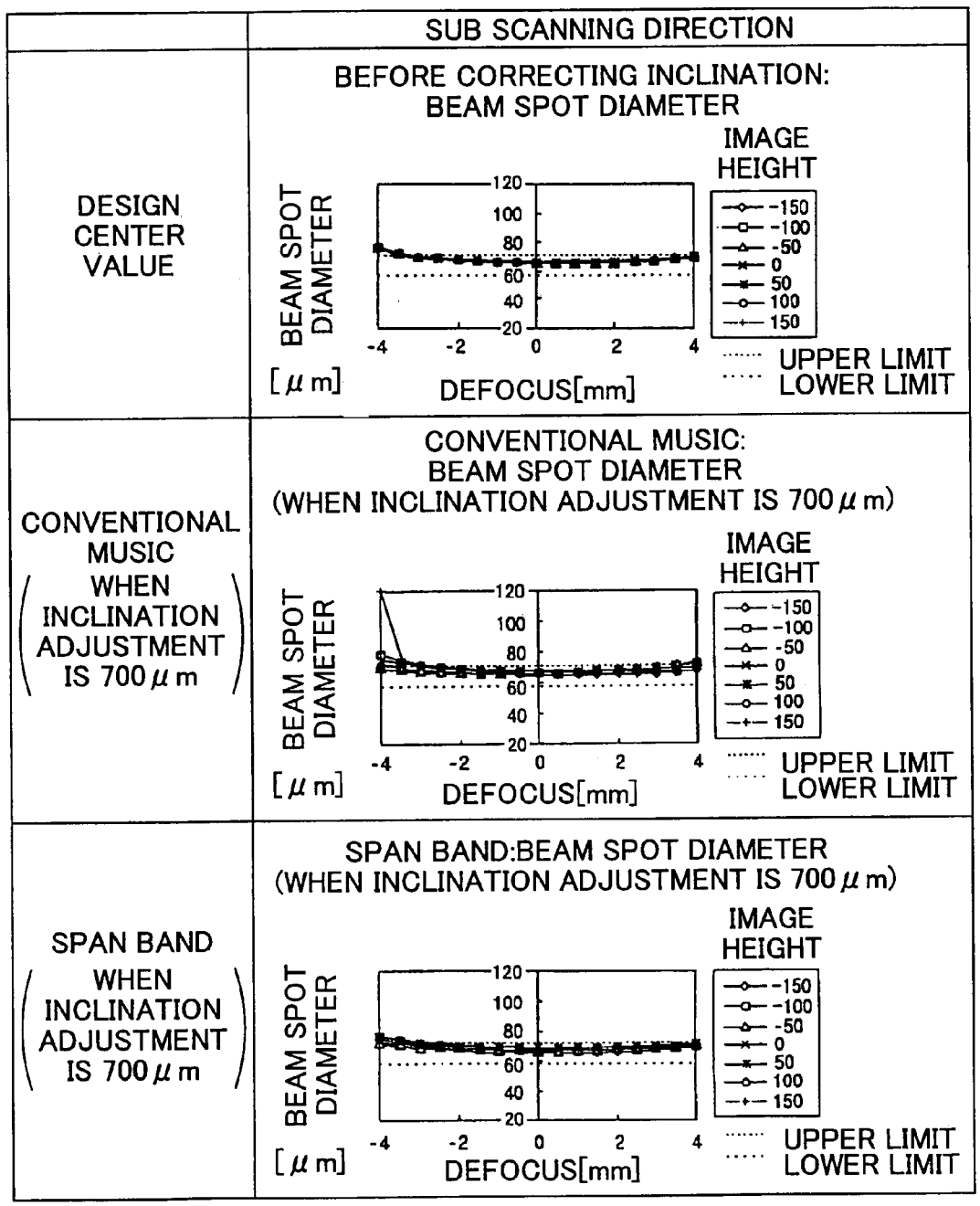
FIG. 40 shows comparison of beam spot diameter change in the sub scanning direction after inclination correcting between the span band method and the MUSIC method.

FIGS. 39 and 40 show comparison between a beam spot diameter of a design center (standard) value before the inclination correcting, and beam spot diameters when the inclination adjustment of 700 μm is performed by the conventional MUSIC method and the span band method. FIG. 39 shows change of a beam spot diameter in the main scanning direction, and FIG. shows change of a beam spot diameter in the sub scanning direction. In both of FIGS. 39 and 40, shown polygonal lines closer to the polygonal lines of the design center value means less degradation of the beam spot diameter.

In FIGS. 39 and 40, an allowable range, that is, change of a beam spot diameter to the optical path length is shown by "defocus". In each of FIGS. 39 and 40, two dotted lines show the upper allowable limit value and the lower allowable limit value of the beam spot diameter, respectively. As apparent from FIG. 39, the result of the span band method is closer to the polygonal lines of the design center value than the result of the conventional MUSIC method. In other words, shapes of the polygonal lines obtained by the span band method are approximately same as those of the design center value. Furthermore, the allowable range in the main scanning direction of the MUSIC method is narrower than that of the span band method. Accordingly, in the span band method, there is generated less degradation of the beam spot diameter in the main scanning direction, and it is possible to realize very excellent optical characteristics at the time of the inclination correcting.

FIG. 40 shows similar tendency of FIG. 39 that is less than in FIG. 39. There is generated little degradation of the beam spot diameter in the sub scanning direction in the span band method. Accordingly, in the span band method, the optical characteristics in the sub scanning direction at the time of inclination correcting are better than those of the MUSIC method. As a result, as understood from FIGS. 39 and 40, in terms of degradation of the beam spot diameter, the optical characteristics of the span band method is much better than those of the MUCIS method.

The correcting method using the writing start position adjusting means 1140 is called a triangle prism method.

The image forming apparatus 1 to which this embodiment is applied may include the scanning line curve correcting means 1071, the scanning line inclination correcting means 1072, and the writing start position adjusting means 1140, so that a correcting weak point of each means can be complemented by each other. Accordingly, it becomes possible to realize scanning position accuracy of 10 μm, improving the scanning position accuracy.

Specifically, in the case of the span band method using the scanning line curve correcting means 1071 and the scanning line inclination correcting means 1072, when errors in mechanism accuracy of the holding member 1061, and position accuracy of a supporting point (of the roller 1093, for example) for tilting operation in the γ direction are accumulated, a displacement amount of the scanning line is scattered between the respective stations. However, this scattering of the errors can be corrected by using the writing start position adjusting means 1140 in the triangle method so as to remove the position displacement. Meanwhile, according to the triangle method, the scanning position is shifted in a parallel direction, but when accuracy errors of the components are accumulated, a little inclination component of the scanning line is generated. This generated inclination can be corrected by the correcting in the γ direction, using the scanning line curve correcting means 1071 in the span band method.

In a case where a timing of electrically writing is adjusted to correct the scanning position, it is difficult to realize accuracy of 10 μm. However, according to this embodiment of the present invention, by such a complementing method, the light scanning device 1020 includes the scanning line inclination correcting means that can correct the inclination of 700 μm, and the scanning line curve correcting means that can correct the curve of 20 to 30 μm, and the writing position adjusting means that can correct the position displacement of ±50 μm. Accordingly, by the combination of the scanning line inclination correcting means, the scanning line curve correcting means, and the writing position adjusting means, it is possible to perform the correcting operation that enables accuracy of 10 μm.

In the above, the light scanning device and the image forming apparatus according to the present invention is described, but it is sufficient that the holding member holds at least one optical element. A target of the scanning line curve correcting means 1071 and the scanning line inclination correcting means 1072 is not limited to the second scanning lens 1030, and may be another optical element or a plurality of optical elements including the second scanning lens 1030. The pressing member may be sphere-shaped. In this case, the axial direction of the pressing member can be freely set. The image holding member such as the photoconductive body may be drum-shaped or belt shaped.

According to this embodiment, the scanning line curve correcting means and the scanning line inclination correcting means may be provided in accordance with a necessity of a correcting operation, and may be provided for performing correction on at least one beam of the beams corresponding to a plurality of the image holding bodies. Furthermore, when a plurality of the scanning line curve correcting means and the scanning line inclination correcting means are provided, it is possible to activate at least one of the scanning line curve correcting means and the scanning line inclination correcting means. In other words, it is possible to perform the correcting operation on at least one beam of the beams corresponding to a plurality of the image holding bodies.

In the above-described configuration, the leaf springs 1095 and 1096 have a curve shape, but the present invention is not limited to this shape, and the leaf springs 1095 and 1096 may have a rectangular shape. In the case of the rectangular leaf springs 1095 and 1096, it is relatively difficult to adjust the pressing force in the sub scanning direction B, but there is an advantages in that the rectangular leaf spring is strong against the applied force such as vibration in the scanning direction A and the optical axis direction orthogonal to the direction B.

The above-described configuration adopts the span band method in which both ends of the held optical element are supported by using the beam (leaf spring) structure, and the scanning line inclination is corrected by using the beam structure. However, except for the examples of FIGS. 31 and 32, instead of the both side beam structure in which both ends of the held optical element are supported by the beams (leaf springs), respectively, the one side beam structure, in which one end of the held optical element is supported by the beam (leaf spring), and the other end of the held optical element is only put on the fixed member, may be adopted. In the case of the one side beam structure, the held optical element is supported only by the friction force in the scanning direction A and the optical axis direction C orthogonal to the sub scanning direction B that is pressing direction, so that the directions A and C are weak against vibration, and the held optical element can be moved in the pressing direction, that is, the sub scanning direction B. As a result, the fine adjustment can be performed on the pressing force.

According to one aspect of the second embodiment, there is provided a light scanning device comprising:

an optical element that images, on an image holding body, a light beam emitted from a light source;

a holding member that holds the optical element;

scanning line curve correcting means for correcting the optical element in a sub scanning direction to correct a scanning line formed by the light beam in the sub scanning direction; and scanning line inclination correcting means for entirely tilting the optical element to correct an inclination of the scanning line, wherein at least one part of the scanning line curve correcting means, and at least one part of the scanning line inclination correcting means are provided integrally with the holding member. Thereby, it is possible to effectively suppress the deformation of the optical element (particularly, the resin-made optical element) included in the scanning imaging optical system caused by the temperature change. Furthermore, by this configuration, when this deformation and the warping generated by the remaining stress at the time of molding the optical element causes the scanning line curve and inclination, it is possible to correct this scanning line curve and inclination. By this configuration, by intensively providing the correcting mechanism to the holding member, it is possible to easily correct the scanning line curve and inclination with the relatively low cost, improving cost reduction.

According to another aspect of the second embodiment, the holding member includes a reference surface that contacts with the optical element, and that provides a position reference for the optical element in the holding member, and the holding member further includes a supporting member that is long in a main scanning direction, and that supports the optical element from the sub scanning direction.

Thereby, by making the optical element contact against the reference surface of the supporting member, the optical element can be positioned within the allowable accuracy in terms of the main scanning direction and the sub scanning direction with the optical element being supported. Furthermore, by this configuration, the supporting member can shut heat transmission when an environmental (ambient) temperature is raised. In this manner, it is possible to prevent partial change in refraction index of the optical element, and prevent an abnormal image such as an undesired black line caused by thickening of a light beam, forming good image.

According to another aspect of the second embodiment, the reference surface is formed at a part that does not correspond to both end parts of the optical element.

Thereby, the optical element can be supported and pressed at plural points so that the optical element can be deformed to be M-shaped or W-shaped in the main, scanning direction. Therefore, the optical element can be deformed to have a shape suitable to the correcting of the scanning line curve. Accordingly, it is possible to correct the scanning line position error including error contribution from another optical element such as the reflection mirror.

According to another aspect of the second embodiment, the scanning line curve correcting means includes pressing means for pressing the optical element from an opposite side of a surface of the optical element that contacts with the supporting member.

Thereby, it is possible to correct the large warping of the optical element, and perform fine correction on the scanning line position. Therefore, the scanning line curve can be accurately corrected.

According to another aspect of the second embodiment, the reference surface is formed at a position that does not correspond to a position where the pressing means presses the optical element.

Thereby, the correcting of the optical element can be performed by small stress. Therefore, it is possible to easily and reliably correct the optical element.

According to another aspect of the second embodiment, a plurality of the pressing means are provided in a longitudinal direction of the supporting member.

Thereby, the correcting operation performed by the scanning line curve correcting means can be performed with high accuracy.

According to another aspect of the second embodiment, a single number of the pressing means is provided approximately at a center in the longitudinal direction of the supporting member.

Thereby, the configuration of the scanning line curve correcting means can be relatively simplified, so that the light scanning device can be made at relatively low cost.

According to another aspect of the second embodiment, the pressing means comprises:

a pressing member that engages the optical element from an opposite side of a surface of the optical element that contacts with the supporting member; and a pressing operation member that pushes the pressing member against the optical element.

Thereby, the pressing member can be pushed against the optical element by the pressing operation member so as to correct the large warping of the optical element and perform correction of the scanning line position.

According to another aspect of the second embodiment, the pressing operation member includes a tapered pin, and when the tapered pin is moved in an axial direction of the tapered pin, the tapered pin pushes the pressing member against the optical element.

Thereby, it is possible to provide the light scanning device that can perform fine correcting of the curve of the optical element by using the relatively simple configuration.

According to another aspect of the second embodiment, the pressing member has a cylinder shape of which axial direction is approximately parallel to an optical axis direction of the optical element, and an axial direction of the tapered pin is approximately orthogonal to the axial direction of the cylinder shape.

Thereby, when the optical element is expanded or contracted by environmental temperature change, the pressing member can prevent this expansion or contraction of the optical element. In this manner, optical characteristics of the optical element are not affected by the temperature change. Therefore, it is possible to provide the light scanning device that can perform fine correction on the curve of the optical element by using the relatively simple configuration.

According to another aspect of the second embodiment, the optical element includes a depression part that is formed at the surface of the optical element that contacts with the pressing member, and a length of the pressing member in the axial direction of the cylinder shape is longer than a width of the depression part in the optical axis direction of the optical element.

Thereby, it is possible to stabilize the contact between the pressing member and the optical element. Therefore, it is possible to provide the light scanning device that can reliable correct the scanning line position.

According to another aspect of the second embodiment, the pressing means includes a screw that is moved relative to the optical element in a direction including the sub scanning direction.

Thereby, the configuration of the scanning line curve correcting means can be relatively simplified. Therefore, it is possible to provide the light scanning device that can correct the scanning line curve at relatively low cost.

According to another aspect of the second embodiment, the holding member comprises a sandwiching support member that is positioned at an opposite side of the surface of the optical element contacting with the supporting member, and that sandwiches and supports the optical element in corporation with the supporting member.

Thereby, the deformation of the optical element can be prevented by sandwiching the optical element by the supporting member and the sandwiching support member. Furthermore, the warping of the optical element caused by the temperature distribution difference in the main scanning direction can be corrected by pressing the optical element at the side of the sandwiching support member. For example, it is possible to reduce the fluctuation in the scanning line curve caused by environmental change at the time of a successive printing operation.

According to another aspect of the second embodiment, at least one part of the pressing means, and at least one part of the scanning line inclination correcting means are provided integrally with the sandwiching support member.

Thereby, not only the supporting member and the sandwiching support member can support the optical element, but also the sandwiching support member can support the at least one part of the pressing means and the at least one part of the scanning line inclination correcting means. In this manner, it is possible to provide the light scanning device that can correct the scanning line curve and inclination at the side of the sandwiching support member with the entire size of the light scanning device being reduced.

According to another aspect of the second embodiment, the scanning line inclination correcting means entirely tilts the holding member together with the optical element to correct the inclination of the scanning line.

Thereby, for example, when the reflection mirror is tilted in the γ direction for correcting the, a generated adverse effect such as the deterioration of the magnification error in the main scanning direction can be removed. Furthermore, the optical element can be tilted in the γ direction with the optical element being held by the holding member so as to correct the scanning line inclination. In this manner, the scanning line inclination can be corrected without deteriorating the magnification in the main scanning direction.

According to another aspect of the second embodiment, the scanning line inclination correcting means includes a supporting point member that provides a supporting point when the scanning line inclination correcting means tilts the holding member.

Thereby, it is possible to provide the supporting point for adjusting the scanning line inclination by using the relatively simple configuration.

According to another aspect of the second embodiment, the supporting point is positioned near the optical axis of the optical element.

Thereby, it is possible to suppress the optical characteristics change of the optical element when the optical element is tilted to correct the scanning line inclination.

According to another aspect of the second embodiment, independently of each other, the scanning line curve correcting means and the scanning line inclination correcting means correct the scanning line.

Thereby, the correcting of the scanning line curve, and the correcting of the scanning line inclination can be performed independently without affecting each other. Accordingly, it is possible to correct the scanning line easily with high accuracy.

According to another aspect of the second embodiment, the light scanning device is used for scanning a plurality of the image holding bodies by the light beams.

Thereby, it is possible to provide the light scanning device that can exhibit the above-described advantages when scanning a plurality of the image holding bodies.

According to another aspect of the second embodiment, the plurality of image holding bodies are provided for forming toner images of colors that are different from each other.

Thereby, not only the scanning line curve and inclination can be corrected by the relatively simple configuration at low cost, but also the scanning lines corresponding to the respective colors can be made to conform with each other even at the time of rapid temperature change (for example, successive printing) in the light scanning device. Therefore, it is possible to improve quality of a color image with the color difference being prevented.

According to another aspect of the second embodiment, the scanning line curve correcting means and the scanning line inclination correcting means correct at least one beam of the beams corresponding to the plurality of image holding bodies, respectively.

Thereby, in accordance with a necessity, it is possible to correct the scanning line curve and inclination so that the scanning lines corresponding to the respective colors can be made to conform with each other with high accuracy.

According to another aspect of the second embodiment, one of the colors is set as a standard color, and the scanning line curve correcting means and the scanning line inclination correcting means perform correcting to conform, with the scanning line of the standard color, the scanning lines of the light beams corresponding to the colors other than the standard color.

Thereby, it is possible to omit the correcting operation for the standard color. Further, the scanning lines corresponding to the respective colors can be made to conform with each other with high accuracy, Therefore, the scanning line curve and inclination can be corrected by using the relatively simple configuration at low cost.

According to another aspect of the second embodiment, the standard color is black or magenta.

Thereby, the color that has relatively high contrast, and that is more affected by an outside disturbing factor such as vibration and temperature change is set as the standard color, and the correcting operation of the standard color is omitted. In this case, the scanning optical system corresponding to the standard color can be fixed, and the rigidity of this scanning optical system can be made large. Therefore, it is possible to provide the light scanning device that is less affected by the outside disturbing factor, and that can contribute to forming of an image having good contrast. Particularly, when the standard color is black, it is possible to maximize this advantage.

According to another aspect of the second embodiment, the light scanning device further includes:

deflecting means for deflecting the light beam;

an optical path refracting member that is provided between the light source and the deflecting means; and writing start position adjusting means for changing the position of the scanning line in the sub scanning direction by rotating the optical path refracting, member approximately around an optical axis of the light beam to be refracted by the optical path refracting member.

Thereby, even when the position of the scanning line is displaced in the sub scanning direction due to rapid temperature change, it is possible to effectively correct the relative color difference between the respective colors, improving color image quality.

According to another aspect of the second embodiment, the optical path refracting member includes a wedge-shaped prism.

Thereby, the position of the scanning line can be corrected by using the compact and low-cost optical path refracting member.

According to another aspect of the second embodiment, the light scanning device further comprises position displacement detection means for detecting a writing start position displacement in the sub scanning direction that is relative amount between the plurality of image holding bodies, wherein feedback control of the writing start position adjusting means is performed based on the detected writing start position displacement.

Thereby, even when the optical characteristics change is generated due to the time lapse to cause the position of the scanning line to be displaced in the sub scanning direction on the image holding body, it is possible to effectively correct relative color difference between the respective colors, forming good color image.

According to another aspect of the second embodiment, the position of the scanning line on the image holding body is controlled by using the writing start position adjusting means during writing of image data.

Thereby, it is possible to correct the relative color difference between the respective colors in almost real time.

According to another aspect of the second embodiment, the light scanning device further comprises a fixed member that supports the holding member such that the holding member is movable in a direction of correcting the inclination of the scanning line, wherein the scanning line inclination correcting means comprises:

an elastic member that is provided integrally with the holding member and the fixed member, and that supports the holding member such that the holding member is movable relative to the fixed member in the direction of correcting the inclination of the scanning line; and holding member tilting means for tilting the holding member against force generated from the elastic member.

Thereby, it is possible to prevent deterioration of the optical element due to service life, for example, by the relatively simple configuration and at low cost.

According to another aspect of the second embodiment, the holding member tilting means includes a screw.

Thereby, it is possible to reliably correct the scanning line inclination by relatively simple low-cost configuration.

According to another aspect of the second embodiment, the scanning line inclination correcting means comprises:

driving means, provided integrally with the holding member, for driving the holding member to be tilted;

inclination detection means for detecting the inclination of the scanning line; and control means for causing the driving means to entirely tilting the holding member, in accordance with the detected inclination of the scanning line, so that the inclination of the scanning line is corrected.

Thereby, the feedback control on the driving means is performed by the control means using the inclination detection means so that the scanning line inclination can be removed automatically and accurately.

According to another aspect of the second embodiment, the light scanning device further comprises a fixed member that supports the holding member such that the holding member is movable in a direction of correcting the inclination of the scanning line, wherein the scanning line inclination correcting means comprises:

an elastic member that is provided integrally with the holding member and the fixed member, and that supports the holding member such that the holding member is movable relative to the fixed member in the direction of correcting the inclination of the scanning line; and holding member tilting means as the driving means for tilting the holding member against force generated from the elastic member.

Thereby, it is possible to prevent deterioration of the optical element due to service life by the relatively simple and low-cost configuration. Furthermore, the feedback control on the driving means can be performed by the control means using the inclination detection means so that the scanning line inclination can be corrected automatically and accurately.

According to another aspect of the second embodiment, the elastic member includes a leaf spring and/or a coil spring.

Thereby, it is possible to prevent deterioration of the optical element due to service life, reliably correcting the scanning line inclination.

According to another aspect of the second embodiment, the elastic member is a leaf spring and/or a coil spring.

This patent application is based on Japanese priority patent application No. 2002-274689, 2003-022674, and 2003-201885 filed on Sep. 20, 2002, Jan. 30, 2003, and Jul. 25, 2003, respectively, the entire contents of which are hereby incorporated by reference.

What is claimed is:

1. A light scanning device comprising:
an optical element that images, on an image holding body, a light beam emitted from a light source;
a holding member that holds the optical element;
scanning line curve correcting means for correcting the optical element in a sub scanning direction to correct a scanning line in the sub scanning direction, the scanning line being formed by the light beam; and
scanning line inclination correcting means for entirely tilting the optical element around a supporting point positioned at a center of the optical element along the scanning line to correct an inclination of the scanning line, wherein the supporting point is positioned near an optical axis of the optical element and is in contact with a center of the holding member in a plane parallel to the scanning line and perpendicular to the optical axis of the optical element, wherein at least one part of the scanning line curve correcting means, and at least one part of the scanning line inclination correcting means are provided integrally with the holding member, wherein the holding member further includes a supporting member that is long in a main scanning direction, and that supports the optical element from the sub scanning direction, the holding member includes a reference surface that contacts with the optical element and provides a reference position for the optical element in the holding member, wherein the scanning line curve correcting means includes pressing means for pressing the optical element from an opposite side of a surface of the optical element that contacts with the supporting member, wherein the pressing means includes a pressing member that engages the optical element from the opposite side of the surface of the optical element that contacts with the supporting member, and a pressing operation member that pushes the pressing member against the optical element, and wherein the reference surface is formed at a position that does not correspond to a position where the pressing means presses the optical element.

2. The light scanning device according to claim 1, wherein the reference surface is formed at a part that does not correspond to both end parts of the optical element.

3. The light scanning device according to claim 1, wherein a plurality of the pressing means are provided in a longitudinal direction of the supporting member.

4. The light scanning device according to claim 1, wherein a single number of the pressing means is provided approximately at a center in a longitudinal direction of the supporting member.

5. The light scanning device according to claim 1, wherein the pressing operation member includes a tapered pin, and when the tapered pin is moved in an axial direction of the tapered pin, the tapered pin pushes the pressing member against the optical element.

6. The light scanning device according to claim 5, wherein the pressing member has a cylinder shape of which axial direction is approximately parallel to an optical axis direction of the optical element, and an axial direction of the tapered pin is approximately orthogonal to the axial direction of the cylinder shape.

7. The light scanning device according to claim 6, wherein the optical element includes a depression part that is formed at a surface that belongs to the optical element, and that contacts with the pressing member, and a length of the pressing member in the axial direction of the cylinder shape is longer than a width of the depression part in the optical axis direction of the optical element.

8. The light scanning device according to claim 1, wherein the pressing means includes a screw that is moved relative to the optical element in a direction including the sub scanning direction.

9. The light scanning device according to claim 1, wherein the holding member comprises a sandwiching support member that is positioned at an opposite side of the surface of the optical element contacting with the supporting member, and that sandwiches and supports the optical element in cooperation with the supporting member.

10. The light scanning device according to claim 9, wherein at least one part of the pressing means, and at least one part of the scanning line inclination correcting means are provided integrally with the sandwiching support member.

11. The light scanning device according to claim 1, wherein the scanning line inclination correcting means entirely tilts the holding member together with the optical element to correct the inclination of the scanning line.

12. The light scanning device according to claim 1, wherein independently of each other, the scanning line curve correcting means and the scanning line inclination correcting means correct the scanning line.

13. The light scanning device according to claim 1, wherein the light scanning device is used for scanning a plurality of the image holding bodies by the light beams.

14. The light scanning device according to claim 13, wherein the plurality of image holding bodies are provided for forming toner images of colors that are different from each other.

15. The light scanning device according to claim 13, wherein the scanning line curve correcting means and the scanning line inclination correcting means correct at least one beam of the beams corresponding to the plurality of image holding bodies, respectively.

16. The light scanning device according to claim 15, wherein one of colors corresponding to the plurality of image holding bodies, respectively is set as a standard color, and the scanning line curve correcting means and the scanning line inclination correcting means perform correcting to conform, to the scanning line of the standard color, the scanning lines corresponding to the colors other than the standard color.

17. The light scanning device according to claim 16, wherein the standard color is black or magenta.

18. The light scanning device according to claim 13, further comprising:

deflecting means for deflecting the light beam;

an optical path refracting member that is provided between the light source and the deflecting means; and writing start position adjusting means for changing the position of the scanning line in the sub scanning direction by rotating the optical path refracting member approximately around an optical axis of the light beam to be refracted by the optical path reftacting member.

19. The light scanning device according to claim 18, wherein the optical path refracting member includes a wedge-shaped prism.

20. The light scanning device according to claim 18, further comprising position displacement detection means for detecting a writing start position displacement in the sub scanning direction that is relative amount between the plurality of image holding bodies, wherein feedback control of the writing start position adjusting means is performed based on the writing start position displacement detected by the position displacement detection means.

21. The light scanning device according to claim 18, wherein the position of the scanning line on the image holding body is controlled by using the writing start position adjusting means during writing of image data.

22. The light scanning device according to claim 1, further comprising a fixed member that supports the holding member such that the holding member is movable in a direction of correcting the inclination of the scanning line, wherein the scanning line inclination correcting means comprises:
an elastic member that is provided integrally with the holding member and the fixed member, and that supports the holding member such that the holding member is movable relative to the fixed member in the direction of correcting the inclination of the scanning line; and
holding member tilting means for tilting the holding member against force generated from the elastic member.

23. The light scanning device according to claim 22, wherein the holding member tilting means includes a screw.

24. The light scanning device according to claim 22, wherein the elastic member includes a leaf spring or a coil spring.

25. The light scanning device according to claim 1, wherein the scanning line inclination correcting means comprises:
driving means, provided integrally with the holding member, for driving the holding member to be tilted;
inclination detection means for detecting the inclination of the scanning line; and
control means for causing the driving means to entirely tilting the holding member, in accordance with the inclination of the scanning line detected by the inclination detection means, so that the inclination of the scanning line is corrected.

26. The light scanning device according to claim 25, further comprising a fixed member that supports the holding member such that the holding member is movable in a direction of correcting the inclination of the scanning line,
wherein the scanning line inclination correcting means comprises:
an elastic member that is provided integrally with the holding member and the fixed member, and that supports the holding member such that the holding member is movable relative to the fixed member in the direction of correcting the inclination of the scanning line; and
holding member tilting means that functions as the driving means, and that tilts the holding member against force generated from the elastic member.

27. The light scanning device according to claim 26, wherein the elastic member includes a leaf spring or a coil spring.

28. A method of correcting a curve and inclination of a scanning line of light beam emitted from a light source, comprising the steps of:
holding an optical element with a holding member;
correcting the optical element in a sub scanning direction to correct the curve of the scanning line, the optical element imaging the light beam on an image holding body; and
entirely tilting the optical element around a supporting point positioned at a center of the optical element along the scanning line to correct the inclination of the scanning line,
wherein the supporting point is positioned near an optical axis of the optical element and is in contact with a center of the holding member in a plane parallel to the scanning line and perpendicular to the optical axis of the optical element,
wherein the holding includes providing a reference surface that contacts with the optical element and provides a reference position for the optical element, and the correcting includes pressing the optical element from an opposite side of a surface of the optical element, and the reference surface is provided at a position that does not correspond to a position where the pressing presses the optical element, and
wherein the pressing includes engaging the optical element from the opposite side of the surface of the optical element that contacts with the supporting member, and pushing against the optical element.

29. The method according to claim 28, further comprising the steps of:
supporting the optical element from the sub scanning direction; and
pressing the supported optical element in the sub scanning direction to correct the curve of the scanning line.

30. The method according to claim 28, further comprising the step of supporting the optical element by elastic force such that the optical element is movable in a direction of correcting the inclination of the scanning line,
wherein the step of entirely tilting comprises the step of tilting the supported optical element against the elastic force.

31. The method according to claim 28, further comprising the step of detecting an amount of the inclination of the scanning line,
wherein the step of entirely tilting comprises the step of tilting the optical element in accordance with the detected amount of the inclination of the scanning line.

32. An image forming apparatus comprising a light scanning device, wherein the light scanning device includes:
an optical element that images, on an image holding body, a light beam emitted from a light source;
a holding member that holds the optical element;
scanning line curve correcting means for correcting the optical element in a sub scanning direction to correct a scanning line formed by the light beam in the sub scanning direction; and
scanning line inclination correcting means for entirely tilting the optical element around a supporting point positioned at a center of the optical element along the scanning line to correct an inclination of the scanning line, wherein the supporting point is positioned near an optical axis of the optical element and is in contact with a center of the holding member in a plane parallel to the scanning line and perpendicular to the optical axis of the optical element,
wherein at least one part of the scanning line curve correcting means, and at least one part of the scanning line inclination correcting means are provided integrally with the holding member,
wherein the holding member includes a reference surface that contacts with the optical element and provides a reference position for the optical element in the holding member, the scanning line curve correcting means includes pressing means for pressing the optical element from an opposite side of a surface of the optical element that contacts with the supporting member, and the reference surface is formed at a position that does not correspond to a position where the pressing means presses the optical element, and
wherein the pressing means includes a pressing member that engages the optical element from the opposite side of the surface of the optical element that contacts with the supporting member, and a pressing operation member that pushes the pressing member against the optical element.

33. A light scanning device comprising:
an optical element that images, on an image holding body, a light beam emitted from a light source;
a holding member that holds the optical element;
scanning line curve correcting means for correcting the optical element in a sub scanning direction to correct a scanning line in the sub scanning direction, the scanning line being formed by the light beam; and
scanning line inclination correcting means for entirely tilting the optical element to correct an inclination of the scanning line,
wherein at least one part of the scanning line curve correcting means, and at least one part of the scanning line inclination correcting means are provided integrally with the holding member,
wherein the holding member further includes a supporting member that is long in a main scanning direction, and that supports the optical element from the sub scanning direction, and
the holding member includes a reference surface that contacts with the optical element and provides a reference position for the optical element in the holding member,
wherein the scanning line curve correcting means includes pressing means for pressing the optical element from an opposite side of a surface of the optical element that contacts with the supporting member, and
the pressing means includes a pressing member that engages the optical element from the opposite side of the surface of the optical element that contacts with the supporting member and a pressing operation member that pushes the pressing member against the optical element,
wherein the reference surface is formed at a position that does not correspond to a position where the pressing means presses the optical element.

34. The light scanning device according to claim 33, wherein the pressing operation member includes a tapered pin, and when the tapered pin is moved in an axial direction of the tapered pin, the tapered pin pushes the pressing member against the optical element.

35. The light scanning device according to claim 34, wherein the pressing member has a cylinder shape of which axial direction is approximately parallel to an optical axis direction of the optical element, and an axial direction of the tapered pin is approximately orthogonal to the axial direction of the cylinder shape.

36. The light scanning device according to claim 35, wherein the optical element includes a depression part that is formed at a surface that belongs to the optical element, and that contacts with the pressing member,
and a length of the pressing member in the axial direction of the cylinder shape is longer than a width of the depression part in the optical axis direction of the optical element.

37. A light scanning device comprising:
an optical element that images, on an image holding body, a light beam emitted from a light source;
a holding member that holds the optical element;
scanning line curve correcting means for correcting the optical element in a sub scanning direction to correct a scanning line in the sub scanning direction, the scanning line being formed by the light beam; and
scanning line inclination correcting means for entirely tilting the optical element to correct an inclination of the scanning line,
wherein at least one part of the scanning line curve correcting means, and at least one part of the scanning line inclination correcting means are provided integrally with the holding member,
wherein the holding member further includes a supporting member that is long in a main scanning direction, and that supports the optical element from the sub scanning direction, and
the holding member includes a reference surface that contacts with the optical element and provides a reference position for the optical element in the holding member,
wherein the holding member comprises a sandwiching support member that is positioned at an opposite side of the surface of the optical element contacting with the supporting member, and that sandwiches and supports the optical element in cooperation with the supporting member,
wherein the scanning line curve correcting means includes pressing means for pressing the optical element from an opposite side of a surface of the optical element that contacts with the supporting member,
wherein the reference surface is formed at a position that does not correspond to a position where the pressing means presses the optical element.

38. The light scanning device according to claim 37, wherein at least one part of the pressing means, and at least one part of the scanning line inclination correcting means are provided integrally with the sandwiching support member.

39. A light scanning device comprising:
an optical element that images, on an image holding body, a light beam emitted from a light source;
a holding member that holds the optical element;
scanning line curve correcting means for correcting the optical element in a sub scanning direction to correct a scanning line in the sub scanning direction, the scanning line being formed by the light beam; and
scanning line inclination correcting means for entirely tilting the optical element to correct an inclination of the scanning line,
wherein the scanning line inclination correcting means includes a supporting point member that provides a supporting point when the scanning line inclination correcting means tilts the holding member,
wherein the supporting point is positioned near an optical axis of the optical element and is in contact with a center of the holding member in a plane parallel to the scanning line and perpendicular to the optical axis of the optical element,
wherein at least one part of the scanning line curve correcting means, and at least one part of the scanning line inclination correcting means are provided integrally with the holding member,
wherein the holding member further includes a supporting member that is long in a main scanning direction, and that supports the optical element from the sub scanning direction, and
the holding member includes a reference surface that contacts with the optical element and provides a reference position for the optical element in the holding member,
wherein the scanning line curve correcting means includes pressing means for pressing the optical element from an opposite side of a surface of the optical element that contacts with the supporting member, wherein the pressing means includes a pressing member that engages the optical element from the opposite side of the surface of the optical element that contacts with the supporting member, and a pressing operation member that pushes the pressing member against the optical element, and wherein the reference surface is formed at a position that does not correspond to a position where the pressing means presses the optical element.

* * * * *